US012678376B2

(12) United States Patent
Hayashi et al.

(10) Patent No.: US 12,678,376 B2
(45) Date of Patent: Jul. 14, 2026

(54) MEDICATION SUPPORT DEVICE

(71) Applicants: Hirotaka Hayashi, Kanagawa (JP); Hiroshi Fujie, Kanagawa (JP); Manabu Yamanaka, Kanagawa (JP); Youhei Niitsuma, Kanagawa (JP); Yu Yamaya, Kanagawa (JP)

(72) Inventors: Hirotaka Hayashi, Kanagawa (JP); Hiroshi Fujie, Kanagawa (JP); Manabu Yamanaka, Kanagawa (JP); Youhei Niitsuma, Kanagawa (JP); Yu Yamaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 534 days.

(21) Appl. No.: 18/154,956

(22) Filed: Jan. 16, 2023

(65) Prior Publication Data

US 2023/0255854 A1 Aug. 17, 2023

(30) Foreign Application Priority Data

Feb. 16, 2022 (JP) ................................ 2022-022470

(51) Int. Cl.
*A61J 7/00* (2006.01)

(52) U.S. Cl.
CPC .................................. *A61J 7/0084* (2013.01)

(58) Field of Classification Search
CPC .................................................... A61J 7/0084
See application file for complete search history.

(56) References Cited

U.S. PATENT DOCUMENTS

| | | | | |
|---|---|---|---|---|
| 2010/0106291 | A1 * | 4/2010 | Campbell | E05B 47/0002 340/3.1 |
| 2018/0160809 | A1 * | 6/2018 | Stefan | A47B 88/994 |
| 2021/0253302 | A1 * | 8/2021 | Guindi | B65D 21/0215 |
| 2021/0361532 | A1 | 11/2021 | Hayashi et al. | |

FOREIGN PATENT DOCUMENTS

| | | |
|---|---|---|
| JP | 2017-192455 | 10/2017 |
| JP | 2021-185976 | 12/2021 |
| WO | 2013/031103 A1 | 3/2013 |

OTHER PUBLICATIONS

Japanese Office Action dated Sep. 9, 2025 for corresponding Japanese Application No. 2022-022470.

* cited by examiner

*Primary Examiner* — Gene O Crawford
*Assistant Examiner* — Ayodeji T Ojofeitimi
(74) *Attorney, Agent, or Firm* — Harness, Dickey & Pierce, P.L.C.

(57) ABSTRACT

A medication support device includes a plurality of first containers that store a plurality of medicine packages in which a plurality of medicines are packed, a pickup device to pick up a specific one of the multiple medicine packages from one of the multiple first containers, a conveyor to convey the specific one of the multiple medicine packages picked up by the pickup device, a medicine dispenser to arrange the specific one of the multiple medicine packages conveyed by the conveyor, a second container in which the first containers are aligned and stored, a holder in which the second container is aligned and stored, and a housing that stores the first containers, the pickup device, the conveyor, the medicine dispenser, the second container, and the holder. In the medication support device, at least one of the second container or the first containers is attachable to and detachable from the housing.

16 Claims, 34 Drawing Sheets

MEDICATION SUPPORT DEVICE

CROSS-REFERENCE TO RELATED APPLICATION

This patent application is based on and claims priority pursuant to 35 U.S.C. § 119(a) to Japanese Patent Application No. 2022-022470, filed on Feb. 16, 2022, in the Japan Patent Office, the entire disclosure of which is hereby incorporated by reference herein.

BACKGROUND

Technical Field

Embodiments of the present disclosure relate to a medication support device.

Background Art

For the purpose of reducing the time or labor of making preparation for the medication, medication support devices have been proposed that are provided with a plurality of cartridges each of which contains a plurality of medicine packages. In order to handle a plurality of occupants, in such medication support devices, a plurality of medicine packages each of which contains medicines to be taken are picked up from the cartridge and are placed on a medicine dispensing tray.

By using such medication support devices, according to schedule, a medicine package to be taken can be passed to, for example, a person who takes the medicines and a personal care attendant who assists the medication.

SUMMARY

Embodiments of the present disclosure described herein provide a medication support device including a plurality of first containers that store a plurality of medicine packages in which a plurality of medicines are packed, a pickup device to pick up a specific one of the multiple medicine packages from one of the multiple first containers, a conveyor to convey the specific one of the multiple medicine packages picked up by the pickup device, a medicine dispenser to arrange the specific one of the multiple medicine packages conveyed by the conveyor, a second container in which the multiple first containers are aligned and stored, a holder in which the second container is aligned and stored, and a housing that stores the multiple first containers, the pickup device, the conveyor, the medicine dispenser, the second container, and the holder. In the medication support device, at least one of the second container or the multiple first containers is attachable to and detachable from the housing.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 12A-1, FIG. 12A-2, FIG. 12A-3, FIG. 12A-4, FIG. 12A-5, FIG. 12A-6, FIG. 12B, and FIG. 12C are schematic diagrams each illustrating an overall progression of the operation of the medication support device illustrated in FIG. 1, according to an embodiment of the present disclosure.

Figure 1B:
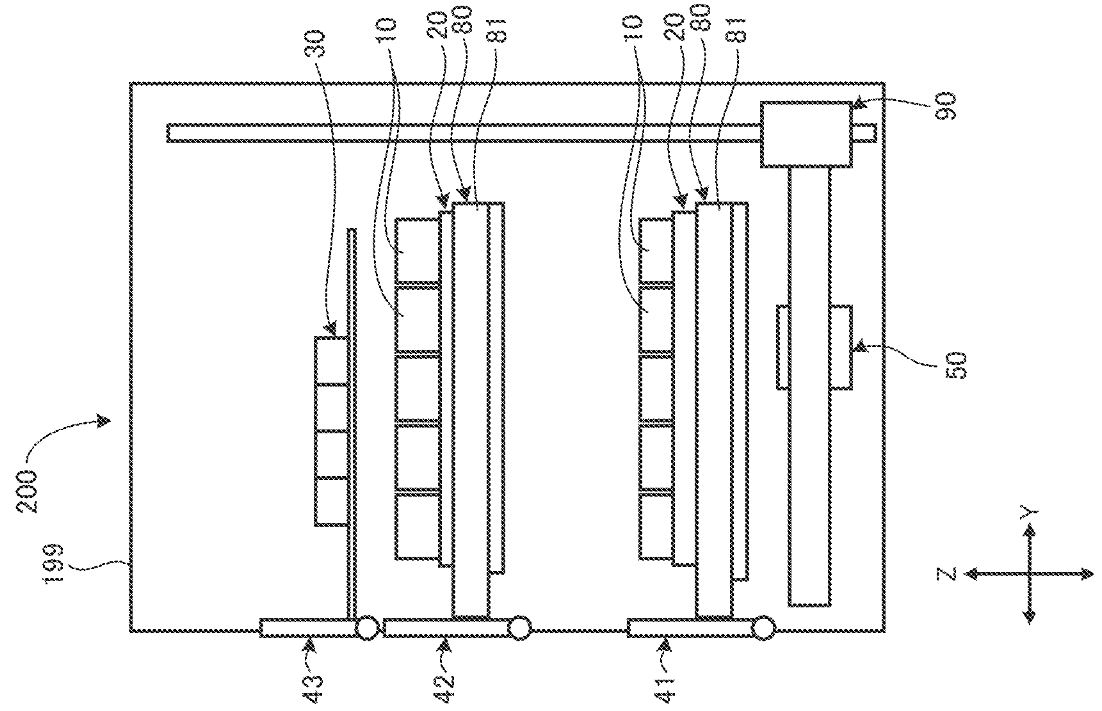
FIG. 1B is a side view the medication support device of FIG. 1A in its entirety, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the accompanying drawings. In the drawings and the description of the embodiments and examples of the present disclosure, like reference signs denote like elements such as members or components of similar shapes or similar functionality, and overlapping description may be omitted where appropriate unless there is concern about the possibility of confusion.

A basic and overall configuration or structure of the medication support device 200 according to an embodiment of the present disclosure is described with reference to FIG. 1A and FIG. 1B.

Figure 1A:
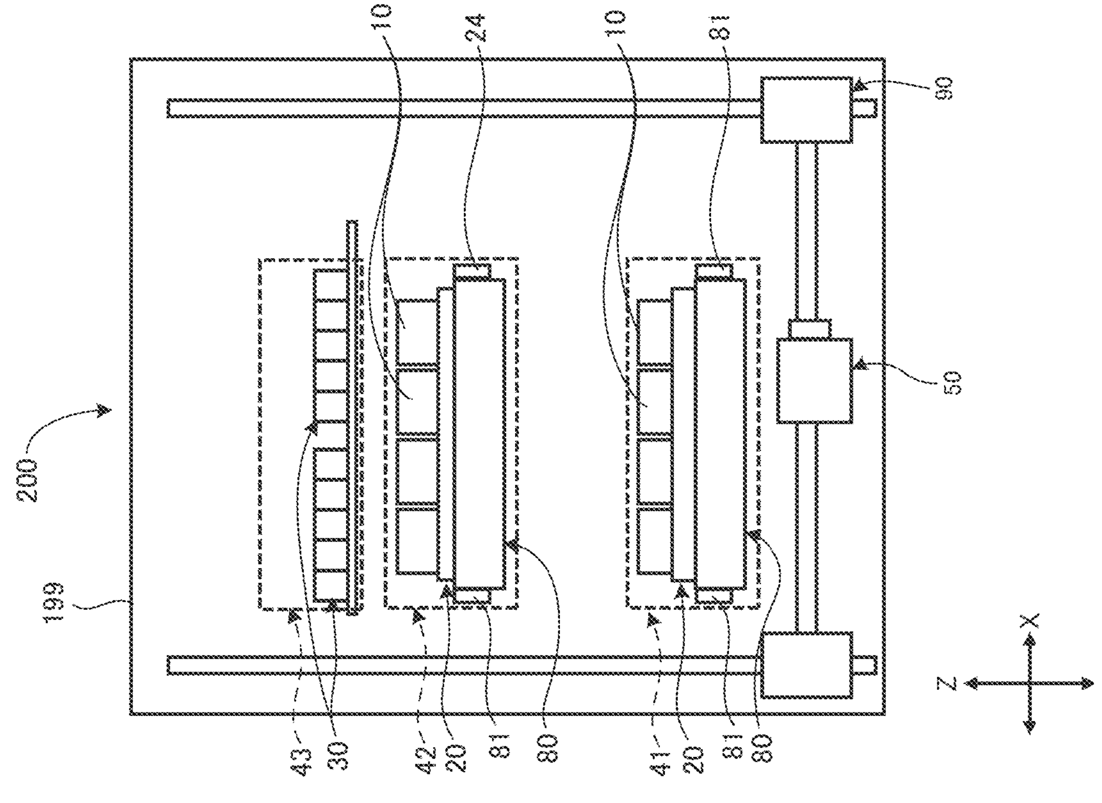
FIG. 1A is a front view of a medication support device in its entirety, according to an embodiment of the present disclosure.

FIG. 1A is a schematic front view of the medication support device 200 in its entirety according to the present embodiment.

FIG. 1B is a schematic side view of the medication support device 200 of FIG. 1A, according to the present embodiment.

As illustrated in FIG. 1A and FIG. 1B, the medication support device 200 according to the present embodiment is provided with a cartridge 10 that is also referred to as a first holder, a cartridge tray 20 that is also referred to as a second holder, a drawer 80, a medicine dispensing tray 30, a pickup unit 50, a conveyance unit 90, and a first gate 41, a second gate 42, and a third gate 43.

The medication support device 200 includes basic elements such as a cartridge tray and a drawer according to embodiments of the present disclosure (see, for example, claim 1).

In FIG. 1A and FIG. 1B, the horizontal direction or the right and left directions of the medication support device 200 is defined as an X-direction, where the horizontal direction or the right and left directions of the medication support device 200 is also referred to as the width direction of the medication support device 200. In FIG. 1A and FIG. 1B, the front-rear direction or the depth direction of the medication support device 200 is defined as a Y-direction, and the up and down directions or the orthogonal direction of the medication support device 200 is defined as a Z-direction, where the up and down directions or the orthogonal direction of the medication support device 200 is also referred to as the vertical direction. The same applies to the other drawings as will be described later in detail.

Each one of the multiple cartridges 10 according to the present embodiment serves as a first holder in which a plurality of medicine packages packing a several kinds of medicines are stored upon being stacked on top of each other in layers. The medicine package according to the present embodiment may be referred to simply as a pack in the following description. The multiple cartridges 10 are arranged at a middle portion and a lower portion of a housing 199 of the medication support device 200 through the cartridge tray 20. In the present embodiment, the multiple cartridges 10 are attachable to and detachable from the cartridge tray 20. The expression "stored upon being stacked on top of each other in layers" in the present disclosure indicates keeping the packs horizontally in such a manner that the front face is viewable.

The cartridge tray 20 according to the present embodiment can align and store the multiple cartridges 10, and serves as a second container. Supplemental description to detail is given for the configuration or structure of the cartridge tray 20 with reference to FIG. 5, FIG. 6A, and FIG. 6B.

The drawer 80 according to the present embodiment can align and hold the cartridge tray 20, and serves as a holder. Supplemental description to detail is given for the configuration or structure of the drawer 80 with reference to FIG. 5, FIG. 6A, and FIG. 6B.

Each one of the multiple medicine dispensing trays 30 according to the present embodiment serves as a medicine dispenser in which the prescribed packs conveyed by the conveyance unit 90 are arranged. As illustrated in FIG. 1A and FIG. 1B, a pair of medicine dispensing trays 30 are arranged above the uppermost group of multiple cartridges 10.

The pickup unit 50 according to the present embodiment serves as a pickup device that picks up a specific pack from one of the multiple cartridges 10. The conveyance unit 90 according to the present embodiment serves as a conveyor that conveys the pack picked up from one of the multiple cartridges 10 by the pickup unit 50.

Each one of the first gate 41 and the second gate 42 according to the present embodiment serves as an entrance and exit gate for the container, which allows one of the multiple cartridges 10 and the cartridge tray 20 to enter and exit the housing 199 through the drawer 80. The multiple cartridges 10 are inserted and set in the housing 199 through each one of the first gate 41 and the second gate 42. The open and close door of one of the first gate 41 and the second gate 42 are opened, and the drawer 80 in which the multiple cartridge trays 20 are aligned is drawn out to the front side. By so doing, the multiple cartridges 10 or the multiple cartridge trays 20 are inserted or withdrawn.

The third gate 43 according to the present embodiment serves as an entrance and exit gate for the medicine dispenser, which allows one of the multiple medicine dispensing trays 30 to enter and exit the housing 199. The third gate 43 is arranged such that the packs can be taken out immediately after the packs are set or inserted into the medicine dispensing tray 30. In the medication support device 200 according to the present embodiment, two medicine dispensing trays 30 are arranged as described above. As will be described later in detail, For example, a plurality of medicine dispensing trays 30 are arranged for each time of medication such as a time in the morning, a time in the daytime, a time in the evening, and a time before going to bed.

An outline of a single medicine package 2 according to the present embodiment in focus is described below with reference to FIG. 2A, FIG. 2B, and FIG. 2C.

Figure 2A:
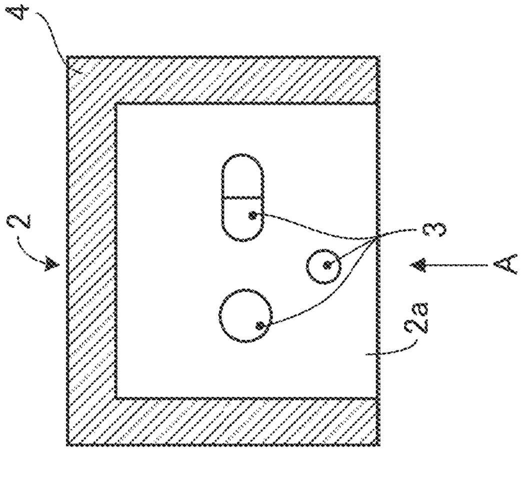
FIG. 2A is a typical plan view of a single medicine package according to an embodiment of the present disclosure.

FIG. 2A is a typical plan view of a single medicine package 2 according to the present embodiment.

Figure 2B:
FIG. 2B a side view of the single medicine package of FIG. 2A viewed in a direction indicated by an arrow A, according to an embodiment of the present disclosure.

FIG. 2B a side view of the single medicine package 2 of FIG. 2A viewed in a direction indicated by an arrow A, according to the present embodiment.

Figure 2C:
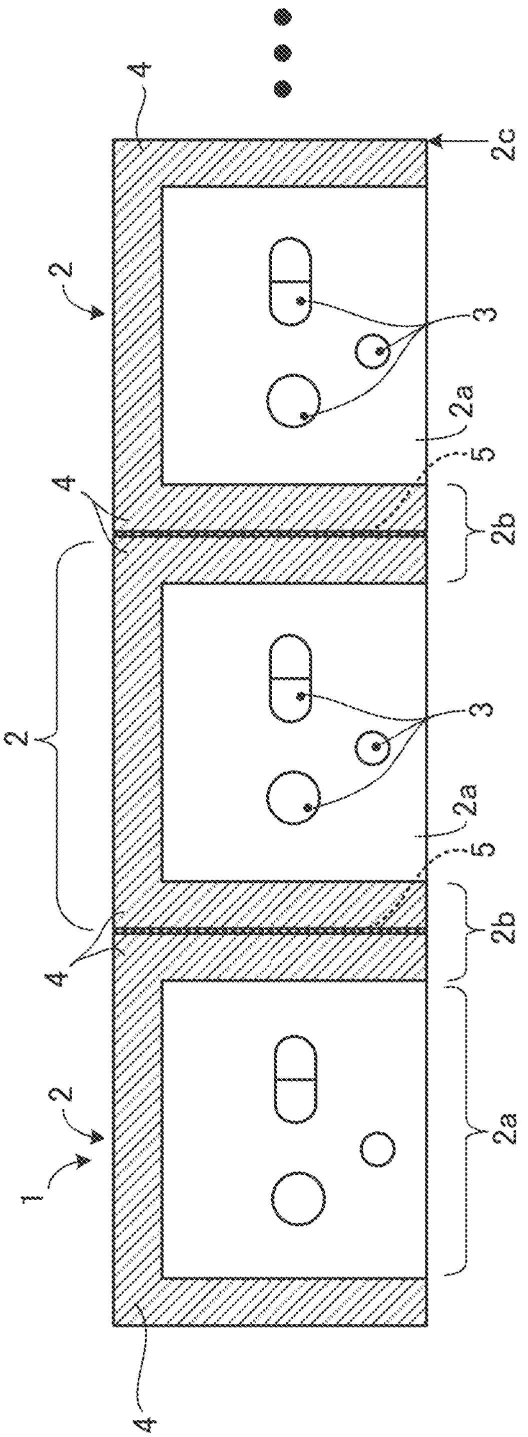
FIG. 2C is a view of a typical form of continuous packs according to an embodiment of the present disclosure.

FIG. 2C is a view of a typical form of continuous packs according to the present embodiment.

In FIG. 2B, one of the multiple medicine packages 2 is schematically illustrated.

As illustrated in FIG. 2A, one medicine package 2 is formed of, for example, a resin film, and a plurality of medicines 3 such as capsules or tablets are packed in small quantities. The medicine package 2 includes a bag 2*a* that covers the medicines 3 and a pressure-bonded portion 4 in which three sides of the bag 2*a* are pressure-bonded or welded. The pressure-bonded portion 4 is hatched in FIG. 2A and FIG. 2D. Typically, the side of the medicine package 2 on the bag 2*a* side is folded into two, and the medicines 3 are packed therebetween. The pressure-bonded portion 4 forms a leakage preventing portion that prevents the medicines 3 from slipping out from the bag 2*a*. Typically, the medicines 3 in one medicine package 2 is a one-time dosage for a patient who takes medicines.

The medicine package 2 is prepared by a drug-dispensing machine installed in a pharmacy or the like. The dispensing sheets that are used for dispending the medicines are rolled long-length sheets, and are perforated between packs. The dispensing sheets are rolled in an overlapping manner, and the medicines 3 to be taken are packed in the space between the sheets. The medicines 3 for a required number of doses are divided in small quantities, and packed into the multiple medicine packages 2 that form a continuous sheet. The three sides other than the folded portion of each one of the multiple medicine packages 2 around the medicines 3 for a single dose are sealed in turn by the pressure-bonded portion 4. The multiple medicine packages 2 that form such a continuous sheet may be referred to as continuous packs 1 in the following description. In the continuous packs 1 that are described with reference to FIG. 2C, the multiple medicine packages 2 are coupled to each other and laid like a belt. In the present embodiment described with reference to FIG. 2C, the medicines 3 for three doses are illustrated. The continuous packs 1 are typical form of drug or medicine that is given or sold at a pharmacy or the like to, for example, a user such as a person who actually takes the medicine 3 in the medicine package 2 and a personal care attendant or assistant who helps or assists the user to take medication, or a staff or the like including a pharmacist, a nurse practitioner, a care manager, or a medication assistant of, for example, various kinds of day-care center, nursing home, or medical institution. For the sake of explanatory convenience, each one of the packs is filled with the medicines 3 of the same form in the following description of the present disclosure. In FIG. 2C, by way of example, each one of the packs is filled with the same capsule and the same tablets. However, no limitation is indicated thereby. As a matter of course, each one of the packs may be filled with different type of medicines depending on, for example, the usage or purposes of the medication.

In the present embodiment described with reference to FIG. 2A, FIG. 2B, and FIG. 2C, the medicine package 2 has a rectangular shape in a plan view, and a packaging method in which three sides are crimped and sealed as in the present embodiment is called three-sided packaging in the related art. Most of the drug-dispensing machines available on the market prepare packs using the three-sided packaging method.

The pressure-bonded portion 4 has a band-like width of about 10 to 15 millimeters (mm), and has higher rigidity than the portion of the bag 2*a* that is a transparent or semitransparent film where the medicines 3 can be visually recognized therethrough. A boundary portion 2*b* that is implemented by perforation 5 is formed in the center of the pressure-bonded portion 4 between a pair of the multiple medicine packages 2 making up the continuous packs 1. The multiple medicine packages 2 are adjacent to each other in an upstream-to-downstream direction. For example, a user who is not handicapped in the hand can obtain one medicine package 2 by tearing off at the perforation 5 by hand or by cutting near the perforation 5 with scissors or a dedicated cutter.

Figure 3:
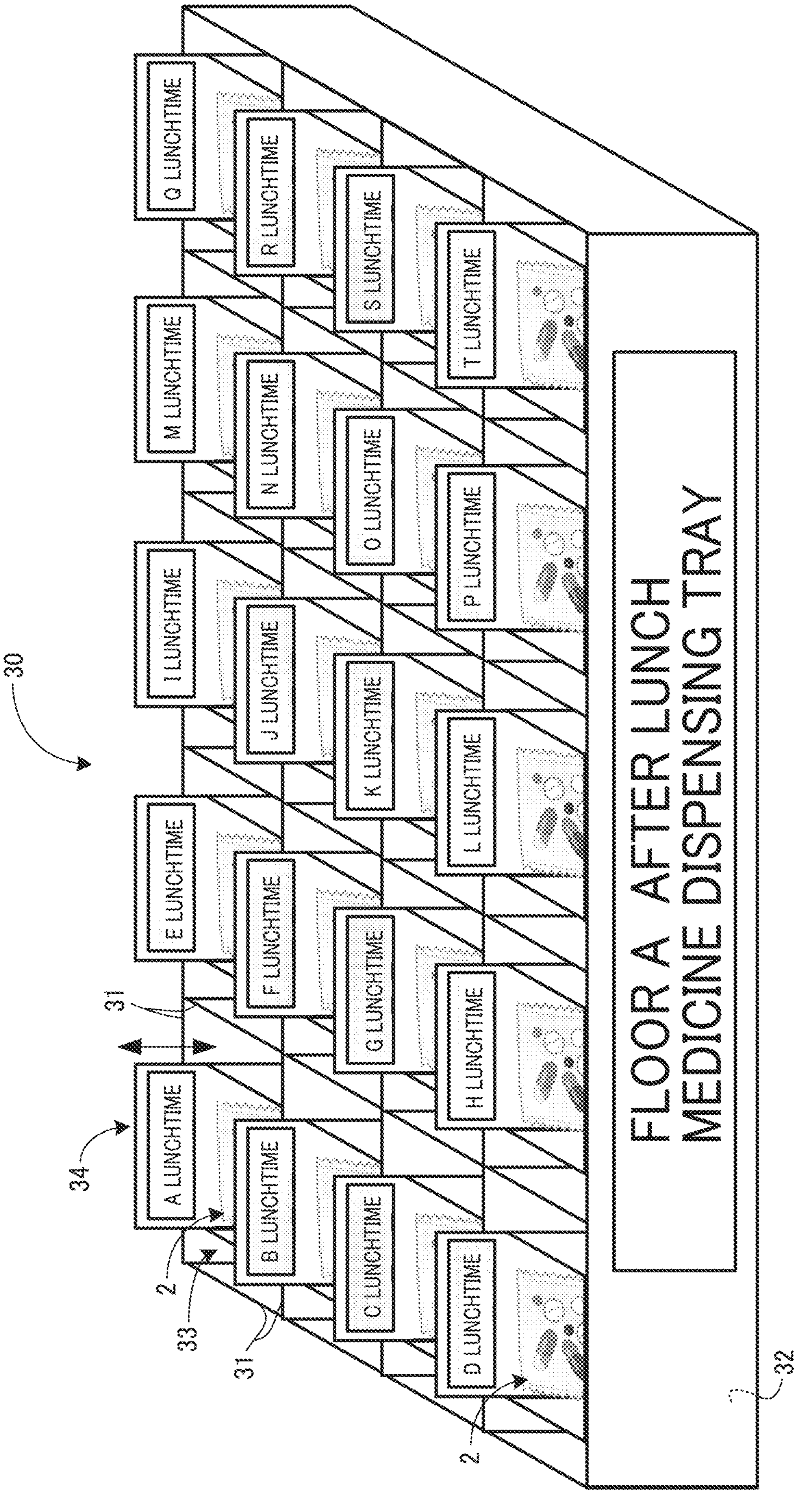
FIG. 3 is an external perspective view of a medicine dispensing tray, illustrating one configuration of the medicine dispensing tray, according to an embodiment of the present disclosure.

FIG. 3 is an external perspective view of the medicine dispensing tray 30, illustrating one configuration of the medicine dispensing tray 30, according to the present embodiment.

As illustrated in FIG. 3, each one of the multiple medicine dispensing trays 30 has four upright partition walls 31 that serve as a plurality of dividers for arranging prescribed packs, and is partitioned by those four upright partition walls 31. The twenty partitions 33 that are formed in each one of the multiple medicine dispensing trays 30 can be expressed as the components of a matrix including five columns in the X-direction or the line feed direction and four rows in the Y-direction or the character feed direction. As a result, each one of the twenty partitions 33 of the multiple medicine dispensing trays 30 can be uniquely positioned based on the components and addresses of the matrix of five columns and four rows. Furthermore, each one of the multiple medicine dispensing trays 30 has a bottom wall 32 on which the multiple medicine packages 2 are placed. As described above, each one of the multiple medicine dispensing trays 30 are arranged such that a specific one of the multiple packs will be placed in a specific one of the multiple partitions 33 with reliability by the four upright partition walls 31, which are four partition walls in the present embodiment, and the bottom wall 32 in common, without being mixed up with packs in different one of the multiple partitions 33 or dropping off from the bottom wall 32.

FIG. 3 illustrates one of the multiple medicine dispensing trays 30 where a subdivision box 34 attachable to and detachable from each one of the multiple partitions 33 is used. For example, the multiple subdivision boxes 34 according to the present embodiment hold the multiple medicine packages 2 filled with the medicines 3 to be taken by twenty residents A to T after lunch in day-care center or nursing home. In other words, one of the multiple medicine dispensing trays 30 illustrated in FIG. 3 is used to arrange prescribed packs in a predetermined or specific one of the multiple partitions 33 partitioned by a plurality of dividers through the multiple subdivision boxes 34. The operation of placing the multiple medicine packages 2 in one of the multiple medicine dispensing trays 30 is briefly described later with a case in which the multiple subdivision boxes 34 are not used.

In each one of the multiple partitions 33 of the multiple medicine dispensing trays 30, a setting position or inserting position is determined for each patient who takes medicines depending on a type of medicines in the pack to be taken. In other words, the multiple partitions 33 in one of the multiple medicine dispensing trays 30 may be allocated to a plurality of patients who take medicines at the same time. In a case where a specific patient who takes medicines does not take a medicine at a specific timing, arrangement can be made such that a pack is not given to such a specific patient at the specific timing.

However, no limitation is intended by the multiple medicine dispensing trays described above. According to an alternative embodiment of the present disclosure, each one of the multiple partitions 33 of one of the multiple medicine dispensing trays may be allocated for each time of medication of each patient who takes medicines. More specifically, in such an alternative embodiment of the present disclosure, the multiple partitions 33 may be allocated to each of the patients who take medicines in view of the time of medication of each one of the multiple medicine packages 2 to be taken in the morning, in the daytime, in the evening, or before going to bed. In the multiple medicine dispensing trays 30 according to such an alternative embodiment of the present disclosure, the multiple medicine dispensing trays 30 may be managed on a room by room basis in day-care center or nursing home where a plurality of patients who take medicines reside, and the multiple medicine packages 2 for that day or a couple of days may be dispersed in advance to the multiple medicine dispensing trays 30.

According to the above alternative embodiment, allocating the partitions 33 based on each time of medication such as a time in the morning, a time in the daytime, a time in the evening, and a time before going to bed can prevent the time of medication from being mistaken by patients who take medicines. The configuration or structure of the multiple medicine dispensing trays 30 is not limited to the embodiments of the present disclosure described above, and various kinds of combination are theoretically possible between patients who take medicines and the timing at which the medicines are to be taken. However, such combinations may go beyond the scope of the present disclosure, the description of such combinations is omitted.

The multiple cartridges 10 are described below with reference to FIG. 4A and FIG. 4B.

Figure 4A:
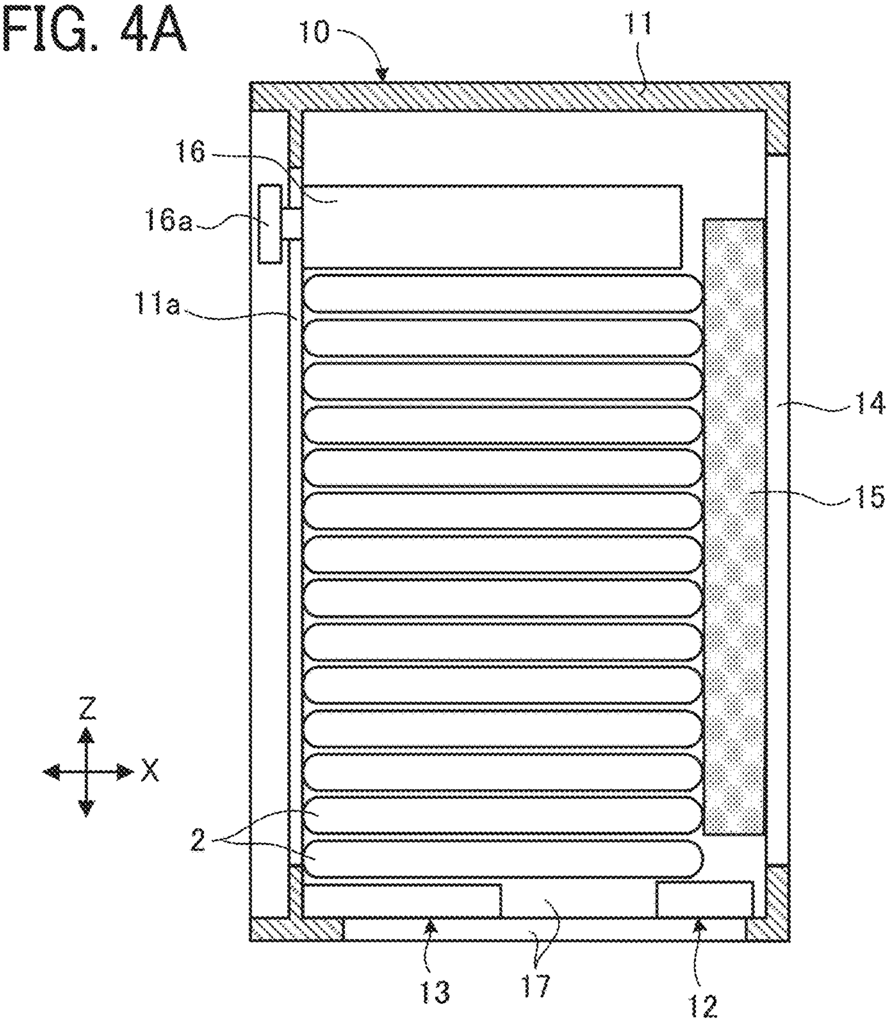
FIG. 4A is a vertical sectional view of a container according to an embodiment of the present disclosure.

FIG. 4A is a bottom view of one of the multiple cartridges 10 according to the present embodiment.

Figure 4B:
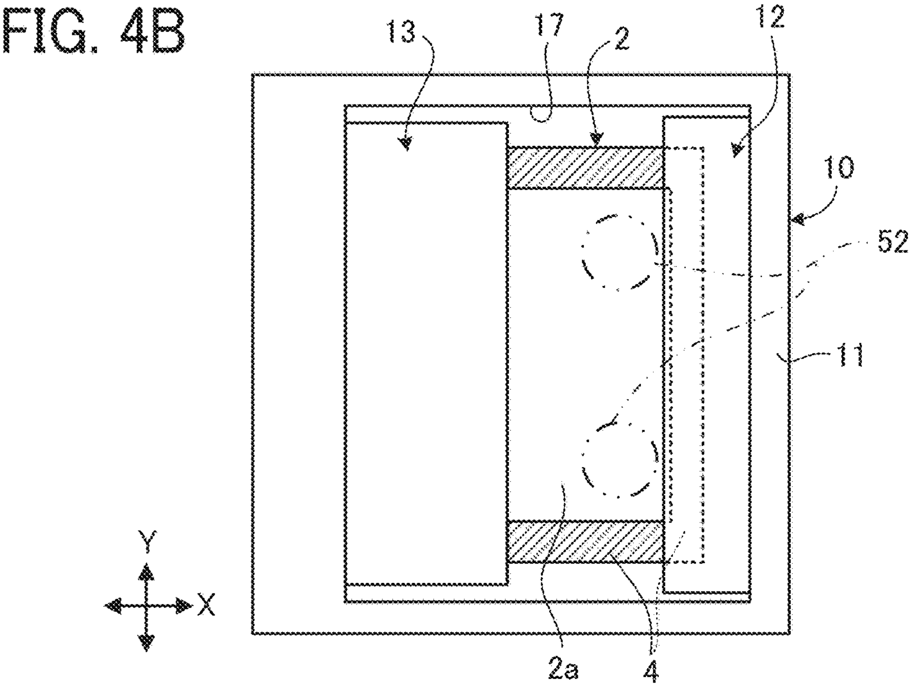
FIG. 4B is a bottom view of a container according to an embodiment of the present disclosure.

FIG. 4B is a vertical sectional view of one of the multiple cartridges 10 illustrated in FIG. 4A, according to the present embodiment.

In the vertical sectional view of the cartridge 10 of FIG. 4B, the medicine package 2 is schematically illustrated in an enlarged and exaggerated manner. For the same purpose, the hatching of the cross sections of the supporters such as the right support portion 12 and the left support portion 13 is also omitted.

For example, each one of the multiple cartridges 10 according to the present embodiment includes a casing 11, a lid 14, a pack pickup slot 17, a movable board 16, a pack posture keeper 15, and a right support portion 12 and a left support portion 13 each of which serves as a support portion, and each of these elements of the cartridge has a function as follows.

The casing 11 has a function to contain or accommodate the multiple medicine packages 2. For example, the casing 11 is integrally or separately formed using resin.

The lid 14 according to the present embodiment enables the multiple medicine packages 2 to be loaded or unloaded. The pack pickup slot 17 is formed in a lower portion or a bottom portion of the casing 11, is an opening through which the packs in one of the multiple cartridges 10 are picked up. Moreover, the pack pickup slot 17 according to the present embodiment allows the medicine package 2, which is picked up from one of the multiple cartridges 10 by the pickup unit 50 (see, for example, FIG. 1A and FIG. 1B), to pass therethrough.

The movable board 16 according to the present embodiment prevents the medicine package 2 from falling out, and makes the lowermost one of the multiple medicine packages 2 move close to the pack pickup slot 17 after the first one of the maximum number of medicine packages 2 that can be stored in the casing 11 is picked up. The pack posture keeper 15 keeps the posture of the medicine package 2. The right support portion 12 and the left support portion 13 also support or hold the medicine package 2 in the casing 11.

In the present embodiment, the to-be-picked-up portion of one of the multiple medicine packages 2 to be picked up from one of the multiple cartridges 10 by the pickup unit 50 (see, for example, FIG. 1A and FIG. 1B) is at a lower portion or bottom portion of the corresponding one of the multiple cartridges 10. In other words, the to-be-picked-up portion includes the pack pickup slot 17, and the right support portion 12 and the left support portion 13 that serve as a pair of support portions or supporting member and support, at a plurality of points, one of the multiple medicine packages 2 to be picked up from one of the multiple cartridges 10.

When one of the multiple medicine packages 2 is picked up from one of the multiple cartridges 10 by the pickup unit 50, the right support portion 12 and the left support portion 13 allow one of the multiple medicine packages 2 to pass through. On the other hand, when any one of the multiple medicine packages 2 is not to be picked up from one of the multiple cartridges 10, the multiple medicine packages 2 are to be stored and held in the casing 11. In order to achieve that, the right support portion 12 and the left support portion 13 are configured to restrict the passage of one of the multiple medicine packages 2

As described above, the right support portion 12 and the left support portion 13 that are arranged underneath one of the multiple cartridges 10 support the multiple medicine packages 2 in one of the multiple cartridges 10 such that the multiple medicine packages 2 in one of the multiple cartridges 10 do not fall from the pack pickup slot 17, and each one of the right support portion 12 and the left support portion 13 is fixed and immovable such that one of the multiple medicine packages 2 can be picked up in a stable manner from one of the multiple cartridges 10 by the pickup unit 50. The right support portion 12 and the left support portion 13 according to the present embodiment are a pair of fixation members that are fixed or integrally molded onto the pair of bottom-wall inner surfaces of the right bottom-wall edge and left bottom-wall edge of the pack pickup slot 17, respectively.

In one the multiple cartridges 10 illustrated in FIG. 4A, a pair of positions at which the pair of suction pads 52 adsorb or suck up one of the multiple medicine packages 2 stored in one of the multiple cartridges 10, as will be described later in detail, are indicated by a pair of ring-shaped dot-dot-dash lines as illustrated in FIG. 4B. Such a pair of positions may be referred to as a pair of suction pad positions in the following description. Such a pair of positions may be referred to as a pair of suction pad positions in the following description. The right support portion 12 and the left support portion 13 support the multiple medicine packages 2 in one of the multiple cartridges 10 such that the multiple medicine packages 2 in one of the multiple cartridges 10 do not fall from the pack pickup slot 17. As will be described later in detail in regard to the operation of the pickup unit 50, the right support portion 12 and the left support portion 13 have a positional relation in which one of the multiple medicine packages 2 is sucked by the pair of suction pads 52 at two suction pad positions in the Y-direction near both ends of the right support portion 12 when the lowermost one of the multiple medicine packages 2 in one of the multiple cartridges 10 is picked up while being sucked by the pair of suction pads 52. When the lowermost one of the multiple medicine packages 2 is picked up from one of the multiple cartridges 10 by the pair of suction pads 52, the two suction pad 52 pass near both ends of the right support portion 12 to suck and hold one of the multiple medicine packages 2.

As illustrated in FIG. 4A and FIG. 4B, two points at which the suction pad 52 contacts are arranged near both ends of the right support portion 12 in the Y-direction. Due to such a configuration, the possibility of an error in which the suction by the pair of suction pads 52 is disabled can be avoided and prevented, and the picking up operation can successfully be done. In other words, as both ends of the multiple medicine packages 2 are sucked by the pair of suction pads 52, the medicine package 2, which is made of film, is stretched and can withstand the deformation. Accordingly, both reliable support or holding of the multiple medicine packages 2 in one of the multiple cartridges 10 and smooth removal of one of the multiple medicine packages 2 can be achieved.

The pack posture keeper 15 is formed of sponge rubber having appropriate elasticity. The movable board 16 is made of, for example, resin or metal. The pack posture keeper 15 and the movable board 16 according to the present embodiment hold the posture of the multiple medicine packages 2 under normal operating conditions in the casing 11. As explicitly illustrated in FIG. 4A, the posture of the multiple medicine packages 2 is held orderly in the Z-direction in a substantially horizontal state.

In order to achieve the above-described function, the movable board 16 is arranged to move at least one of the multiple medicine packages 2 left in the casing 11 toward the pack pickup slot 17 as moving downward in the casing 11 in the Z-axis direction by its own weight. As illustrated in FIG. 4A, a long groove 11*a* that extends in the Z-direction with predetermined width in the X-direction is formed in the side wall of the casing 11. A shaft 16*a* with a flange is arranged at one end of the movable board 16 so as to protrude from the long groove 11*a*. As the shaft 16*a* of the movable board 16 is guided in the Z-direction parallel to the long groove 11*a*, the posture of multiple medicine packages 2 can orderly be maintained in the Z-direction in a substantially horizontal state. In FIG. 4A and FIG. 4B, the multiple medicine packages 2 in the multiple cartridges 10 are stacked on top of each other in layers in a substantially horizontal state. However, in actuality, left portions of the medicine packages 2 in FIG. 4A and FIG. 4B filled with the medicines 3 are expanding.

A set of the multiple medicine packages 2 are orderly stored in the casing 11 toward the upper side from the pack pickup slot 17 on the right support portion 12 and the left support portion 13. The timing at which the multiple medicine packages 2 are supplied into one of the multiple cartridges 10 may be, for example, the timing at which a patient who takes medicines or occupant is examined in a day-care center or nursing home, which is typically once a two weeks, or the timing at which the multiple medicine packages 2 in one of the multiple cartridges 10 run out. When some medicine packages 2 are left in one of the multiple cartridges 10 at the time of replenishment, such replenishment is continued from the back of the remaining medicine packages 2. Under normal operating conditions, the above-described setting of the multiple medicine packages 2 into one of the multiple cartridges 10 and the replenishment of the multiple medicine packages 2 are done by a staff or the like in a day-care center or nursing home. However, no limitation is indicated thereby. In particular, in configurations where cartridges are used instead of containers and setting or replenishment of the medicine packages 2 are done automatically, the setting or replenishment of the medicine packages 2 may be done differently.

The lid 14 is used by a staff or the like who works at a day-care center or nursing home to enable loading or unloading of the multiple medicine packages 2 stored in one of the multiple cartridges 10, and as illustrated in FIG. 4A, is formed with wide length in the Z-direction of the casing 11 and has a predetermined opening width. As illustrated in FIG. 4A, the types of the multiple medicine packages 2 in one of the multiple cartridges 10 are sorted or divided based on the timings at which medicines are taken. For example, one cartridge contains medicines to be taken in fourteen days in the morning by Mr. or Ms. A. In view of the above circumstances, if Mr. or Ms. A takes the medicines not only in the morning but also in the daytime or in the evening, or before going to bed, four cartridges 10 are required in total. However, no limitation is indicated thereby. For example, in an alternative embodiment of the present disclosure, a single cartridge 10 may be prepared for each person or patient who takes medicines. In such cases, for example, a pack to be used in the morning on day one, a pack to be used at lunchtime on day one, a pack to be used in the evening on day one, a pack to be used before going to bed on day one, a pack to be used in the morning on day two, a pack to be used at lunchtime on day two, and a pack to be used in the evening on day two may be stored in the order listed upward from the pack pickup slot 17 parallel to the direction in which packs are taken out from the multiple cartridges 10.

The to-be-picked-up portion of the cartridge 10 illustrated in FIG. 4A and FIG. 4B is given by way of example, and no limitation is indicated thereby. For example, a combination of a left flap portion and a right flap portion of a lap mechanism or a support portion formed of a single elastic member has also been proposed. However, in the present embodiment, each one of the right support portion 12 and the left support portion 13 is fixed and immovable such that one of the multiple medicine packages 2 can be picked up in a stable manner from one of the multiple cartridges 10 by the pickup unit 50.

First Embodiment

Embodiments of the present disclosure are described below with reference to the accompanying drawings. In particular, the first embodiment of the present disclosure is described below with reference to FIG. 5, FIG. 6A, and FIG. 6B. Firstly, the arrangement of the multiple cartridges 10, the cartridge tray 20, and the drawer 80 is described below with reference to FIG. 5.

Figure 5:
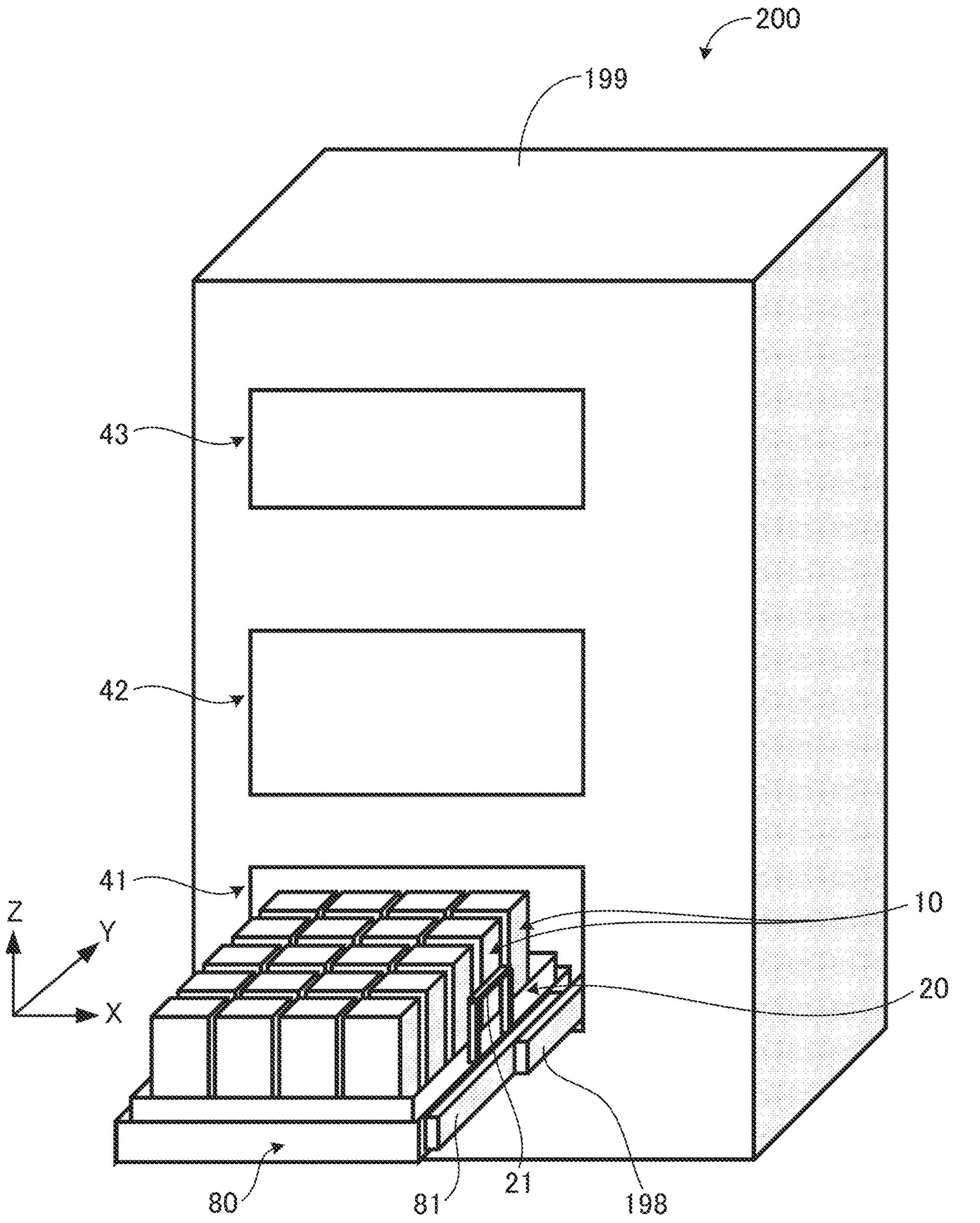
FIG. 5 is a perspective view of a cartridge, a cartridge tray, and a drawer and illustrates the arrangement of those elements, according to a first embodiment of an embodiment of the present disclosure.

FIG. 5 is a perspective view of the cartridge, the cartridge tray, and the drawer according to the present embodiment, and illustrates how these elements are arranged.

As illustrated in FIG. 5, the multiple cartridges 10 are stored in a single cartridge tray 20 through the first gate 41 of the housing 199. The cartridge tray 20 in which the multiple cartridges 10 are stored can be further held by the drawer 80.

In a similar manner to the first gate 41, the multiple cartridges 10, the cartridge tray 20, and the drawer 80 are arranged through the second gate 42.

In the medication support device 200 according to the present embodiment, when the replenishment of the medicines is performed through the pack, one of the multiple cartridges 10 stored in the housing 199 needs to be taken out and a plurality of pack filled with the medicines needs to be inserted into that cartridge 10. In so doing, there is some concern that the insertion of that cartridge 10 into the housing 199 cannot be done completely when the cartridge 10 is returned to a position such as a deep position or back of the upper stage hard to be seen from the operator. In such cases, as will be described later with reference to FIG. 8B, there is some concern that the pair of suction pads 52 provided for the pickup unit 50 cannot reach the lowermost one of the multiple medicine packages 2 in one of one of the multiple cartridges 10 and the suction by the suction pads 52 ends up in error.

In order to handle such a situation, the medication support device 200 according to the present embodiment may be adopted such that the multiple cartridges can be arranged on the cartridge tray 20 at hand of the operator and one or a plurality of packs can correctly be taken out.

When there are a plurality of patients who take medicines in, for example, a day-care center or nursing home, the number of cartridges 10 increases, and the number of times one of the multiple cartridges 10 is to be taken out from the medication support device 200 increases. Accordingly, the time for the operation tends to be long and the operation process tends to increase. More specifically, firstly, a plurality of packs each of which is filled with multiple medicines are processed on an individual basis so as not to be mixed with the medicines for other patients who take medicines. In particular, those packs are packed into each one of the multiple cartridges 10. Secondly, it is not always the case that there is a place or space where somebody can prepare the packs each of which is filled with the medicines immediately beside the medication support device 200. In such cases, when the multiple cartridges 10 are taken out from the medication support device 200 and placed on a work desk or the like, a person in charge needs to move back and forth repeatedly between the medication support device 200 and the work desk.

In order to deal with such a situation, when a plurality of cartridges 10 are stored in the cartridge tray 20, the cartridge tray 20 is picked up from the medication support device 200 through the drawer 80. By so doing, the time for the operation or the number of processes can be reduced.

In other words, a pair of slide rails 81 are attached to the outer side wall of the drawer 80, and a rail 198 of the housing 199 is disposed on the housing 199 so as to be fitted to the slide rails 81 of the drawer 80. Due to such an engagement between the rail 198 of the housing 199 and the slide rail 81, as illustrated in FIG. 5, the drawer 80 in which one of the multiple cartridge trays 20 is stored and held can be pulled out from the housing 199. More specifically, a handle for the drawer, which is arranged in front of the drawer 80, is operated or manipulated by hand to pull out the drawer 80.

A pair of handles 21 that stand on both sides of the cartridge tray 20 are arranged. By gripping and pulling out the pair of handles 21 upward in the Z-direction, the cartridge tray 20 can be easily and safely picked up from the medication support device 200 without inserting, for example, a finger into the gap between the drawer 80 and the cartridge tray 20.

By adopting a structure in which the drawer 80 is drawn out from the medication support device 200, for example, each one of the multiple drawers 80 can individually be manipulated when the drawers 80 are stacked on top of each other in a plurality of layers. Accordingly, the operability or efficiency improves.

If a plurality of drawers are directly stacked on top of each other in layers, the uppermost one of the multiple drawers 80 needs to be once removed when the lowermost one of the multiple drawers 80 is to be drawn out. By contrast, with the above multiple drawers 80 according to the present embodiment, a desired one of the layers can simply be drawn out, and thus unwanted operation or manipulation can be skipped. By adopting a structure in which the drawer 80 is drawn out from the medication support device 200 as illustrated in FIG. 5, for example, a desired one of the multiple cartridges 10 can be directly pulled out in the upward direction when one of the packs in one of the multiple cartridges 10 is to be loaded or unloaded. Accordingly, the number of steps can be reduced, and the required length of time for the operation or manipulation can be shortened.

The structure or configuration of the drawer 80 and the cartridge tray 20 are described below with reference to FIG. 6A and FIG. 6B.

Figure 6A:
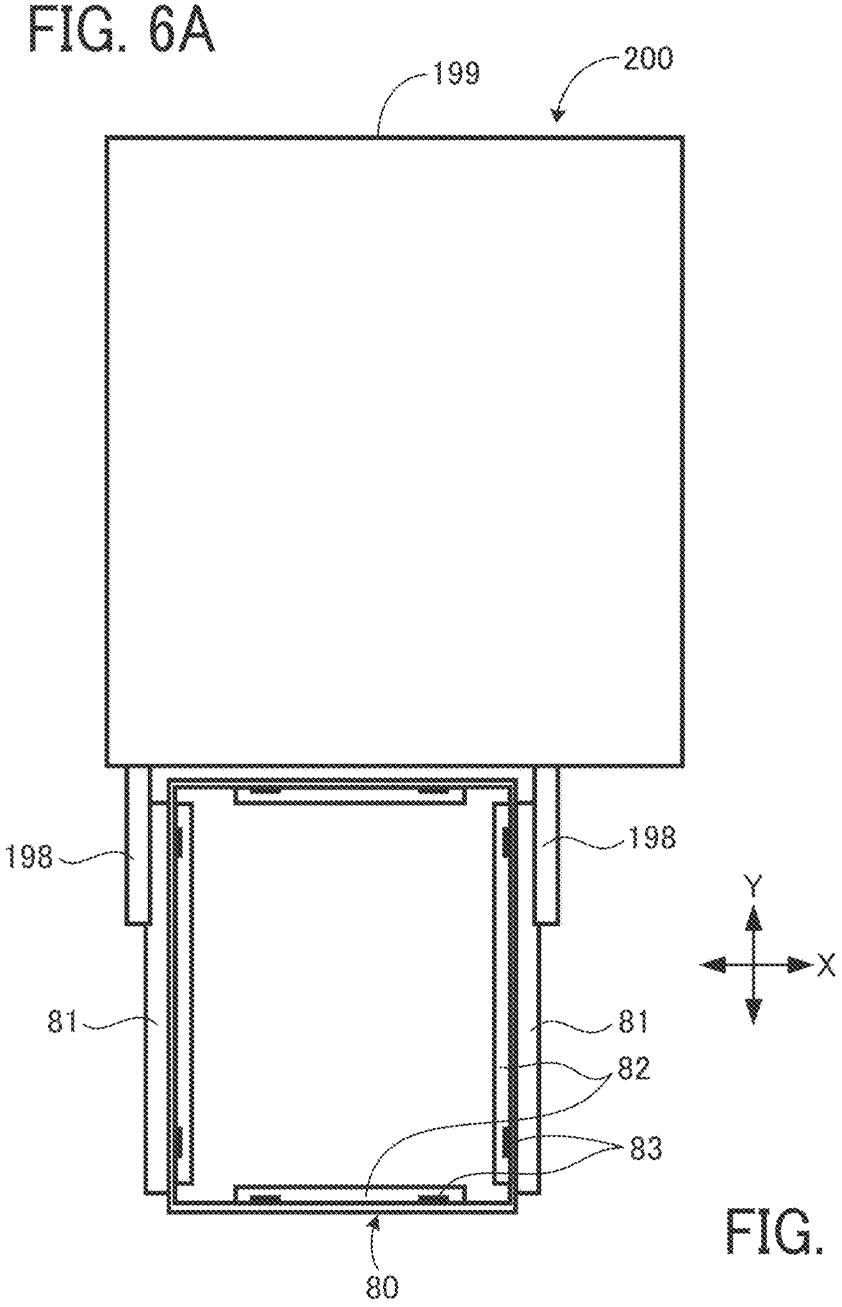
FIG. 6A is a plan view of a drawer according to the first embodiment of the present disclosure.

FIG. 6A is a plan view of the drawer 80 according to the present embodiment.

Figure 6B:
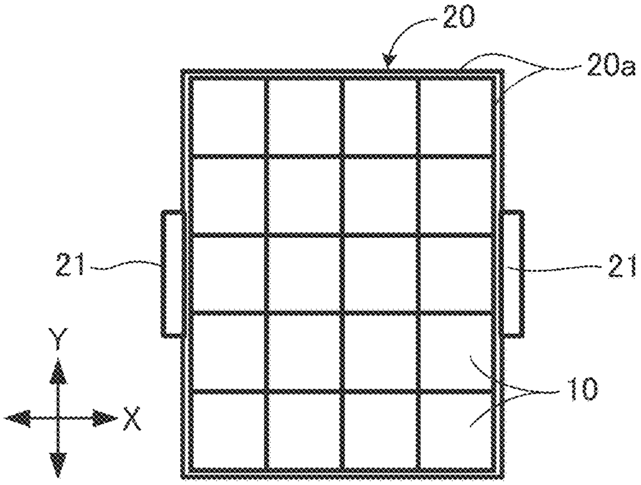
FIG. 6B is a plan view of one of a plurality of cartridge trays stored in the drawer of FIG. 6A, according to the first embodiment of the present disclosure.

FIG. 6B is a plan view of one of the multiple cartridge trays 20 stored in the drawer 80 of FIG. 6A, according to the present embodiment.

As illustrated in FIG. 6A, a plurality of cartridge-tray keepers 82 that hold the rectangular exterior walls are arranged at four positions inside the drawer 80. Such rectangular exterior walls of the cartridge tray serves as to-be-held portions 20*a* of the cartridge tray 20. The cartridge tray 20 is held in the drawer 80 at the four portions of the cartridge-tray keeper 82.

Inside the drawer 80, a plurality of cartridge positioning units 83 are arranged at eight positions such that the cartridge tray 20 can be positioned as desired.

In FIG. 6A and FIG. 6B, the multiple cartridge positioning units 83 that have a convex shape are arranged such that the position of the cartridge tray 20 in the right and left directions and the up and down directions in those drawings can be determined as desired. In the medication support device 200 according to the present embodiment, the right and left directions and the up and down directions correspond to the X-direction parallel to the right and left directions and the Y-axis direction parallel to the depth direction, respectively. The positioning of the multiple cartridges 10 in the drawer 80 is not limited to the above, and the multiple cartridges 10 may be positioned by arranging on the topside of the cartridge-tray keeper 82 a portion with a cylindrical shape and arranging on the cartridge tray 20 a slot through which the above portion with a cylindrical shape can be inserted.

As illustrated in FIG. 6B, the cartridge tray 20 can store the multiple cartridges upon positioning those cartridges 10 as desired. in FIG. 6A and FIG. 6B, twenty cartridges 10 are positioned as desired and stored. As a concrete example in which the multiple cartridges 10 are positioned as desired by the cartridge tray 20, for example, the multiple cartridges 10 may be positioned as desired as a convex portion or a rib may be arranged on each one of the multiple cartridges 10 and such a convex portion or rib may be pushed against the partition walls of the cartridge tray 20.

In FIG. 6A, the cartridge tray 20 as illustrated in FIG. 6B is placed on the cartridge-tray keeper 82 and is positioned in the drawer 80 as desired. How the cartridge tray 20 is positioned as desired and held by the drawer 80 is not limited to the way as illustrated in FIG. 6A and FIG. 6B, and may be achieved as follows. For example, the cartridge-tray keeper 82 of the drawer 80 may have a convex shape, and the cartridge tray 20 may have a hole into which the above convex shape of the cartridge-tray keeper 82 is fitted. By reducing the sizes of the convex shape and the hole, a slightly press-fitted condition is achieved. By so doing, the movement of the cartridge tray 20 in the drawer 80 can be restricted. For example, the displacement of the cartridge tray 20 when a hand of a manipulator or the like contacts or hits the cartridge tray 20 or the drawer 80 can be prevented from occurring.

The operation and configuration or structure of the pickup unit 50 is described below with reference to FIG. 7A, FIG. 7B, FIG. 8A, FIG. 8B, FIG. 8C, FIG. 8D, FIG. 8E, FIG. 8F, FIG. 9A, and FIG. 9B.

Figure 7B:
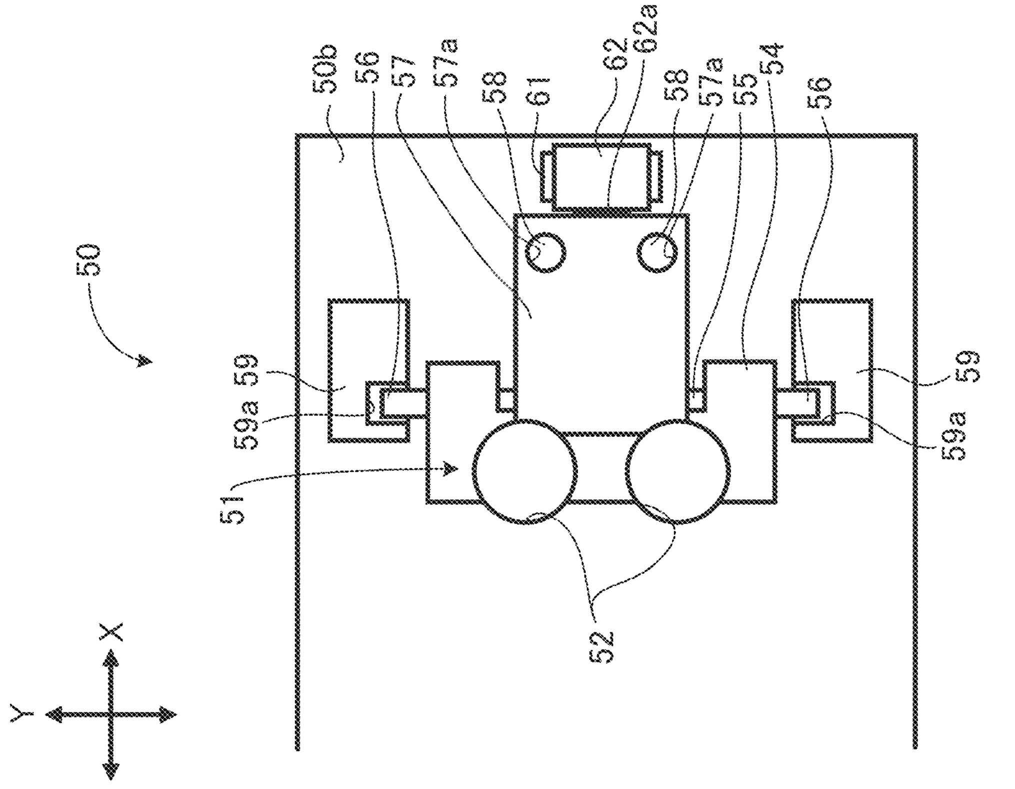
FIG. 7B is a plan view of the pickup unit illustrated in FIG. 7A, according to an embodiment of the present disclosure.
Figure 7A:
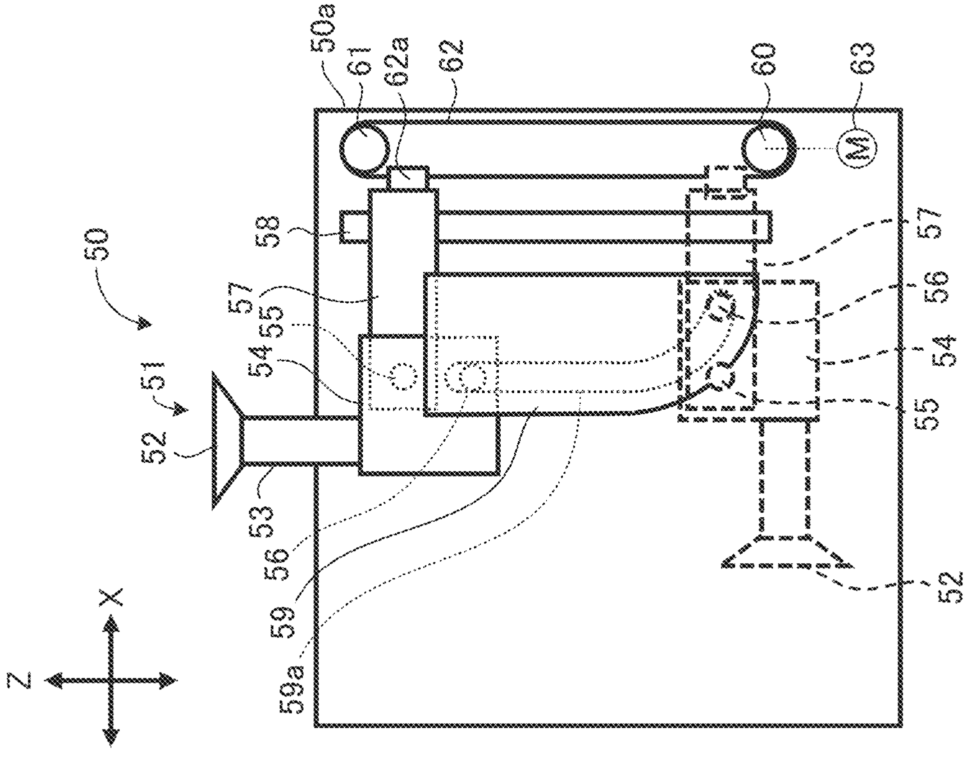
FIG. 7A is a front view of a pickup unit, illustrating a configuration or structure of the pickup unit, according to an embodiment of the present disclosure.

FIG. 7A is a front view of the pickup unit 50, illustrating a configuration or structure of the pickup unit 50, according to the present embodiment.

FIG. 7B is a plan view of the pickup unit 50 illustrated in FIG. 7A, according to the first embodiment of the present disclosure.

FIG. 8A, FIG. 8B, FIG. 8C, FIG. 8D, FIG. 8E, FIG. 8F, FIG. 9A, and FIG. 9B are front views of the pickup unit 50 illustrating the progression of the operation of the pickup unit 50, according to the present embodiment.

As illustrated in FIG. 7A and FIG. 7B, the pickup unit 50 according to the present embodiment includes a suction device 51 that picks up and holds one of the multiple medicine packages 2 from one of the multiple cartridges 10. The suction device 51 has a suction pump 48 using air (see the block diagram of FIG. 11 as will be described later in detail), and the suction pump 48 places the suction device 51 under negative pressure. By so doing, one of the multiple medicine packages 2 is successfully sucked up.

The suction pump 48 may be disposed in the pickup unit 50 or may be disposed at another portion in the medication support device 200. When the suction pump 48 is arranged inside the medication support device 200, the suction device 51 is connected to the suction pump 48 through a communicating member such as an air tube.

The suction device 51 has a suction pad 52 that communicates with the suction pump 48 and sucks one of the multiple medicine packages 2, and a suction duct 53 coupled to the pair of suction pads 52. The suction pad 52 according to the present embodiment serves as a suction unit or a suction member that sucks up and picks up one of the multiple medicine packages 2 in one of the multiple cartridges 10.

As described above, the upper ends of the pair of suction pads 52 as illustrated in FIG. 7A is arranged to absorb one of the multiple medicine packages 2. The bottom ends of the pair of suction pads 52 as illustrated in FIG. 7A is attached and fixed to the upper end of the suction duct 53 as illustrated in FIG. 7A. The bottom end of the suction duct 53 as illustrated in FIG. 7A is attached and fixed to the rotation base 54. A pair of suction pads 52 and suction ducts 53 are arranged in the Y-direction.

The pickup unit 50 according to the present embodiment is provided with a posture changing unit used to change the posture of one of the multiple medicine packages 2 picked up from one of the multiple cartridges 10 to a substantially vertical posture. The posture changing unit in the pickup unit 50 may include, for example, a rotation base 54 coupled to a fixation member 57 through a rotation axis 55, a guide unit 59 formed with a guide groove 59*a* having a specific shape, a guide axis 56 that is consistently fitted into the guide groove 59*a* of the guide unit 59 to guide the rotation base 54, and a suction unit lifting and lowering unit.

The rotation base 54 is coupled to the fixation member 57 through the rotation axis 55. The rotation base 54 may be may rotatably or pivotably be arranged around the rotation axis 55 fixed to the rotation base 54 within a range of a predetermined angle. Alternatively, the rotation base 54 may be may rotatably or pivotably be arranged around the rotation axis 55 fixed to the fixation member 57. In other words, in FIG. 7A and FIG. 7B, the distance between the center of the rotation axis 55 and the center of a guide rod 58 in the X-direction is kept constant at all times when the fixation member 57 moves along the guide rod 58 in the up and down directions parallel to the Z-direction. The guide rod 58 will be described later in detail.

The suction pad lifting and lowering unit includes a pair of guide rods 58 that are arranged separately in the Y-direction and guides the fixation member 57 in the Z-direction, an endless belt 62 looped around a driving pulley 60 and a driven pulley 61, and a suction device lifting and lowering motor 63 coupled to the driving pulley 60 through a driving power conveyor such a gear or a belt. The suction device lifting and lowering motor 63 according to the present embodiment serves as a driver circuit or a driving source of the suction pad lifting and lowering unit.

The fixation member 57 according to the present embodiment is coupled and fixed to the endless belt 62 at a belt grip 62*a* fixed to the right end of the fixation member 57. The pair of guide rods 58 are arranged at two different positions in the Y-direction, and extend in the Z-direction. The bottom ends of those guide rods 58 are fixed to the base frame 50*b* of the picking-up frame 50*a* provided for the pickup unit 50. A pair of guiding holes 57*a* into which the pair of guide rods 58 are inserted are formed around a right end of the fixation member 57.

The pulley axis of each one of the driving pulley 60 and the driven pulley 61 is rotatably supported by an immovable member on the picking-up frame 50*a*. The suction device lifting and lowering motor 63 is fixed to an immovable member provided for the picking-up frame 50*a* of the pickup unit 50.

When the fixation member 57 is lifted or lowered by the operation of the suction device lifting and lowering motor 63, the fixation member 57 is moved along the pair of guide rods 58 in the Z-direction. Accordingly, the posture of the fixation member 57 on the XY plane can be kept constant in a substantially horizontal state. The suction unit lifting and lowering unit is not limited to the above-described up-and-down reciprocating mechanism driven by a belt. Alternatively, for example, the suction unit lifting and lowering unit may have a reciprocating linear motion mechanism using a rack and pinion.

A pair of guide units 59 are arranged on both sides of the suction device 51 in the Y-direction with the rotation base 54 interposed therebetween, and the bottom ends of the pair of guide units 59 are fixed to the base frame 50*b*. The guide axis 56 is provided so as to protrude from both ends of the rotation base 54 in the Y-direction, and is provided so as to be always fitted into the guide groove 59*a* of the guide unit 59 to guide the rotation base 54. As illustrated in FIG. 7A, the guide axis 56 is provided below the rotation axis 55 of the rotation base 54 in the Z-direction with a certain distance from the rotation axis 55.

When the fixation member 57 is moved in the Z-direction by the operation of the suction device lifting and lowering motor 63, the guide axis 56 of the rotation base 54 is moved in the Z-direction parallel to the guide groove 59*a* having a specific shape while maintaining the posture of the fixation member 57 on the XY plane constant in a substantially horizontal state. Due to such a configuration, the posture of the suction pad 52 can be rotated by approximately 90 degrees. In FIG. 7A, the suction device 51 that is rotated by approximately 90 degrees is indicated by thick broken lines.

In the present embodiment, the expression "substantially horizontal state" indicates that the posture of a particular element is within a specific range of tolerance for angle with respect to the horizontal in addition to a state in which the position of a particular element is horizontal. The guide groove 59*a* having a specific shape includes the first guide groove portion that extends in the Z-direction with relatively great length so as to hold the posture of the pair of suction pads 52 upward as indicated by solid lines in FIG. 7A through the rotation base 54 in a substantially horizontal state as guided by the guide axis 56, and the second guide groove portion that gently draw an obtuse and shallow arc to the right side as it goes downward to rotate the posture of the rotation base 54 and the pair of suction pads 52 by approximately 90 degrees. The first guide groove portion and the second guide groove portion communicate with each other and are coupled to each other.

The operation of the pickup unit 50 is described below with reference to FIG. 8A, FIG. 8B, FIG. 8C, FIG. 8D, FIG. 8E, FIG. 8F, FIG. 9A, and FIG. 9B. For the sake of explanatory convenience, it is assumed in the present embodiment that by the operation of the conveyance unit 90 illustrated in FIG. 1A and FIG. 1B, the pickup unit 50 is arranged below the cartridge tray 20 held by the upper one of the pair of drawers 80 arranged at an uppermost portion and a lower portion of the housing 199 illustrated in FIG. 1A and FIG. 1B. In the present embodiment, it is assumed that the cartridges illustrated in FIG. 4A and FIG. 4B and the multiple cartridge trays illustrated in, for example, FIG. 5 are used as the multiple cartridges 10 and the multiple cartridge trays 20, respectively. As illustrated in FIG. 8A, the pickup unit 50J is moved under the cartridge tray 20 that stores one of the multiple cartridges 10 by the operation made by the conveyance unit 90 illustrated in FIG. 1A and FIG. 1B, and stops moving. Under such conditions, the suction device lifting and lowering motor 63 of the suction unit lifting and lowering unit is stopped, and the pair of suction pads 52 are positioned under the position of the top face of the pickup unit, which indicates the position of the top face of the picking-up frame 50*a* of the pickup unit 50. Subsequently, as illustrated in FIG. 8B, the pair of suction pads 52 are moved upward by the operation of the suction device lifting and lowering motor 63, and enters from the pack pickup slot 17 between the right support portion 12 and the left support portion 13. Then, as soon as the pair of suction pads 52 contact one of the multiple medicine packages 2 at the bottom of one of the multiple cartridges 10, and the pair of suction pads 52 suck that medicine package 2. In so doing, the suction pump 48 as described above is driven to operate in advance so that the suctioning operation can be performed.

Figure 8C:
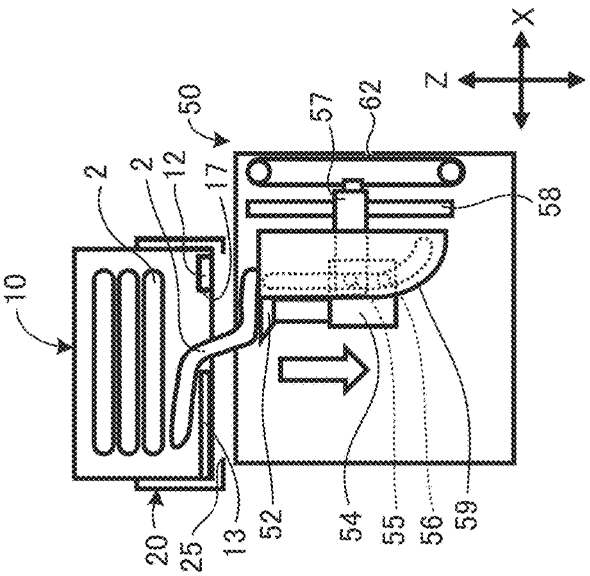
FIG. 8A, FIG. 8B, FIG. 8C, FIG. 8D, FIG. 8E, and FIG. 8F are front views of a pickup unit illustrating the progression of the operation of the pickup unit, according to an embodiment of the present disclosure.
Figure 8B:
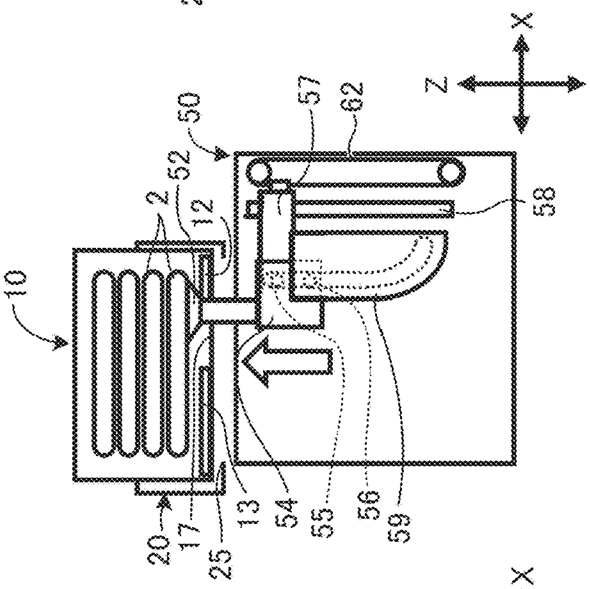
Figure 8A:
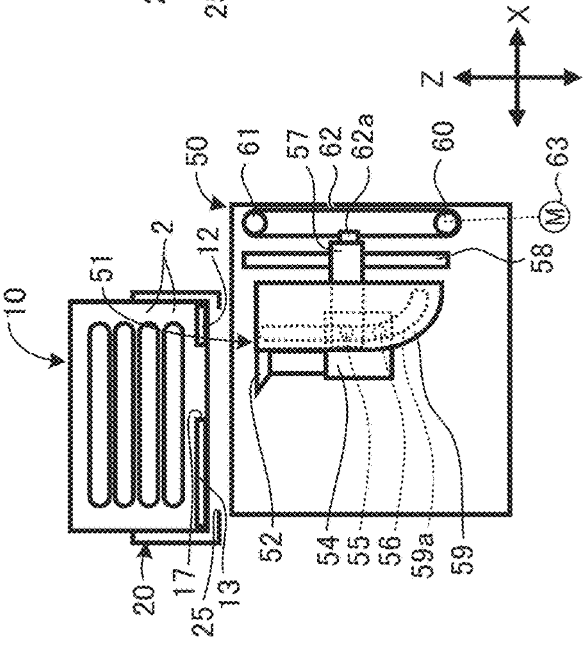

Subsequently, as illustrated in FIG. 8C, as the suction device lifting and lowering motor 63 is reversely operated, the pair of suction pads 52 move downward while sucking one of the multiple medicine packages 2 by the pair of suction pads 52, and the front end of one of the multiple medicine packages 2 is pulled out from one of the multiple cartridges 10. The front end of the medicine package indicates a side of the medicine package to be absorbed or sucked up by the pair of suction pads 52, and the same applies in the following description.

Figures 8D, 8E, 8F:
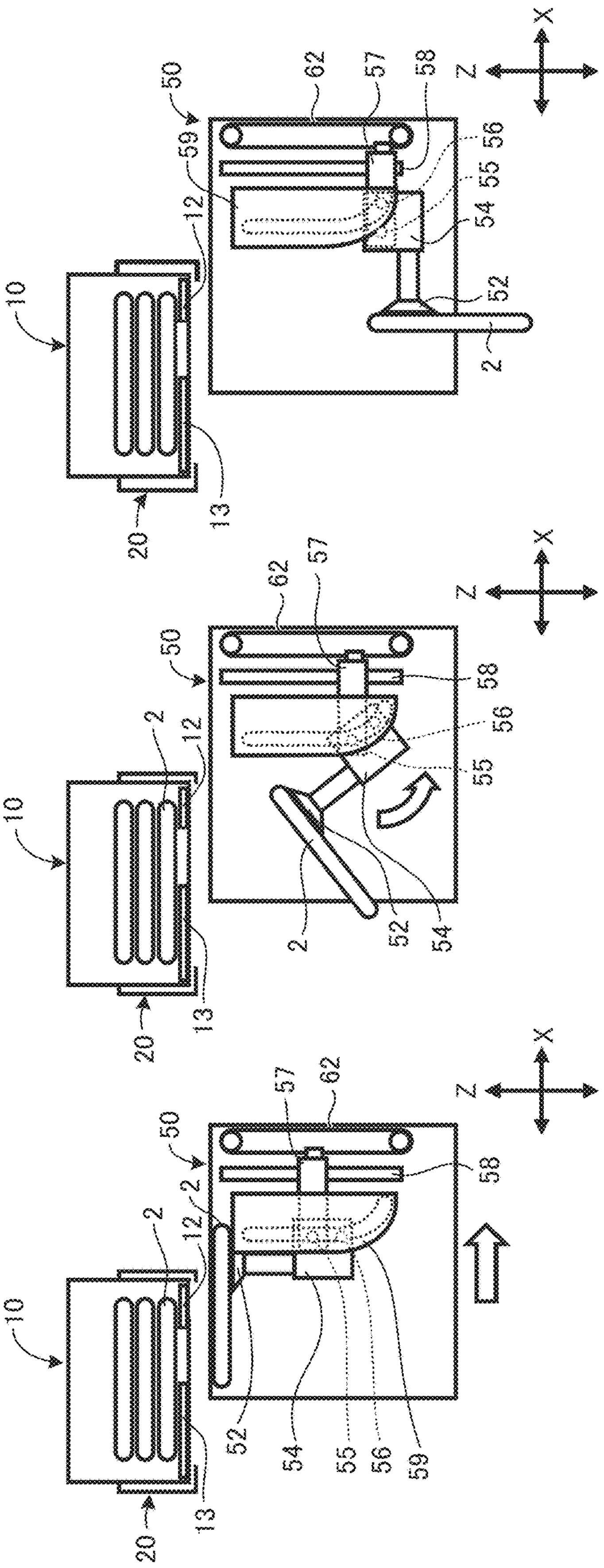

Subsequently, as illustrated in FIG. 8D, by the operation of the conveyance unit 90 (see FIG. 1A and FIG. 1B), the pickup unit 50 is moved in the X-direction, which is the lateral direction, and the rear end of one of the multiple medicine packages 2 is drawn out or picked up from one of the multiple cartridges 10. Immediately after that, as illustrated in FIG. 8E and FIG. 8F, by the operation of the suction device lifting and lowering motor 63, one of the multiple medicine packages 2, which is approximately in a horizontal state and is sucked and held by the pair of suction pads 52, is rotated by substantially 90 degrees to change the posture to an approximately vertical or upright posture. In such rotational operation, the rotation axis 55 that is arranged on the rotation base 54 moves along the guide groove 59*a* of the guide unit 59. Accordingly, the posture of one of the multiple medicine packages 2 can be changed from an approximately horizontal posture to an approximately vertical posture. The above series of operation in the above configuration may be achieved by a series of operation performed by a single suction device lifting and lowering motor 63.

Figure 9A:
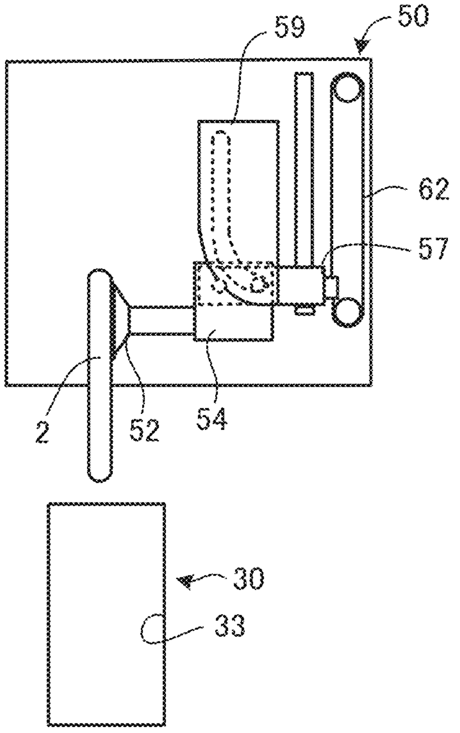
FIG. 9A and FIG. 9B are front views of the pickup unit illustrating the progression of the operation of the pickup unit subsequent to the progression illustrated in FIG. 8A, FIG. 8B, FIG. 8C, FIG. 8D, FIG. 8E, and FIG. 8F, according to an embodiment of the present disclosure.
Figure 9B:
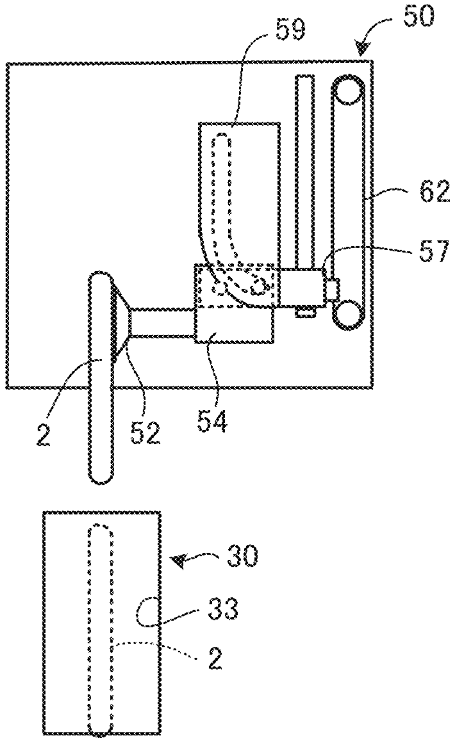

Subsequently, as illustrated in FIG. 9A, once the pickup unit 50 that includes the pair of suction pads 52 and holds one of the multiple medicine packages 2 in a substantially vertical posture is carried by the conveyance unit 90 to a position substantially directly above the position where multiple medicine dispensing trays 30 are arranged, the operation of the above suction pump 48 is terminated. As a result, the suction holding of one of the multiple medicine packages 2 by the pair of suction pads 52 is released, and one of the multiple medicine packages 2 is inserted into one of the multiple partitions 33 that is a predetermined position in one of the multiple medicine dispensing trays 30 (see FIG. 9B).

After the above-described operation is performed a plurality of times and a desired one of the multiple medicine packages 2 is inserted into one of the multiple partitions 33 that is at a predetermined position of one of the multiple medicine dispensing trays 30, one of the multiple medicine dispensing trays 30 is ejected to the outside of the medication support device 200 through the third gate 43, and is received by a staff or the like in a day-care center or nursing home or a medication assistant.

In the above embodiments of the present disclosure, when desired one of the multiple medicine packages 2 is picked up from one of the multiple cartridges 10, the pickup unit 50 is positioned under one of the multiple cartridges 10, and such desired one of the multiple medicine packages 2 is taken out in the downward direction of one of the multiple cartridges 10. When one of the multiple medicine packages 2 is taken out from the lower side of one of the multiple cartridges 10 as described above, the next one of the multiple medicine packages 2 automatically moves downward or toward the pack pickup slot 17 due to the self-weight of the movable board 16 and the multiple medicine packages 2 left in the cartridge 10. Due to such a configuration, the pickup unit 50 can perform the same operation with a relatively simple configuration regardless of the number of the multiple medicine packages 2 left in the cartridge 10.

The configuration and operation of the conveyance unit 90 is described below with reference to FIG. 10A and FIG. 10B.

Figure 10B:
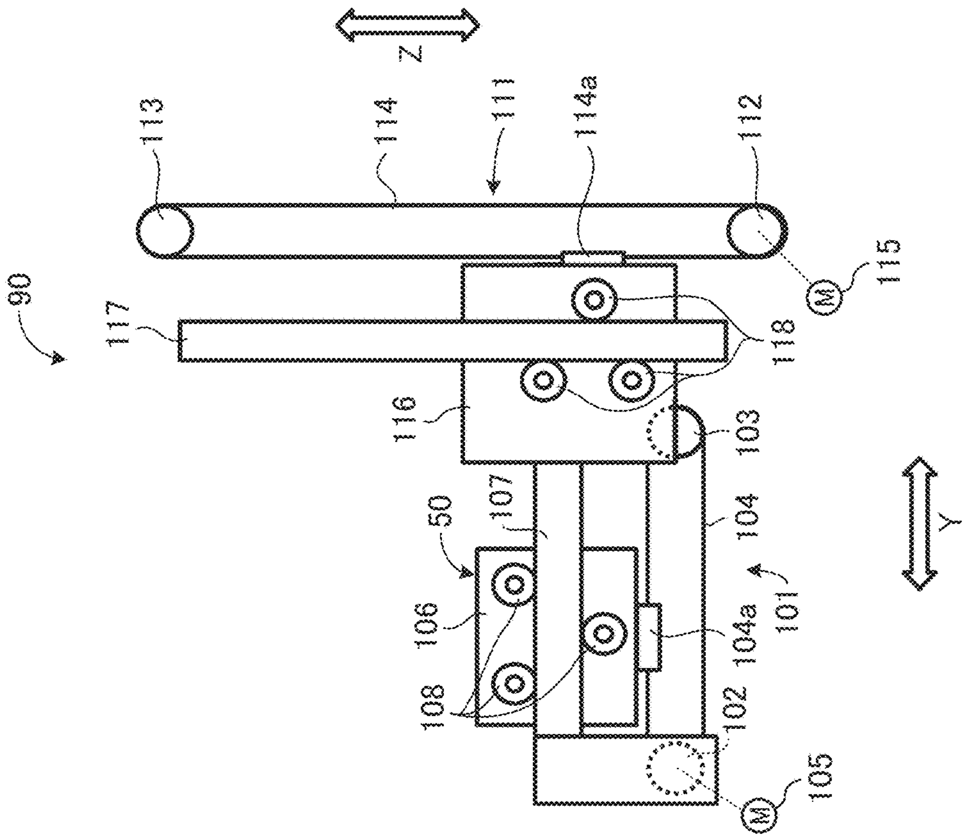
FIG. 10B is a side view of the conveyance unit illustrated in FIG. 10A, according to an embodiment of the present disclosure.
Figure 10A:
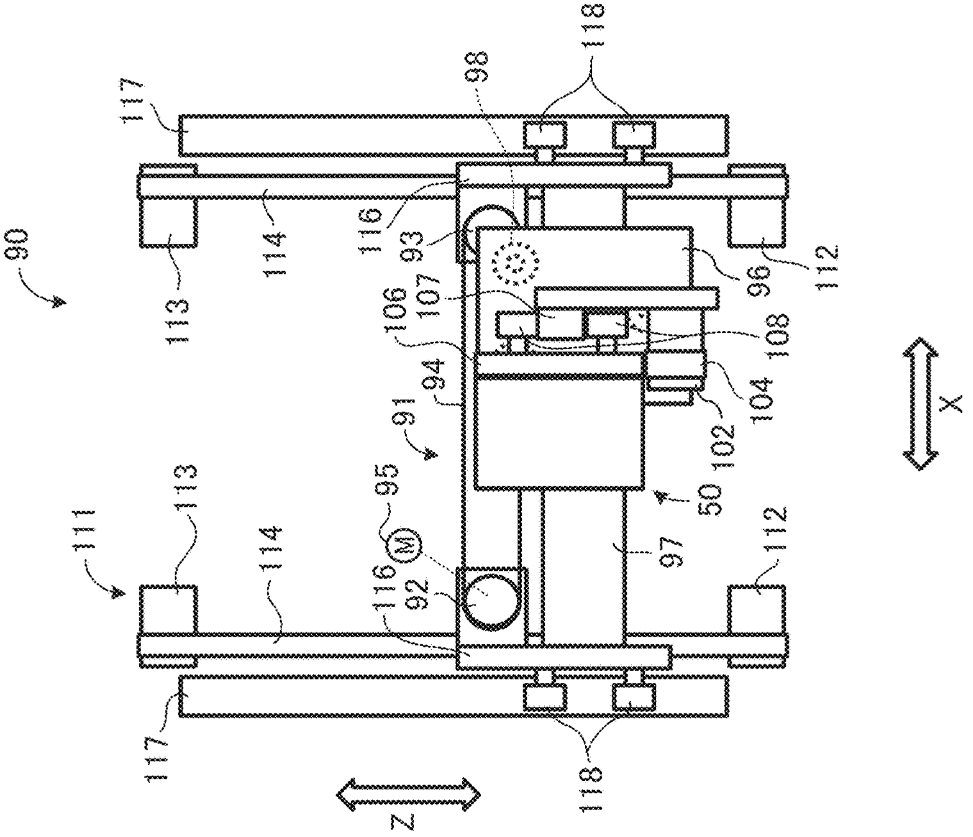
FIG. 10A is a front view of a conveyance unit illustrating a schematic configuration of the conveyance unit, according to an embodiment of the present disclosure.

FIG. 10A is a front view of the conveyance unit 90 illustrating a schematic configuration of the conveyance unit 90, according to the present embodiment.

FIG. 10B is a side view of the conveyance unit 90 illustrated in FIG. 10A, according to the present embodiment.

As in the configuration or structure of the medication support device 200 illustrated in FIG. 1A and FIG. 1B, the multiple cartridges 10 are aligned in a row on a plane under the medicine dispensing tray 30 in the Z-direction, and the medicine dispensing tray 30 is arranged at an uppermost portion of the housing 199 and further above the upper portion of the cartridges 10. In view of these circumstances, the pickup unit 50 is configured to move in three directions of the X-direction, the Y-direction, and the Z-direction. As described above, the conveyance unit 90 moves the pickup unit 50 in the X-direction, in the Y-direction, and in the Z-direction in order to convey one of the multiple medicine packages 2 picked up from one of the multiple cartridges 10 by the pickup unit 50 and pass it to one of the multiple medicine dispensing trays 30.

The pickup unit 50 is moved in the X-direction by an X-direction conveyance unit 91, and the pickup unit 50 is moved in the Y-direction by a Y-direction conveyance unit 101. The pickup unit 50 is moved in the Z-direction by a Z-direction conveyance unit 111. These three conveyance units have a similar configuration or structure.

The X-direction conveyance unit 91 according to the present embodiment includes a X-adaptor 96 attached to the pickup unit 50, a X-guide unit 97 that guides the pickup unit 50 in the X-direction through the X-adaptor 96, an endless belt 94 looped around a driving pulley 92 and a driven pulley 93, and a X-direction conveyance motor 95 coupled to the driving pulley 92 through a driving force conveyor such as a gear or a belt.

As illustrated in FIG. 10B, three rollers 98 are attached to the X-adaptor 96 so as to clamp the X-guide unit 97. Due to such a configuration, the X-adaptor 96 can roll over the X-guide unit 97. Note that, in FIG. 10A, two of the three rollers 98 are hidden by the pickup unit 50. The X-adaptor 96 is fixedly coupled to the endless belt 94 through a belt grip.

With the above-described configuration of the X-direction conveyance unit 91, as the X-direction conveyance motor 95 is driven, the driving force is conveyed to the endless belt 94 through the driving force conveyor and the driving pulley 92. Accordingly, the endless belt 94 rotates, and the pickup unit 50 moves in the X-direction parallel to the X-guide unit 97 together with the X-adaptor 96.

The Y-direction conveyance unit 101 according to the present embodiment includes a Y-adaptor 106 attached to the pickup unit 50, a Y-guide unit 107 that guides the pickup unit 50 in the Y-direction through the Y-adaptor 106, an endless belt 104 looped around a driving pulley 102 and a driven pulley 103, and a Y-direction conveyance motor 105 coupled to the driving pulley 102 through a driving force conveyor such as a gear or a belt.

As illustrated in FIG. 10B, three rollers 108 are attached to the Y-adaptor 106 so as to clamp the Y-guide unit 107. Due to such a configuration, the Y-adaptor 106 can roll over the Y-guide unit 107. The Y-adaptor 106 is coupled and fixed to the endless belt 104 through the belt grip 104*a*.

With the above-described configuration of the Y-direction conveyance unit 101, as the Y-direction conveyance motor 105 is driven, the driving force is conveyed to the endless belt 104 through the driving force conveyor and the driving pulley 102. Accordingly, the endless belt 104 rotates, and the pickup unit 50 moves in the Y-direction parallel to the Y-guide unit 107 together with the Y-adaptor 106.

The Z-direction conveyance unit 111 includes a pair of Z-adaptors 116 attached to both ends of the X-guide unit 97 in the X-direction, a pair of Z-guide units 117 that guide the pickup unit 50 in the Z-direction through the X-guide unit 97 and the pair of Z-adaptors 116, a pair of endless belts 114 each of which is looped around one of a pair of driving pulley 112 and one of a pair of driven pulleys 113, and a Z-direction conveyance motor 115 coupled to the pair of driving pulleys 112 through a driving force conveyor such as a gear or a belt. In the Z-direction conveyance unit 111, the pair of driving pulleys 112, the pair of driven pulleys 113, and the pair of endless belts 114 are arranged on both sides in the X-direction, respectively. By contrast, the Z-direction conveyance motor 115 is provided for only on one of the pair of driving pulleys 112. As illustrated in FIG. 10B, three rollers 118 are attached to each one of the pair of Z-adaptors 116 so as to clamp corresponding one of the pair of Z-guide units 117. Due to such a configuration, the pair of Z-adaptors 116 can roll over the pair of Z-guide units 117, respectively. The pair of Z-adaptors 116 are coupled and fixed to the pair of endless belts 114 through a pair of belt grips 114*a*, respectively.

With the above-described configuration of the Z-direction conveyance unit 111, as the Z-direction conveyance motor 115 is driven, the driving force is conveyed to the pair of endless belts 114 through the driving force conveyor and the driving pulley 112. Accordingly, the pair of endless belts 114 rotates, and the pickup unit 50 moves in the Z-direction parallel to the Z-guide unit 117 together with the X-guide unit 97 and the Z-adaptor 116.

In FIG. 10A and FIG. 10B, the pickup unit 50 is configured to move in the triaxial directions including the X-axis direction, the Y-axis direction, and the Z-axis direction. However, no limitation is indicated thereby. For example, when the multiple cartridges 10 are arranged above the pickup unit 50 and the multiple medicine dispensing trays 30 are arranged below the pickup unit 50, the pickup unit 50 only needs to move in the X-direction and the Y-direction. In such cases, the number of axes of motion can be reduced by one.

A control structure for the medication support device 200 according to the present embodiment is described below with reference to FIG. 11.

Figure 11:
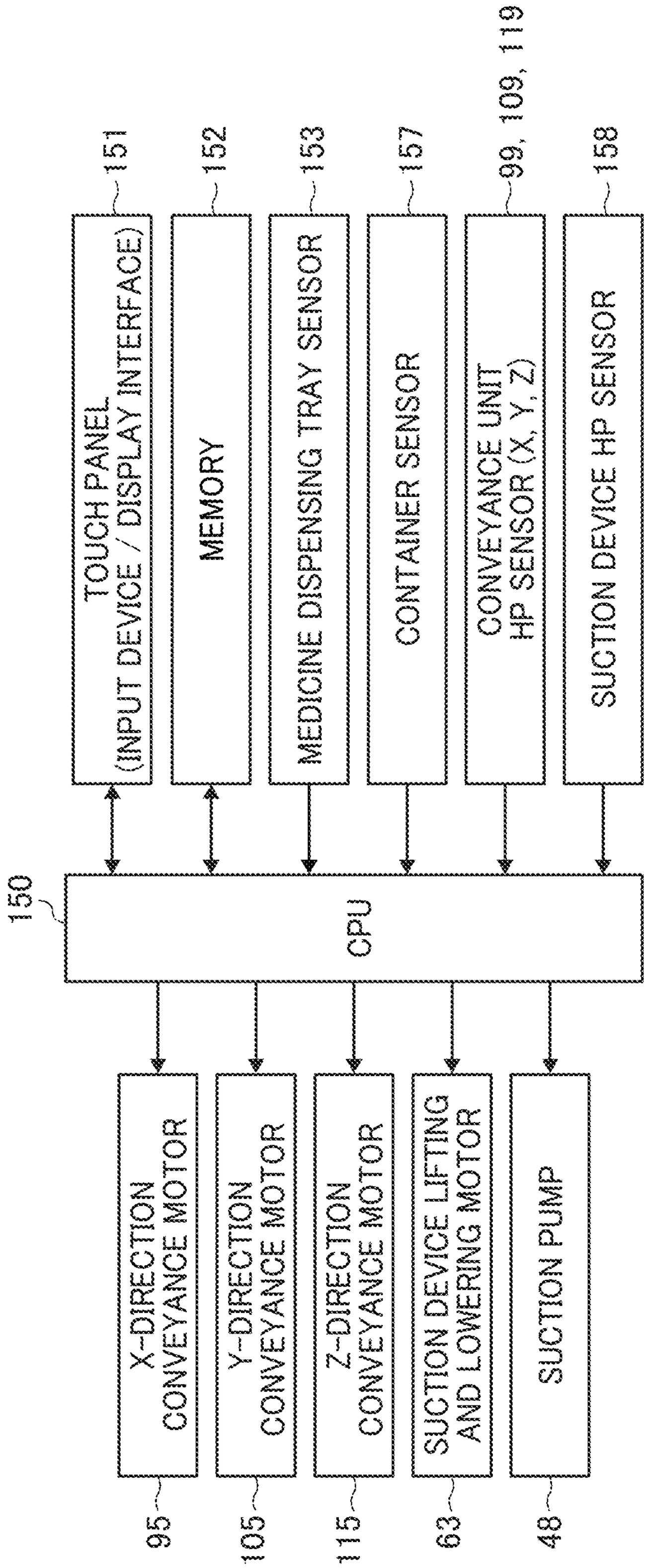
FIG. 11 is a control block diagram illustrating a schematic control structure for a medication support device according to an embodiment of the present disclosure.

FIG. 11 is a control block diagram illustrating a schematic control structure for the medication support device 200 according to the present embodiment.

As illustrated in FIG. 11, the medication support device 200 includes a central processing unit (CPU) that serves as a controller 150 that controls the operation of, for example, the components or elements of the medication support device 200. For example, the CPU may be provided with a built-in memory or a built-in timer. The CPU according to the present embodiment may provide notification to a staff or the like at a timing consistent with the program or may instruct the medication support device 200 to perform particular operation, based on various kinds of input such as the inputs from a sensor as will be described later in detail.

The CPU may have, for example, a computing or control function, and a timer or clocking function. A memory 152 includes, for example, a read-only memory (ROM), a random access memory (RAM), and an external memory. The ROM stores, for example, a program readable by the above CPU and various kinds of data in advance. Such a program stored in the ROM may be a program used in the flowchart of the controlling processes as will be described later in detail. The above various kinds of data may be, for example, the data about the relation between the multiple medicine packages 2 and the multiple partitions 33 of one of the multiple medicine dispensing trays 30 allocated to each of the patients who take medicines, the data about the relation between the multiple medicine packages 2 and the multiple partitions 33 of one of the multiple medicine dispensing trays 30 assigned to each one of the times of medication, or the data about the relation between the multiple medicine packages 2 and the multiple partitions 33 of one of the multiple medicine dispensing trays 30 sorted according to the order in which medicines are to be taken.

The CPU according to the present embodiment has an input and output (I/O) port, and a touch panel 151 that serves as a user interface (UI) is electrically connected to that input and output port of the CPU. However, no limitation is intended thereby, and the touch panel 151 may be, for example, a combination of an input device and a display interface that are arranged separately. For example, a combination of a keyboard and a light-emitting diode (LED) display may be used as the touch panel 151.

The CPU according to the present embodiment has an input port, and a medicine dispensing tray sensor 153 that detects the type of medicine dispensing tray 30 stored in the medication support device 200 or determines whether or not there is any medicine dispensing tray 30, and a container sensor 157 that determines whether or not there is any cartridge 10 are electrically connected to the input port of the CPU.

Moreover, to the input port of the CPU, a conveyance unit home position (HP) sensor 99 that detects the home position (HP) of the X-direction conveyance unit 91 in the pickup unit 50, a conveyance unit home position (HP) sensor 109 that detects the home position (HP) of the Y-direction conveyance unit 101 in the pickup unit 50, and a conveyance unit home position (HP) sensor 119 that detects the home position (HP) of the Z-direction conveyance unit 111 in the pickup unit 50 are electrically connected. Note that such a home position (HP) of each conveyance unit may be abbreviated to HP in the following description.

Further, to the input port of the CPU, a suction device home position (HP) sensor 158 that detects the home position (HP) of the suction pad 52 of the suction device 51 in the pickup unit 50 is electrically connected.

To the output port of the CPU, the suction pump 48, the suction device lifting and lowering motor 63, the X-direction conveyance motor 95 of the X-direction conveyance unit 91, the Y-direction conveyance motor 105 of the Y-direction conveyance unit 101, and the Z-direction conveyance motor 115 of the Z-direction conveyance unit 111 are electrically connected.

To the output port of the CPU, a notification unit may be electrically connected. Such a notification unit reports what sort of state or conditions the components or elements of the medication support device 200 are in by means of, for example, the light emitted from a light-emitting diode (LED) and the sound or vibration including voice. Moreover, such a notification unit may be provided with, for example, a loudspeaker or a light that indicates that the medicines are to be taken so that the staff or the like away from the medication support device 200 can be notified of such a time of medication.

Once the input data from the touch panel 151 and various kinds of signals from various types of sensors are input to the CPU, a command signal is newly output from the CPU. In other words, the CPU outputs a command signal used to control the audio device or the optical device of the display device of the touch panel 151 including the above notification unit, the suction pumps 48, the suction device lifting and lowering motor 63, the X-direction conveyance motor 95, the Y-direction conveyance motor 105, and the Z-direction conveyance motor 115.

The CPU according to the present embodiment has a function to execute the control operation as will be described later in detail in the following description or the flowchart of the controlling processes.

An overall operation flow of the medication support device 200 according to the present embodiment is described below with reference to FIG. 12A-1, FIG. 12A-2, FIG. 12A-3, FIG. 12A-4, FIG. 12A-5, FIG. 12A-6, FIG. 12B, and FIG. 12C. The above operation is executed based on the control commands sent from the CPU of the controller 150.

Figures 1, 12A:
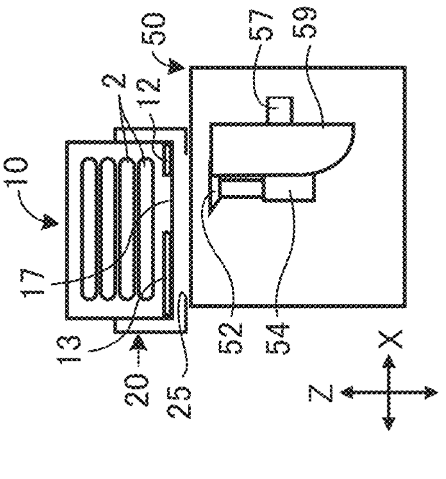
Figures 2, 12A:
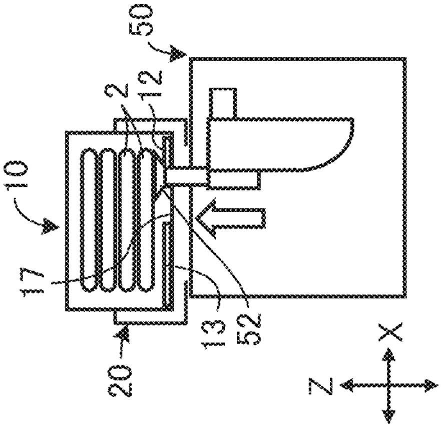
Figures 3, 12A:
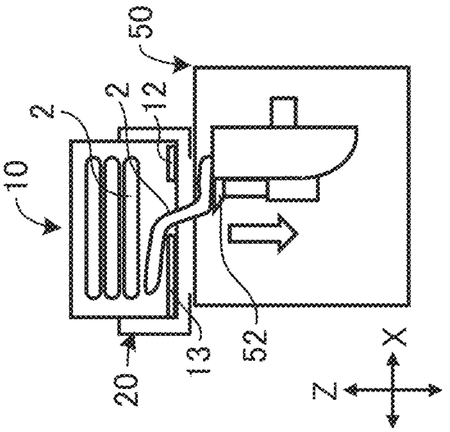
Figures 4, 12A:
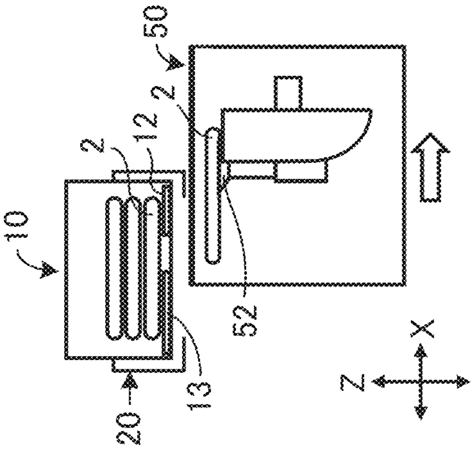
Figures 5, 12A:
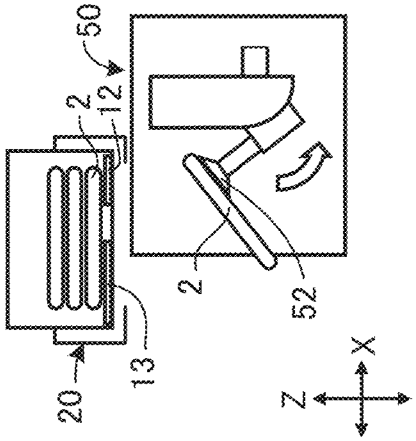
Figures 6, 12A:
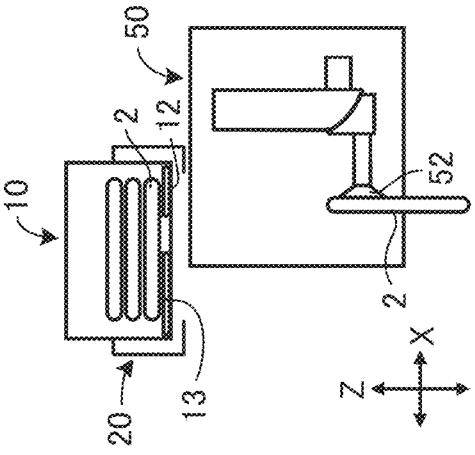

The operation that is described above with reference to FIG. 8A, FIG. 8B, FIG. 8C, FIG. 8D, FIG. 8E, and FIG. 8F is further described in detail with reference to FIG. 12A-1, FIG. 12A-2, FIG. 12A-3, FIG. 12A-4, FIG. 12A-5, and FIG. 12A-6. The operating status illustrated in FIG. 12A-6 illustrates a state in which the posture of the pair of suction pads 52 sucking and holding one of the multiple medicine packages 2 picked up from one of the multiple cartridges 10 is rotated by approximately 90 degrees. As illustrated in FIG. 12B, the medicine package 2 that has been taken out is held by the pair of suction pads 52 of the pickup unit 50 in the same posture as that illustrated in FIG. 12A-6. As illustrated in FIG. 12B, the pickup unit 50 that includes the pair of suction pads 52 and holds one of the multiple medicine packages 2 is conveyed by the conveyance unit 90 along the route indicated by thick broken lines to the medicine dispending position where multiple medicine dispensing trays 30 are arranged. When the pickup unit 50 is carried to a position substantially directly above the multiple medicine dispensing trays 30 at the medicine dispending position, the operation of the suction pump 48 is terminated. As a result, the suction holding of one of the multiple medicine packages 2 by the pair of suction pads 52 is released, and one of the multiple medicine packages 2 is inserted into one of the multiple partitions 33 that is a predetermined position in one of the multiple medicine dispensing trays 30.

Figure 12C:
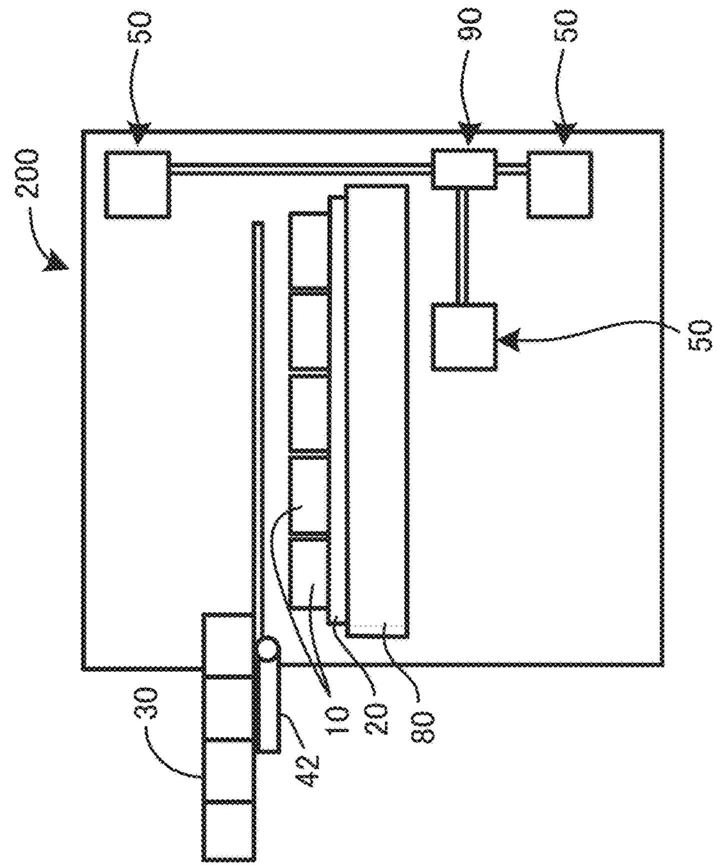
Figure 12B:
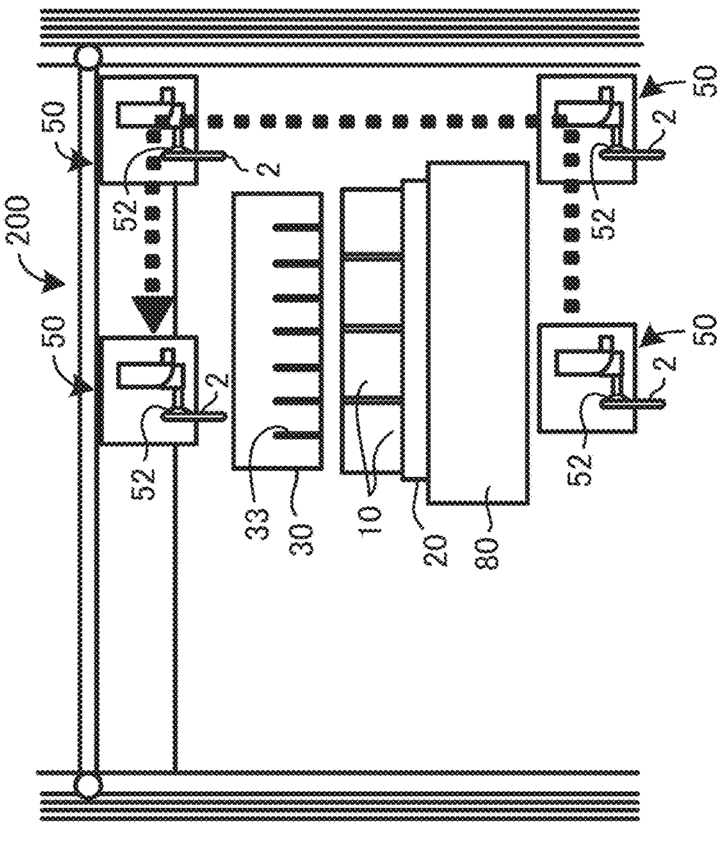

After the above-described operation is performed a plurality of times and a desired one of the multiple medicine packages 2 is inserted into one of the multiple partitions 33 that is at a predetermined position of one of the multiple medicine dispensing trays 30, as illustrated in FIG. 12C, one of the multiple medicine dispensing trays 30 is ejected to the outside of the medication support device 200 through, for example, the third gate 43, and is received by a staff or the like in a day-care center or nursing home or a medication assistant.

Figure 13:
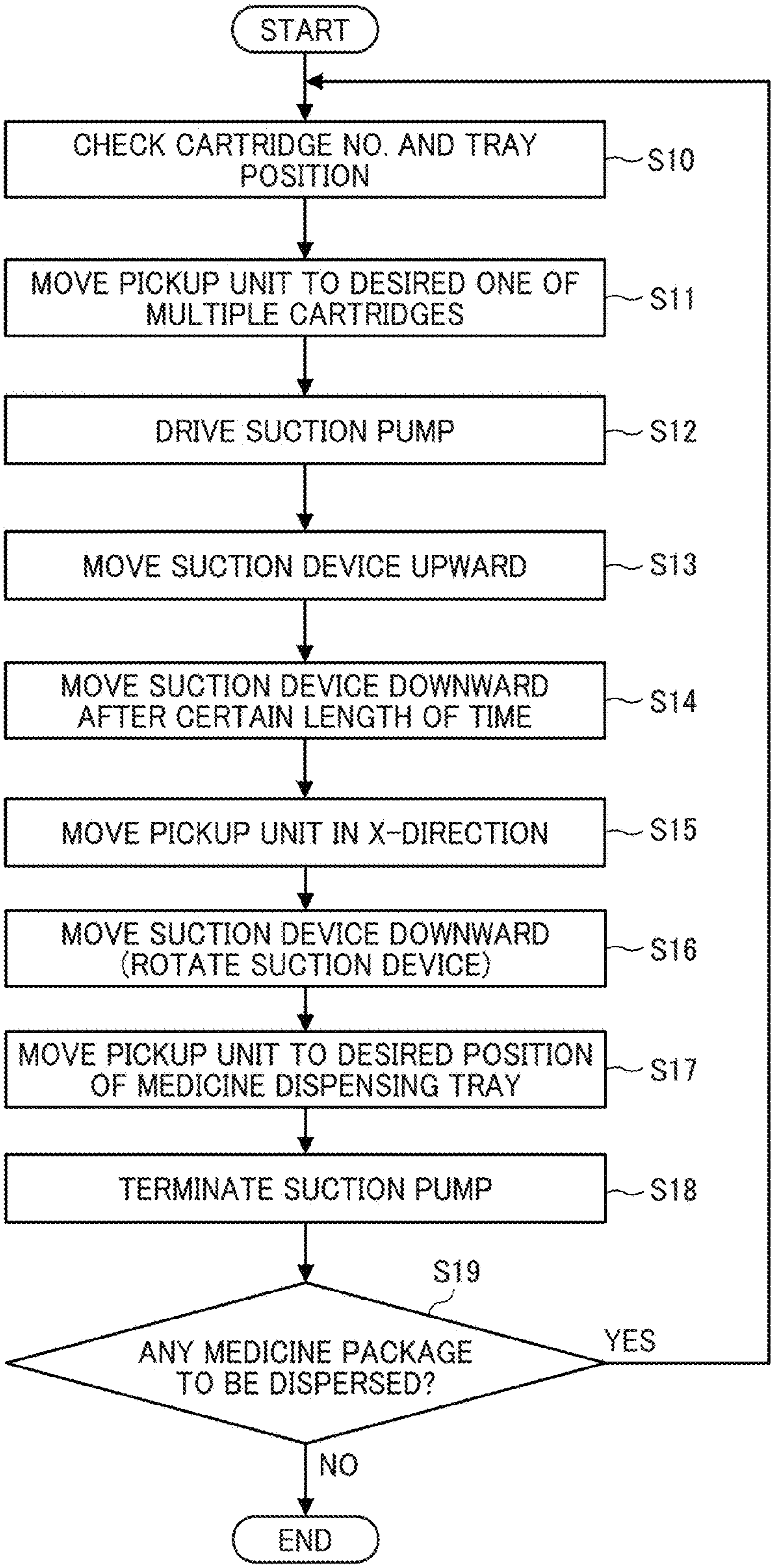
FIG. 13 is a flowchart of the operation flow of a pickup unit according to an embodiment of the present disclosure.

With reference to FIG. 13, supplemental description is given for the operation flow of the pickup unit 50 in an overall operation flow of FIG. 12A-1, FIG. 12A-2, FIG. 12A-3, FIG. 12A-4, FIG. 12A-5, FIG. 12A-6, FIG. 12B, and FIG. 12C.

FIG. 13 is a flowchart of the operation flow of the pickup unit 50 according to the present embodiment.

Firstly, in a step S10 of FIG. 13, the number (No.) given to desired one of the multiple cartridges 10 that stores the medicine package 2 to be dispersed is checked, and a desired position of the medicine dispensing tray 30 to which the medicine package 2 is passed is checked.

Subsequently, in a step S11, the pickup unit 50 is moved to desired one of the multiple cartridges 10 by the conveyance operation of the conveyance unit 90. Then, in a step S12, the suction device lifting and lowering motor 63 is driven to rotate while the suction pump 48 is being driven. By so doing, in a step S13, the suction device 51 is moved upward. After a certain length of time has passed after the lowermost one of the multiple medicine packages 2 in one of the multiple cartridges 10 is sucked and held by the pair of suction pads 52, in a step S14, the suction device lifting and lowering motor 63 is driven to rotate in the reverse direction. By so doing, the suction device 51 is moved downward. Subsequently, in a step S15, the pickup unit 50 is moved in the X-direction, and desired one of the multiple medicine packages 2 is completely taken out from one of the multiple cartridges 10. Then, in a step S16, the suction device lifting and lowering motor 63 is further driven to rotate in the reverse direction so as to move the suction device 51 downward. As a result, the suction device 51 is rotated by approximately 90 degrees, and the posture of the medicine package 2 is changed from an approximately parallel or horizontal posture to an approximately vertical posture.

Subsequently, the pickup unit 50 is moved to a desired position of one of the multiple medicine dispensing trays 30 by the convey operation of the conveyance unit 90. When the pickup unit 50 has moved to the position of desired one of the multiple medicine dispensing trays 30, in a step S17 and a step S18, the operation of the suction pump 48 is terminated, and the medicine package 2 is released and separated from the pair of suction pads 52. Then, in a step S19, whether there is any medicine package 2 to be dispersed is checked. When there is no medicine package 2 to be dispersed, a series of operation flow is terminated.

On the other hand, when it is determined in the step S19 that there is at least one medicine package 2 to be dispersed, the process is returned to the step S10, and the same series of processes in the above steps are repeated.

When desired one of the multiple medicine packages 2 is picked up from one of the multiple cartridges 10, the pickup unit 50 is positioned under one of the multiple cartridges 10, and such desired one of the multiple medicine packages 2 is taken out in the downward direction of one of the multiple cartridges 10. When one of the multiple medicine packages 2 is taken out from the lower side of one of the multiple cartridges as described above, the next one of the multiple medicine packages 2 automatically moves downward or toward the pack pickup slot 17 due to the self-weight of the movable board 16 and the multiple medicine packages 2 left in the cartridge 10. Due to such a configuration, the pickup unit 50 can perform the same operation with a relatively simple configuration regardless of the number of the multiple medicine packages 2 left in the cartridge 10.

In the above embodiments of the present disclosure, the timing at which the posture of one of the multiple medicine packages 2 is changed from a substantially horizontal posture to a substantially vertical posture is immediately after one of the multiple medicine packages 2 to be picked up is completely taken outside the multiple cartridge 10.

With such a configuration and operation, a compact medication support device 200 with reduced width in the side to side direction, which can handle a situation in which there is no room in the lateral direction of the pickup device, can be provided.

According to the above embodiments of the present disclosure, firstly, a medication support device with which the time or labor of medication for medication assistants and patients who take medicines can be reduced can be provided. Secondly, the multiple cartridges can be correctly set at predetermined positions in the medication support device using the cartridge tray. Thirdly, the length of time required to take out the multiple cartridges 10 from the medication support device 200 can be shortened.

Second Embodiment

The cartridge tray 20 and the drawer 80 according to the second embodiment of the present disclosure, which is different from the cartridge and the drawer according to the first embodiment of the present disclosure described with reference to FIG. 5, FIG. 6A, and FIG. 6B, are described below with reference to FIG. 14, FIG. 15, FIG. 16, FIG. 17, and FIG. 18.

Figure 14:
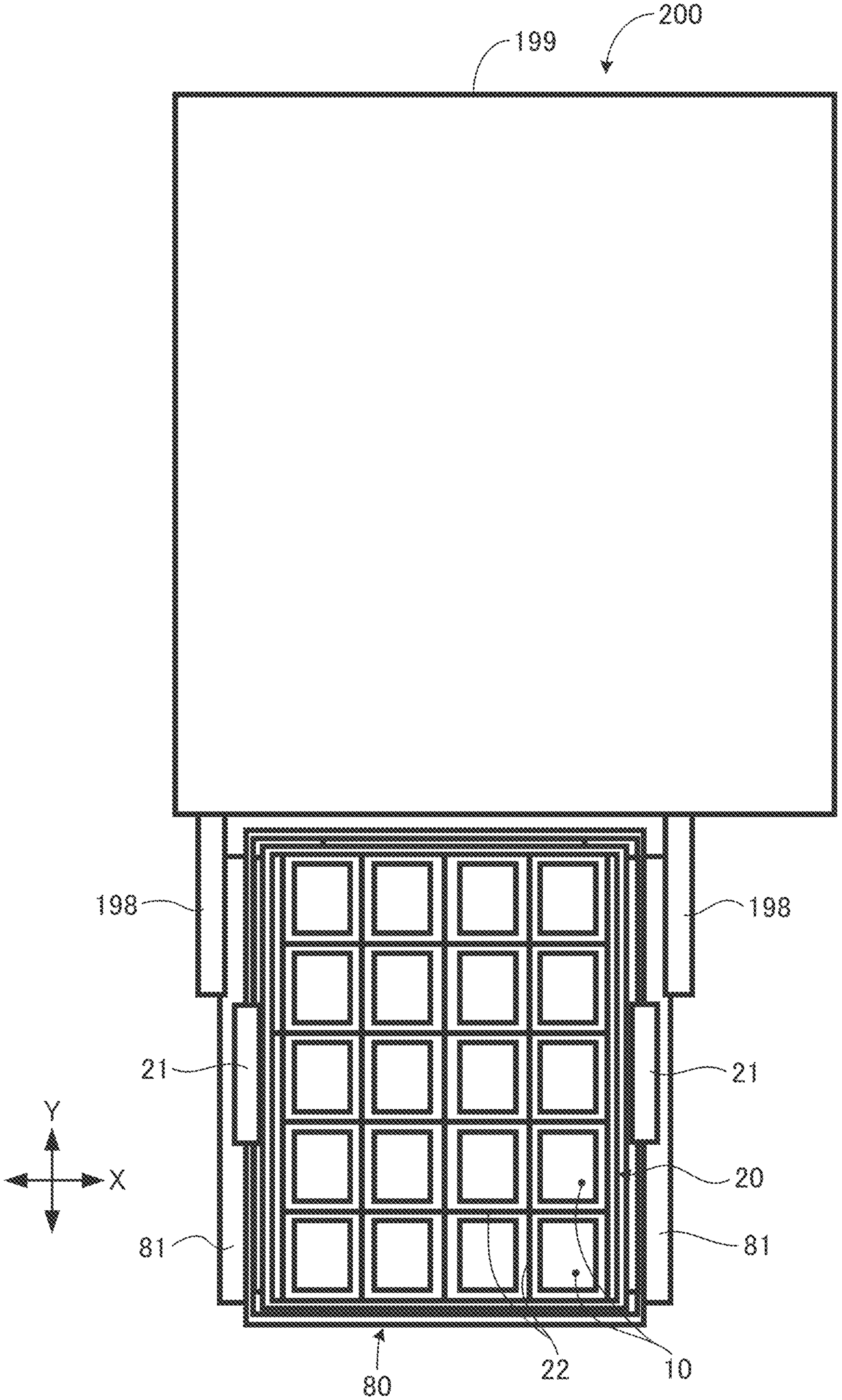
FIG. 14 is a plan view of a cartridge tray and a drawer according to a second embodiment of the present disclosure different from the first embodiment illustrated in FIG. 5, FIG. 6A, and FIG. 6B.

FIG. 14 is a plan view of the cartridge tray 20 and the drawer 80 according to the second embodiment of the present disclosure different from the first embodiment illustrated in FIG. 5, FIG. 6A, and FIG. 6B.

Figure 15:
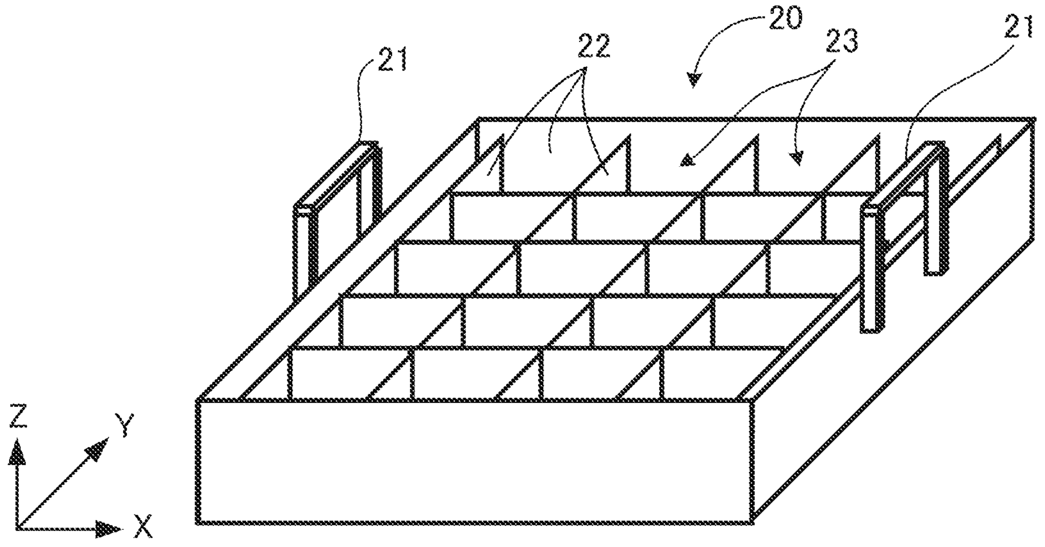
FIG. 15 is an external perspective view of the cartridge tray of FIG. 14, according to the second embodiment of the present disclosure.
Figure 16:
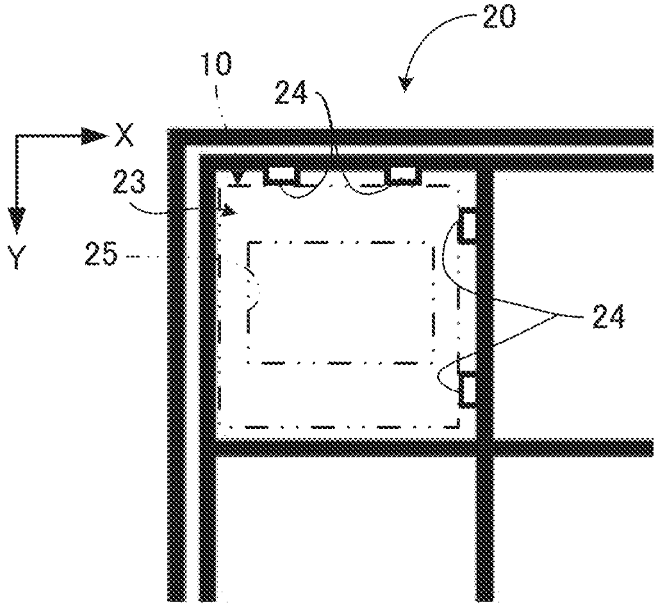
FIG. 16 is a partial plan view of a cartridge provided for the cartridge tray of FIG. 14 and FIG. 15, and illustrates how the relative positions of those elements are adjusted, according to the second embodiment of the present disclosure.

FIG. 15 is an external perspective view of the cartridge tray 20 of FIG. 14, according to the second embodiment of the present disclosure. FIG. 16 is a partial plan view of the multiple cartridges 10 arranged in the cartridge tray 20 of FIG. 14 and FIG. 15, and illustrates how the relative positions of those elements are adjusted, according to the second embodiment of the present disclosure.

Figure 17:
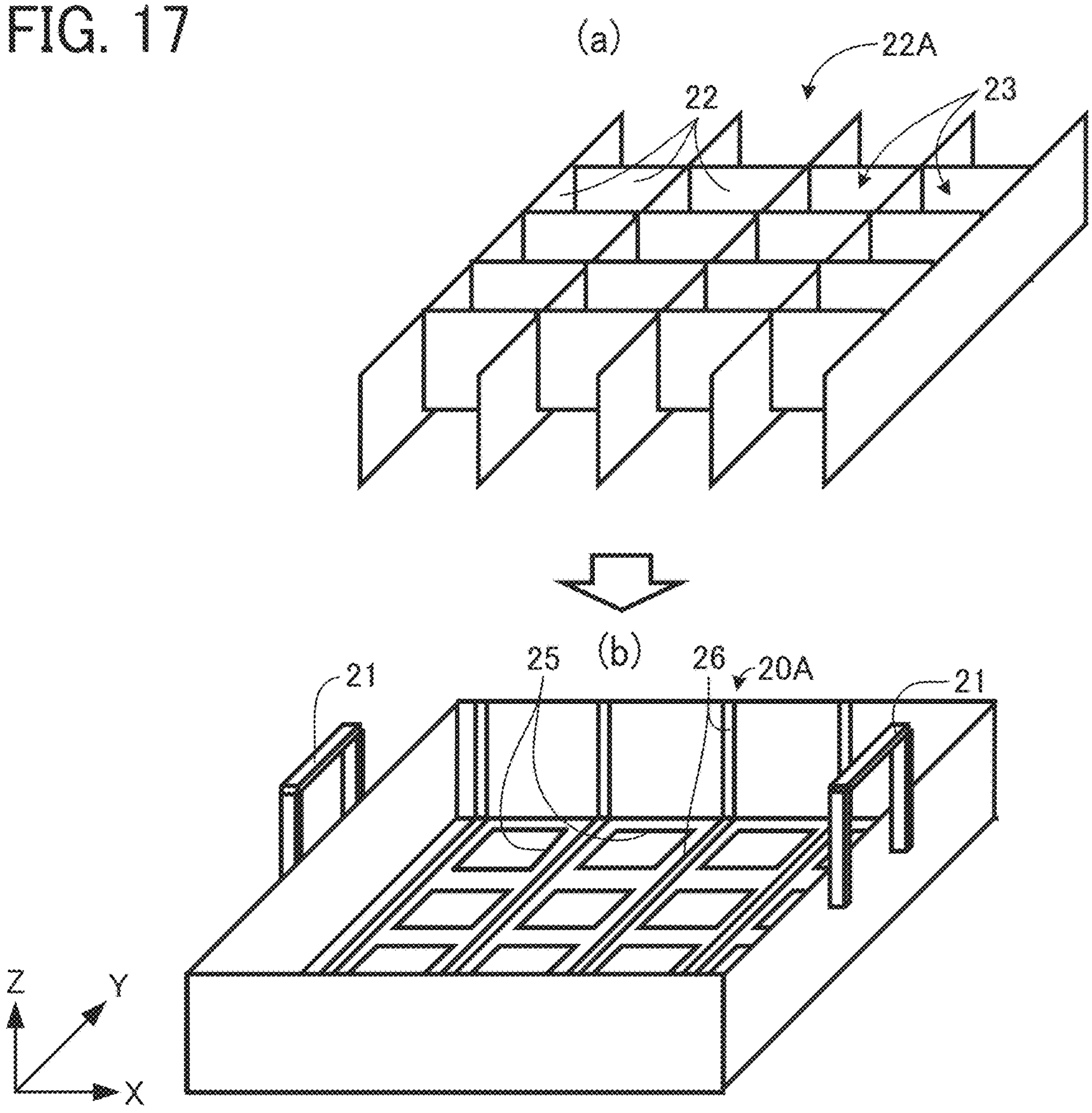
FIG. 17 is a perspective view of the cartridge tray of FIG. 15 and illustrates how the cartridge tray is assembled, according to the second embodiment of the present disclosure.

FIG. 17 is a perspective view of the cartridge tray of FIG. 15 and illustrates how the cartridge tray is assembled, according to the second embodiment of the present disclosure.

Figure 18:
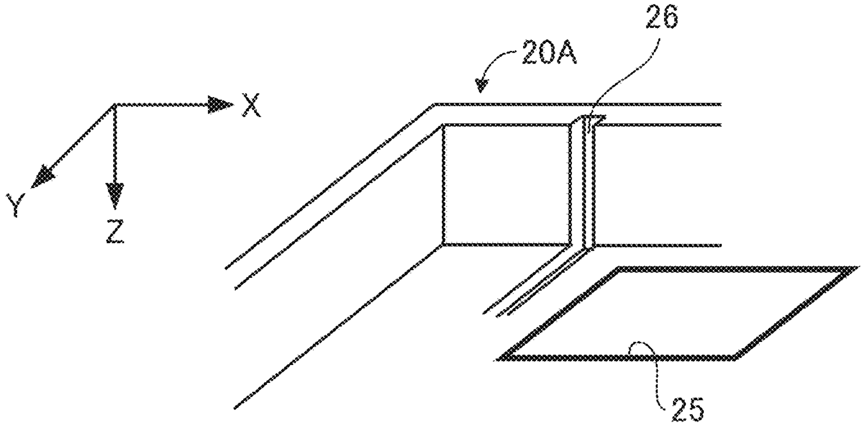
FIG. 18 is a perspective view of the cartridge tray of FIG. 17 and is an enlarged view of a portion where a slit is formed, according to the second embodiment of the present disclosure.

FIG. 18 is a perspective view of the cartridge tray 20 of (b) of FIG. 17 and is an enlarged view of a portion where a slit 26 is formed, according to the second embodiment of the present disclosure.

The cartridge tray 20 according to the second embodiment of the present disclosure as illustrated in FIG. 14 and FIG. 15 is different from the cartridge tray 20 according to the first embodiment of the present disclosure as illustrated in FIG. 5, FIG. 6A, and FIG. 6B in that the multiple partition walls 22 that serve as partition walls and is shaped like an upright wall are arranged. Each one of the multiple partitions 23 that stores and aligns one of the multiple cartridges is formed by the four inner walls surrounded by the partition walls 22 adjacent to each other.

As illustrated in FIG. 16, in each one of the multiple partitions 23, a plurality of convex positioning members 24 are arranged on each one of the inside surfaces of the partition walls 22 adjacent to each other such that the pair of neighboring side walls of one of the multiple cartridges 10 can be stored upon being positioned as desired in the X-direction and the Y-axis direction. In FIG. 16, two convex positioning members 24 are arranged on each one of the inside surfaces of the partition walls 22 adjacent to each other. The positioning in a single cartridge tray 20 is achieved as the pair of neighboring side walls of one of the multiple cartridges 10 contact the multiple convex positioning members 24. Due to the above positioning structures in which the multiple partitions 23 whose number is twenty in the present embodiment are formed in one of the multiple cartridge trays 20, the multiple cartridges 10 whose number is twenty in the present embodiment can be aligned and stored. Those multiple convex positioning members 24 may be integrally molded with the multiple partition walls 22 or may be arranged separately from the multiple partition walls 22.

How the multiple cartridges 10 are aligned or positioned in the cartridge tray is not limited to the way as described above. Alternatively, at least one convex portion or rib may be arranged on the side faces of the cartridge 10, and the convex portions or the ribs on the side faces of the cartridge 10 may be pushed against the partition walls of the cartridge tray 20. The positioning or alignment of the multiple cartridges 10 may be achieved in such a manner.

Most portions of the cartridge tray 20 may be integrally formed using, for example, a resin molding die as illustrated in FIG. 15, or the cartridge tray 20 may be formed by assembling two different members as illustrated in FIG. 17. In other words, the cartridge tray 20 may be assembled by attaching a partition-wall forming unit 22A as illustrated in FIG. 17A that is composed of two elements each of which is integrally molded in advance using a resin-molding die to a slit-formed tray forming unit 20C as illustrated in (b) of FIG. 17.

In the cartridge tray 20 composed of two different members illustrated in FIG. 17, the partition-wall forming unit 22A can be detachably attached to the slit-formed tray forming unit 20C by fitting the partition walls of the partition-wall forming unit 22A into the slit 26 of the slit-formed tray forming unit 20C. Due to such a configuration, when the inside of the cartridge tray 20 becomes unintentionally dirty or the partition-wall forming unit 22A is damaged, the partition-wall forming unit 22A can easily be detached from the slit-formed tray forming unit 20C. Accordingly, cleaning or the replacement of a damaged part can easily be done.

Third Embodiment

The third embodiment of the present embodiment that is different from the first embodiment of the present disclosure described above with reference to FIG. 5, FIG. 6A, and FIG. 6B and the second embodiment of the present disclosure described above with reference to FIG. 15, FIG. 16, FIG. 17, and FIG. 18 is described below with reference to FIG. 19, FIG. 20A, FIG. 20B, and FIG. 20C.

Figure 19:
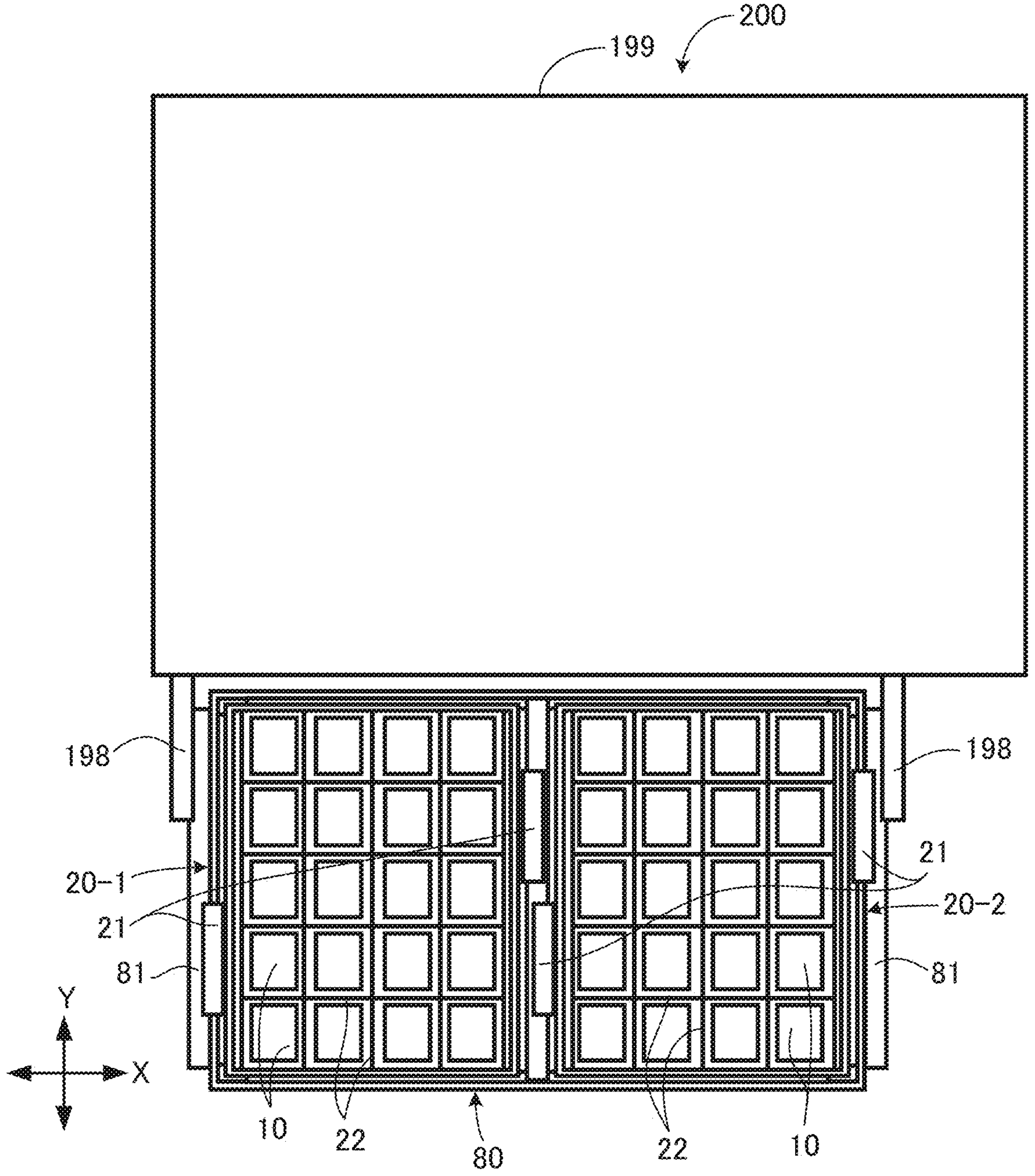
FIG. 19 is a plan view of a plurality of cartridge trays arranged in a drawer, according to a third embodiment of the present disclosure.

FIG. 19 is a plan view of a couple of cartridge trays 20-1 and 20-2 arranged in the drawer 80, according to the third embodiment of the present disclosure.

Figure 20A:
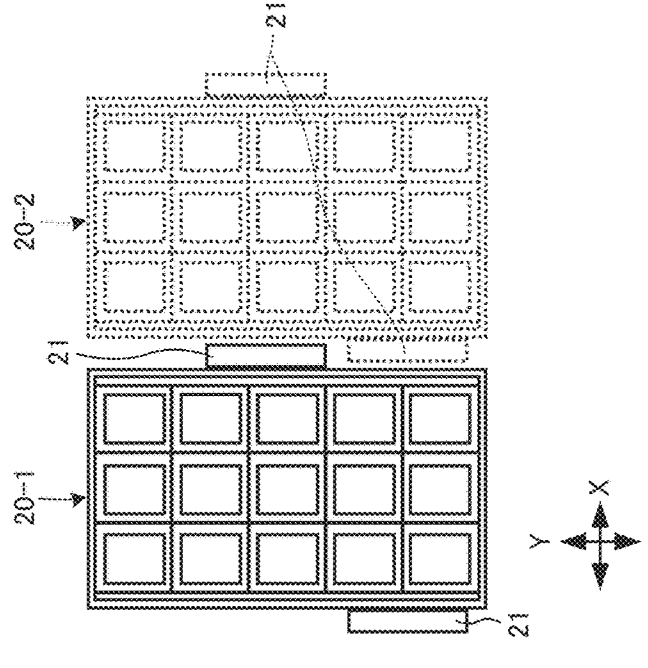
FIG. 20A, FIG. 20B, and FIG. 20C are plan views of the multiple cartridge trays of FIG. 19, according to a third embodiment of the present disclosure.
Figure 20B:
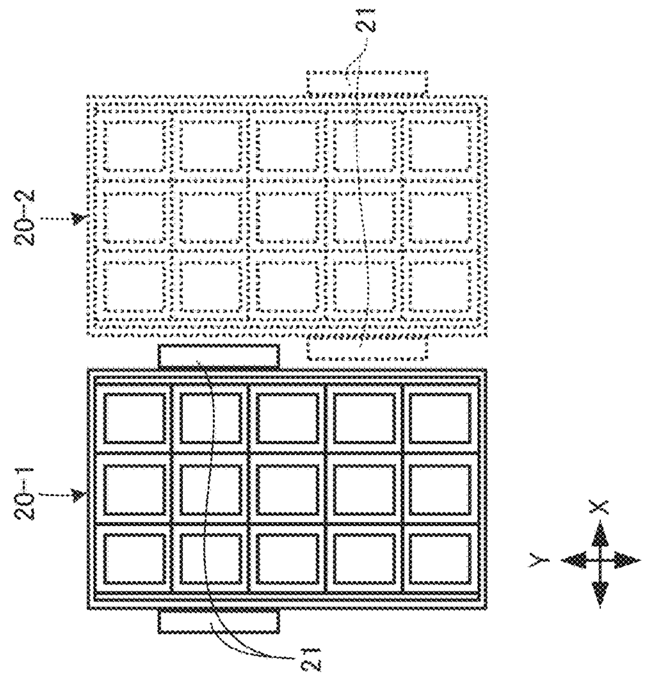
Figure 20C:
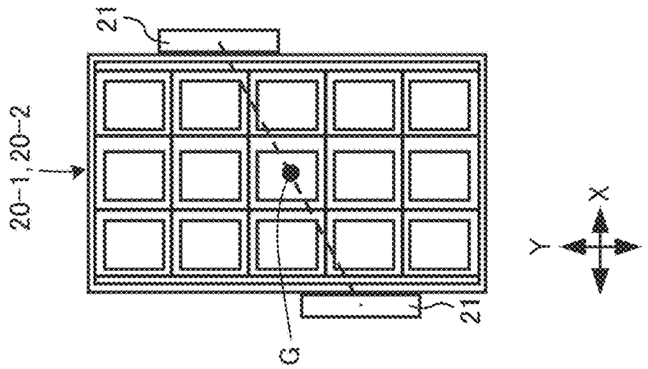

FIG. 20A, FIG. 20B, and FIG. 20C are plan views of the couple of cartridge trays 20-1 and 20-2 of FIG. 19, according to the third embodiment of the present disclosure.

In FIG. 20A and FIG. 20B, a cartridge tray 20-2 that is indicated by dotted lines indicates the position of the cartridge tray when the cartridge tray is placed inside the medication support device 200 as illustrated in FIG. 19.

In the case of the medication support device 200 that can handle the medication for a large number of people, the number of cartridges 10 in the medication support device 200 tend to increase. In such cases, not only the number of cartridges 10 in one drawer 80 increases, but also the weight of the cartridge tray 20 including the multiple cartridges 10 and the multiple medicine packages 2 increases if a large number of cartridges 10 are stored in one cartridge tray 20 as in the second embodiment of the present disclosure described above with reference to FIG. 14. In such cases, two people may be required for the attachment and detachment of the cartridge tray 20.

In order to handle such a situation, in the third embodiment of the present disclosure described with reference to FIG. 19, the cartridge tray is divided into a pair of cartridge trays 20-1 and 20-2, and those cartridges are positioned as desired and held by one drawer 80. With the medication support device according to the third embodiment of the present disclosure, the weight of the cartridge tray is dispersed such that the weight of one cartridge tray does not increase. Accordingly, the handling of the cartridge tray can be made easy.

If a plurality of cartridge trays such as a pair of cartridge trays are mounted on one drawer 80, a wide space for a grip or handle is unintentionally required. In order to deal with such a situation, the positions of the pair of handles 21 of the cartridge tray 20-1 and the cartridge tray 20-2 may be shifted and made different from each other. Due to such a configuration, the pair of handles 21 do not overlap each other when the cartridge tray 20-1 and the cartridge tray 20-2 are set in the drawer 80. Due to such a configuration, the size of the medication support device 200 in the width direction parallel to the X-direction can be reduced.

In FIG. 20A and FIG. 20B, the cartridge tray 20-2 that is indicated by dotted lines indicates a position when the cartridge tray 20-2 is placed inside the medication support device 200 as illustrated in FIG. 19.

The positions at which the pair of handles 21 of the cartridge tray 20-1 and the cartridge tray 20-2 are arranged is not limited to the arrangement according to the present embodiment described with reference to FIG. 19. As illustrated in FIG. 20A, one of the pair of handles 21 of the cartridge tray 20-1 and the cartridge tray 20-2 may be arranged further ahead. As illustrated in FIG. 20B, of the pair of handles 21 of the cartridge tray 20-1 and the cartridge tray 20-2 may be arranged in two rows in a staggered configuration.

In cases where the pair of handles 21 arranged at the positions as illustrated in FIG. 20B, the handle is placed immediately in front of a person who operates or manipulates the cartridge tray when the cartridge tray is taken out from the medication support device 200. Due to such a configuration, the accessibility to the handle increases. With the positions at which the pair of handles 21 are arranged as illustrated in FIG. 20B, the portions at which the cartridge tray is grasped can be made equivalent to each other on the right and left sides. Accordingly, a sense of incongruity when grasping one of the pair of handles 21 with the sword arm can be reduced.

Alternatively, as illustrated in FIG. 20C, the pair of handles 21 may be arranged at a pair of areas that face each other across the center of gravity G of the cartridge tray 20-1 or the cartridge tray 20-2. Due to such a configuration, the cartridge tray 20-1 or the cartridge tray 20-2 can be easily taken out from the drawer 80 without losing balance.

Fourth Embodiment

The fourth embodiment of the present embodiment is described below with reference to FIG. 21A and FIG. 21B.

Figure 21A:
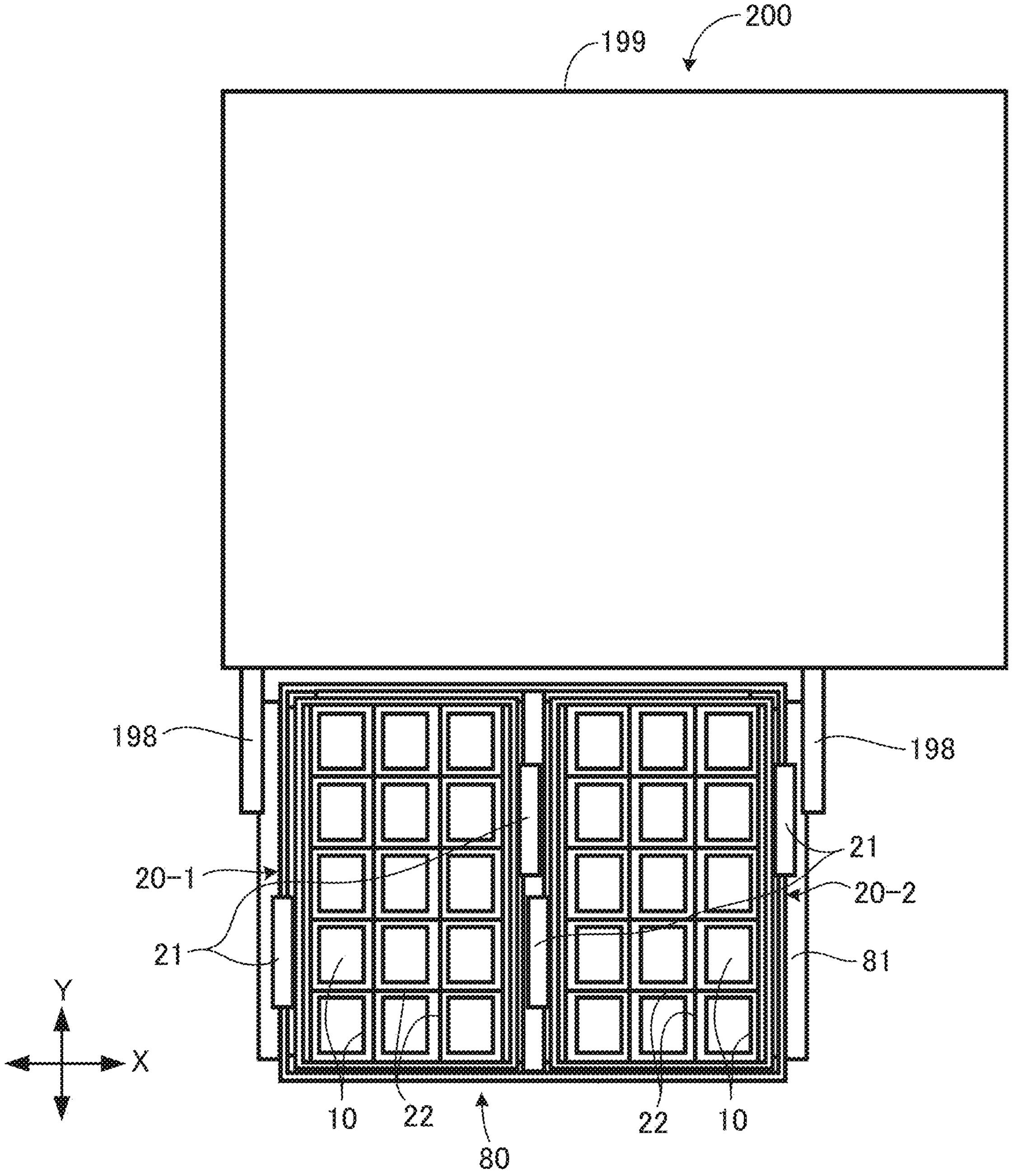
FIG. 21A a plan view of a medication support device that uses the multiple cartridge trays illustrated in FIG. 19, according to a fourth embodiment of the present disclosure.

FIG. 21A is a plan view of the medication support device 200 that uses a pair of cartridge trays as illustrated in FIG. 19, according to the fourth embodiment of the present disclosure.

Figure 21B:
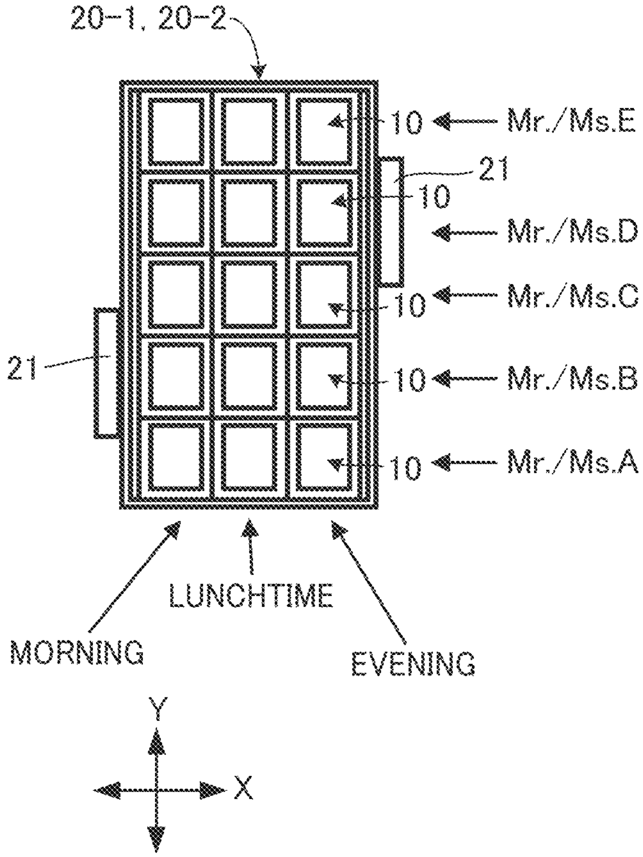
FIG. 21B is a diagram illustrating one of a plurality of cartridge trays according to the fourth embodiment of the present disclosure.

FIG. 21B is a diagram illustrating one of the multiple cartridge trays 20 according to the fourth embodiment of the present disclosure.

The timings at which medicines are taken varies depending on the types of day-care center or nursing home or the kinds of the occupants, but medication is typically administered three times a day in the morning, at lunchtime, and in the evening By allocating the multiple partitions 23 of the cartridge trays 20-1 and 20-2 in three rows and five columns as illustrated in FIG. 21B, the multiple cartridges 10 in which the multiple packs containing the medicines 3 to be taken by the occupants such as Mr. or Ms. A, Mr. or Ms. B, Mr. or Ms. C, Mr. or Ms. D, and Mr. or Ms. E can be arranged side by side in the cartridge trays 20-1 and 20-2. As a result, a cohesive arrangement is achieved when some of the multiple cartridges 10 is set or taken out from the medication support device 200 by, for example, a staff of the facility. Accordingly, the visual recognizability can be increased.

Fifth Embodiment

The fifth embodiment of the present embodiment is described below with reference to FIG. 22A and FIG. 22B.

Figure 22A:
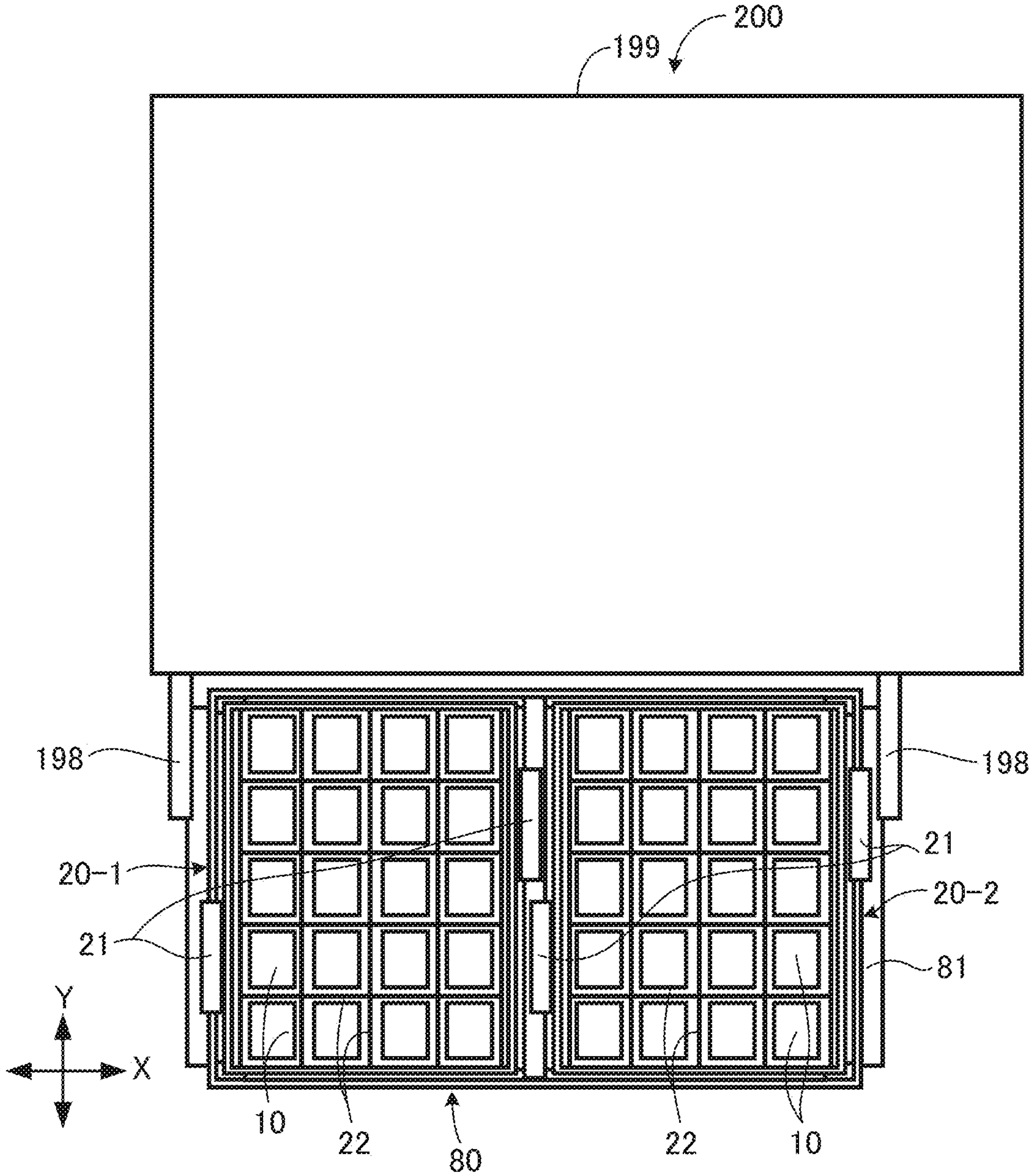
FIG. 22A is a plan view of a medication support device that uses the multiple cartridge trays illustrated in FIG. 19, according to a fifth embodiments of the present disclosure.

FIG. 22A is a plan view of the medication support device 200 that uses the pair of cartridge trays 20 as illustrated in FIG. 19, according to the fifth embodiment of the present disclosure.

Figure 22B:
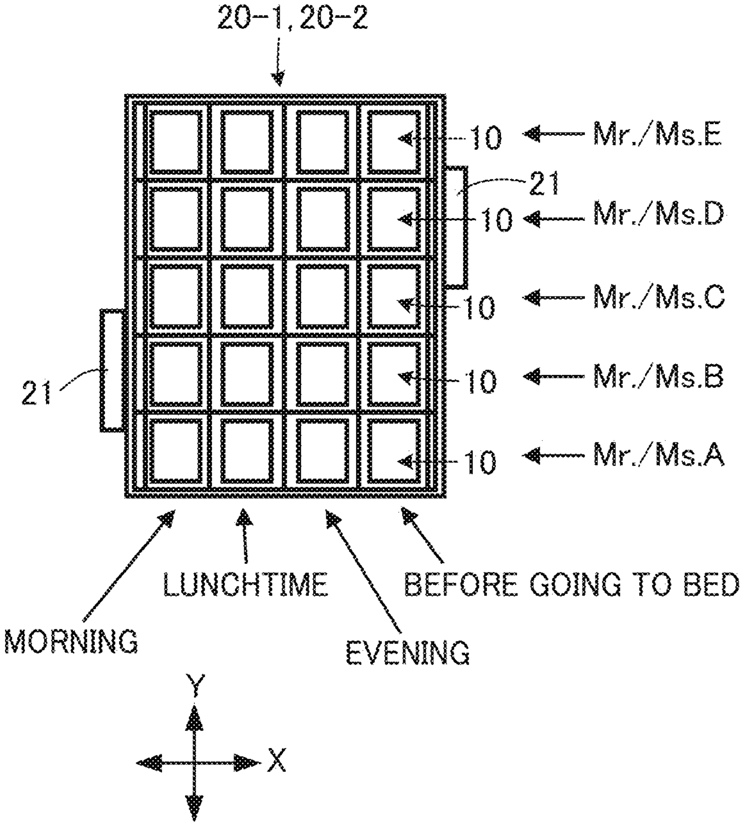
FIG. 22B is a diagram illustrating one of a plurality of cartridge trays according to the fifth embodiment of the present disclosure.

FIG. 22B is a diagram illustrating one of the multiple cartridge trays 20 according to the fifth embodiment of the present disclosure.

By allocating the multiple partitions 23 of the cartridge trays 20-1 and 20-2 in four rows and five columns as illustrated in FIG. 22B, the time of medication before going to the bed is also taken into consideration in addition to the three times of medication in the morning, at lunchtime, and in the evening. Also in such cases, the multiple cartridges 10 in which the multiple packs containing the medicines 3 to be taken by the occupants such as Mr. or Ms. A, Mr. or Ms. B, Mr. or Ms. C, Mr. or Ms. D, and Mr. or Ms. E can be arranged side by side in the cartridge trays 20-1 and 20-2. As a result, a cohesive arrangement is achieved when some of the multiple cartridges 10 is set or taken out from the medication support device 200 by, for example, a staff of the facility. Accordingly, the visual recognizability can be increased in a similar manner to the fourth embodiment of the present embodiment described above.

In the fourth embodiment and the fifth embodiment of the present disclosure, the five columns in the depth direction parallel to the Y-direction may be changed to three columns or four columns, and the number of columns in the depth direction parallel to the Y-direction may be changed depending on the size of the medication support device 200 in the depth direction or the allocation of the occupants of the facility or the like. For example, such allocation of the occupants may be done in units of floor or partition.

Sixth Embodiment

A plurality of cartridge trays 20A according to the sixth embodiment of the present disclosure that can be stacked on top of each other in layers are described below with reference to FIG. 23A and FIG. 23B.

Figure 23A:
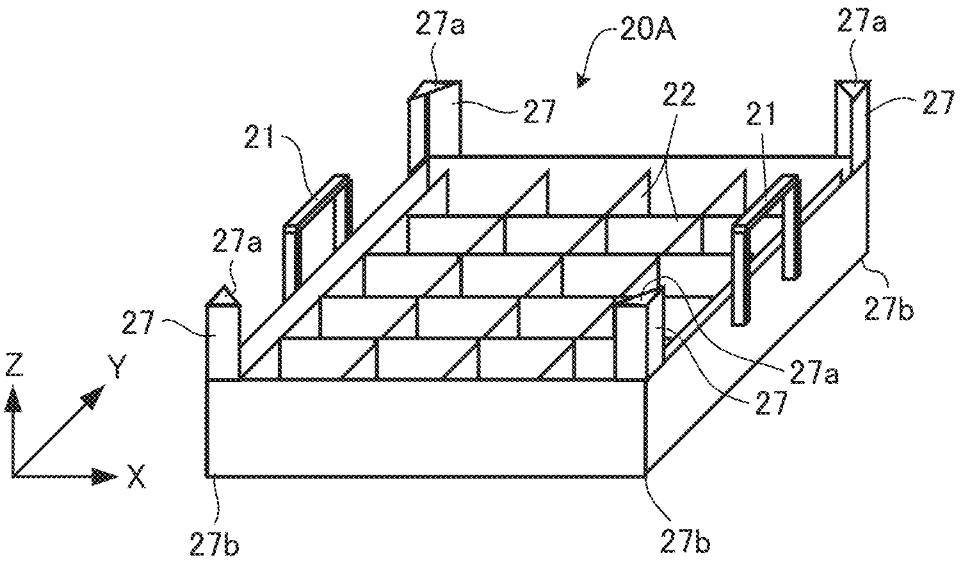
FIG. 23A is a perspective view of one of a plurality of cartridge trays according to a sixth embodiment of the present disclosure.

FIG. 23A is a perspective view of one of the multiple cartridge trays 20A according to the sixth embodiment of the present disclosure.

Figure 23B:
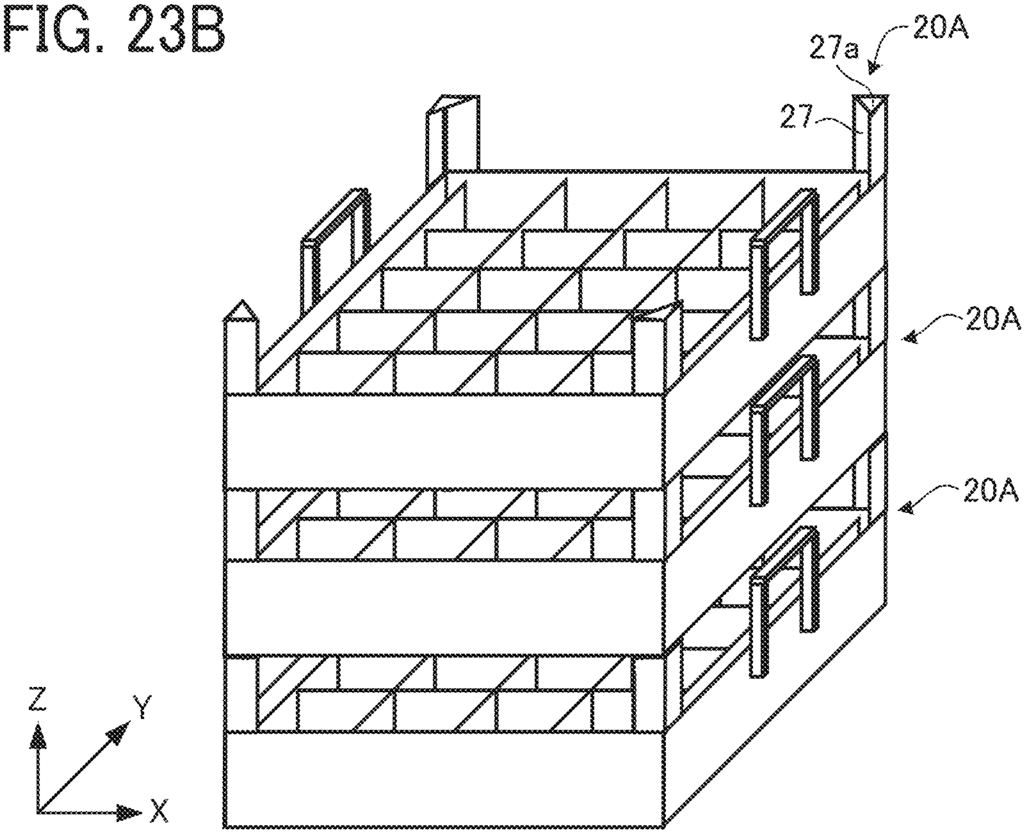
FIG. 23B is a perspective view of the multiple cartridge trays of FIG. 23A and illustrates how those cartridge trays are stacked on top of each other in layers, according to the sixth embodiment of the present disclosure.

FIG. 23B is a perspective view of the multiple cartridge trays 20A of FIG. 23A and illustrates how those cartridge trays are stacked on top of each other in layers, according to the sixth embodiment of the present disclosure.

As illustrated in FIG. 23A, for example, the multiple cartridge trays 20A that can be stacked on top of each other in layers are formed as a result of fixedly arranging four columns 27 that extend upward with the same length at the four corners of the cartridge tray 20 having the shape illustrated in FIG. 15. The multiple columns 27 according to the present embodiment are aligned and attached to the four corners of each one of the multiple cartridge trays 20A such that the positions of four upper-end faces 27*a* are higher than the uppermost surface of each one of the pair of handles 21. The multiple columns 27 according to the present embodiment are attached to the four corners of each one of the multiple cartridge trays 20A such that the positions of four lower-end faces 27*b* are slightly lower than the bottom face of the cartridge tray 20A.

Due to the above-described shape or structure of the cartridge tray 20A, as illustrated in FIG. 23B, the upper-end faces 27*a* of the multiple columns 27 of the cartridge tray 20A located at the lower stage can be placed on the lower-end faces 27B of the multiple columns 27 of the cartridge tray 20A located at the upper stage, and the multiple cartridge trays 20A can be stacked on top of each other in layers upward in the Z-direction.

Seventh Embodiment

A plurality of cartridge trays 20B according to the seventh embodiment of the present disclosure that can be stacked on top of each other in layers, which are different from the multiple cartridge trays 20A according to the sixth embodiment of the present disclosure as illustrated in FIG. 23A and FIG. 23B, are described below with reference to FIG. 24A and FIG. 24B.

Figure 24A:
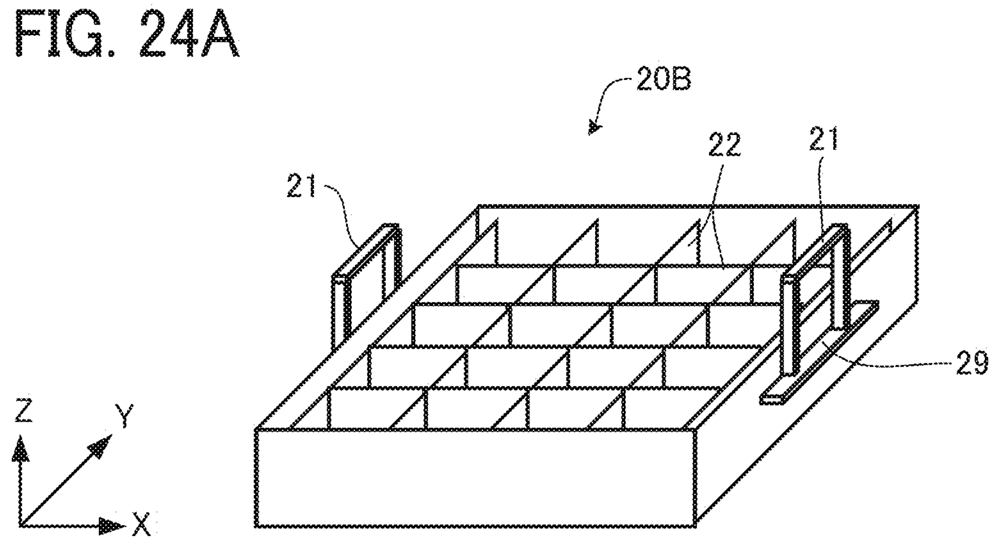
FIG. 24A is a perspective view of one of a plurality of cartridge trays according to a seventh embodiment of the present disclosure.

FIG. 24A is a perspective view of a cartridge tray 20B, which is different from the cartridge tray 20A as illustrated in FIG. 23A, according to the seventh embodiment of the present disclosure.

Figure 24B:
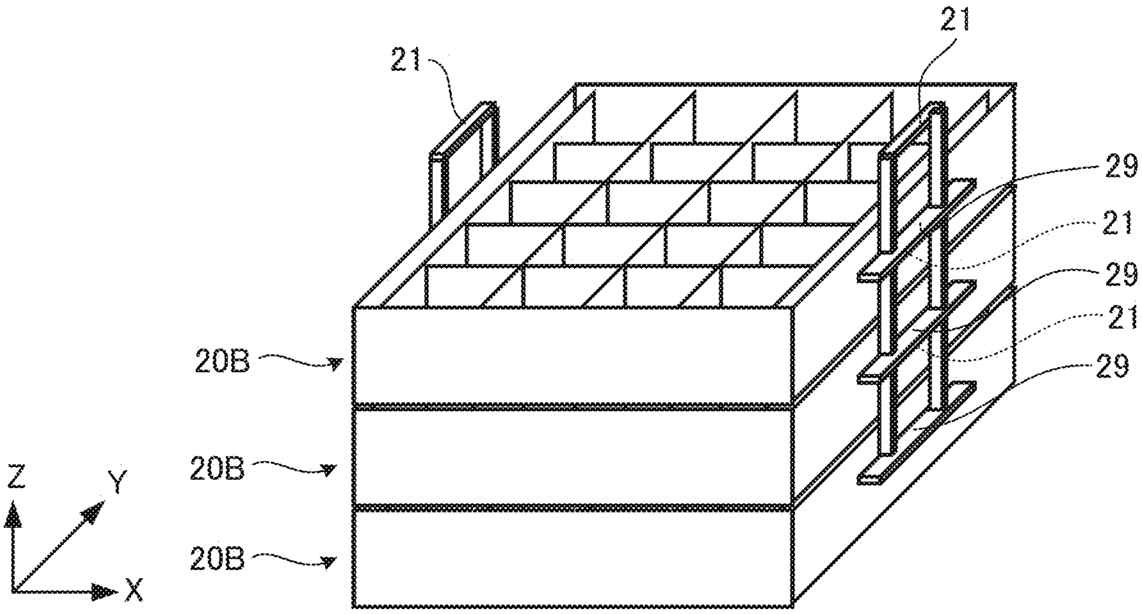
FIG. 24B is a perspective view of the multiple cartridge trays of FIG. 24A and illustrates how those cartridge trays are stacked on top of each other in layers, according to the seventh embodiment of the present disclosure.

FIG. 24B is a perspective view of the multiple cartridge trays 20B of FIG. 24A and illustrates how those cartridge trays are stacked on top of each other in layers, according to the seventh embodiment of the present disclosure.

As illustrated in FIG. 24A, for example, a pair of bases 29 are arranged below each one of the pair of handles 21 provided for the cartridge tray 20, which have the shape illustrated in FIG. 15, and the bottom end of each one of the pair of handles 21 is fixed to corresponding one of the pair of bases 29. By so doing, the multiple cartridge trays 20B that can be stacked on top of each other in layers can be made.

The base 29 according to the present embodiment is a flat plate that extends in the Y-direction, and the thickness portion of the base 29 is fixed to the side face of the cartridge tray 20B that serves as the outer frame. Due to such a configuration, the bottom end of each one of the pair of handles 21 can be fixed to a position away from the side face of the cartridge tray 20B by a predetermined distance. As illustrated in FIG. 24B, the bottom end of the base 29 of the second one of the multiple cartridge trays 20B from the bottom is placed on the topside of the handle 21 of the lowermost one of the multiple cartridge trays 20B, which is hidden and invisible in FIG. 24B, and the bottom end of the base 29 of the uppermost one of the multiple cartridge trays 20B is further placed on the topside of the handle 21 of the second one of the multiple cartridge trays 20B from the bottom, which is hidden and invisible in FIG. 24B. Due to such a configuration, the multiple cartridge trays 20B can be stacked on top of each other in layers upward in the Z-direction.

With the medication support device according to the sixth embodiment or the seventh embodiment of the present disclosure, the cartridge tray 20A and the cartridge tray 20B are stacked on top of each other in layers, and the space to store an empty cartridge tray can be minimized. Moreover, the multiple medicine packages 2 in the multiple cartridges 10 are to be replaced, the cartridge tray 20 that is taken out from the medication support device 200 can collectively be placed on a work desk. In other words, the workability or processability improves.

Eighth Embodiment

The eighth embodiment of the present disclosure in which at least one spacer is attached to a pair of cartridge trays 20-1 and 20-2 or the drawer 80 is described below with reference to FIG. 25A, FIG. 25B, FIG. 25C, FIG. 26A, and FIG. 26B.

Figure 25A:
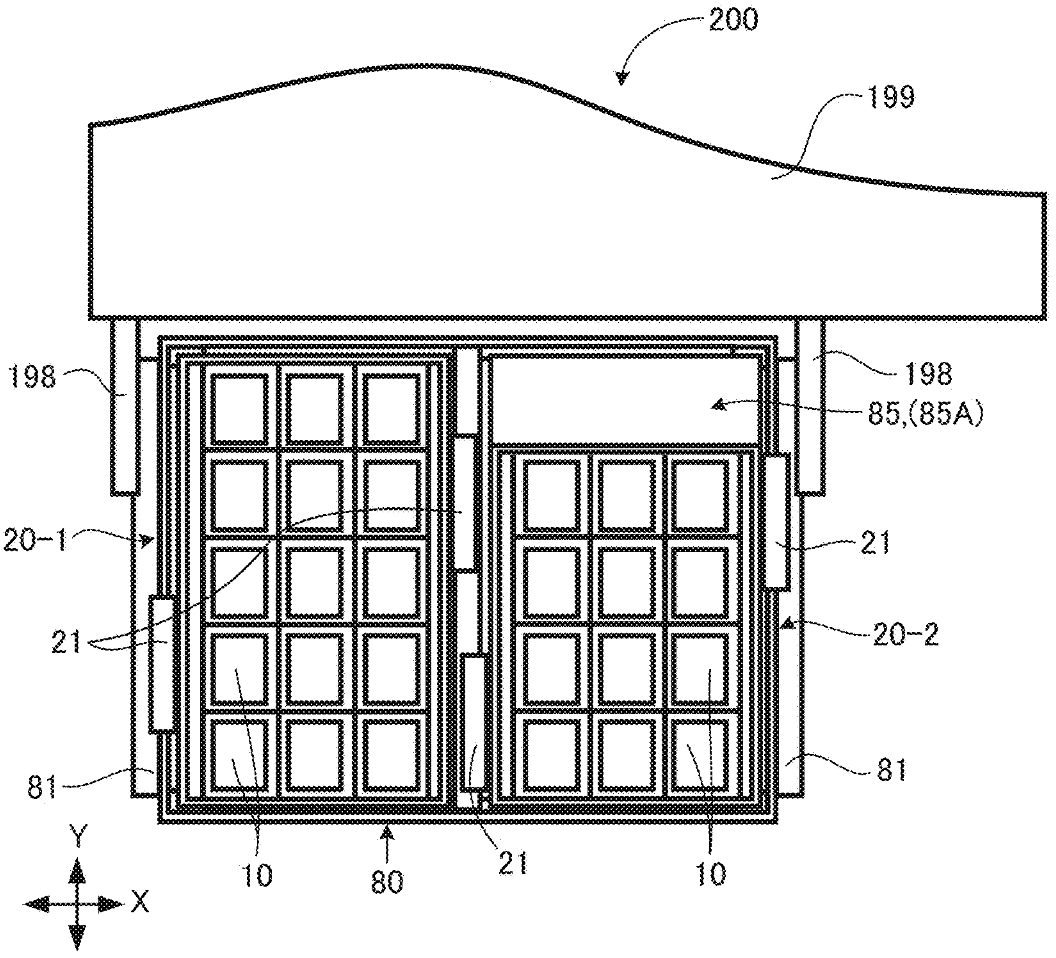
FIG. 25A is a plan view of a pair of cartridge trays provided with at least one spacer, according to an eighth embodiment of the present disclosure.

FIG. 25A is a plan view of a pair of cartridge trays 20-1, 20-2 provided with at least one spacer, according to the eighth embodiment of the present disclosure.

Figure 25B:
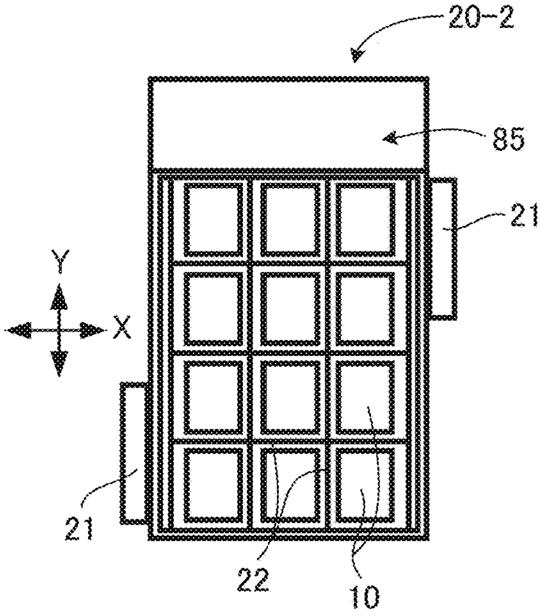
FIG. 25B and FIG. 25C are plan views of a pair of cartridge trays that have two different spacers with two different patterns, according to the eighth embodiment of the present disclosure.
Figure 25C:
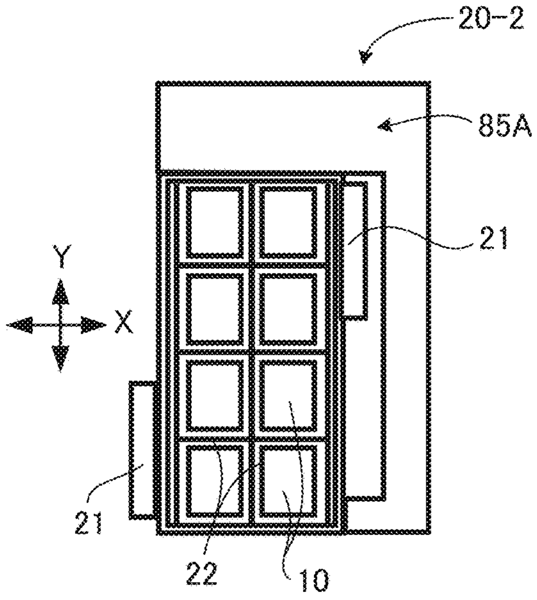

FIG. 25B and FIG. 25C are plan views of the pair of cartridge trays 20-1 and 20-2 that have two different spacers with two different patterns, according to the eighth embodiment of the present disclosure.

Figure 26B:
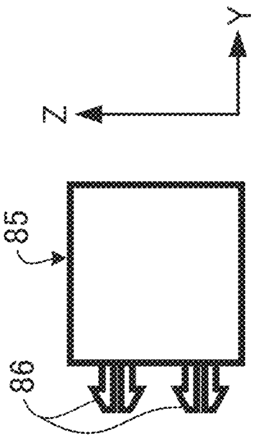
FIG. 26A and FIG. 26B are sectional views of the joint between a cartridge tray and a spacer, according to the eighth embodiment of the present disclosure.
Figure 26A:
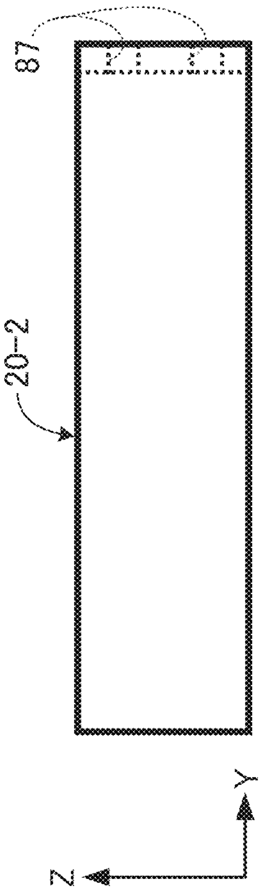

FIG. 26A and FIG. 26B are sectional views of the joint between the cartridge tray 20-2 and the spacer 85, according to the eighth embodiment of the present disclosure. In the case of the pair of cartridge trays 20-1 and 20-2 that are used when the number of occupants is small as illustrated in FIG. 21A and FIG. 21B, undesired empty space takes place almost without exception, and there may be undesired confusion where a place to return some of the multiple cartridges 10 is lost. As the size of the cartridge tray increases to an excessive degree, there is some concern that the processability gets worse due to its excessive weight and size. The eighth embodiment of the present disclosure is designed as follows in order to handle such a situation. As illustrated in FIG. 25A, FIG. 25B, and FIG. 25C, by attaching the spacer 85 or the spacer 85A to the cartridge trays 20-2 which is one of the pair of the cartridge trays, the necessity to prepare the medication support device 200 adapted to the small-sized cartridge tray can be eliminated. The shape of the spacer according to the present embodiment is not limited to the spacer 85 as illustrated in FIG. 25B with the rectangular shape that is attached to the far side of the medication support device 200, but may be the spacer 85A that is L-shaped as illustrated in FIG. 25C may be adopted.

As illustrated in FIG. 26A and FIG. 26B, the joint that is used to attach the spacer 85 or the spacer 85A to the cartridge tray 20-2 is achieved by arranging concave and convex joints on one side of the cartridge tray 20-2 and one side of the spacer 85, respectively, and fitting those concave joints and convex joints to each other. Due to such a configuration, the spacer 85 or the spacer 85A do not drop even if the cartridge tray 20 is held alone. In the concave and convex joints as illustrated in FIG. 26A and FIG. 26B, a plurality of to-be-fitted holes 87 that have concave shapes are used on the cartridge tray 20-2 side, and a plurality of fitting projections 86 that have convex shapes on the spacer 85 or the spacer 85A side. The joint is not limited to the fitting structure of the above concave and convex portions. The joint according to the present embodiment may be shaped like a hook, and such a hook-shaped joint of the spacer 85 or the spacer 85A may be hooked onto the cartridge tray 20. Alternatively, the spacer 85 or the spacer 85A may directly be attached to the drawer 80.

When the number of the multiple cartridges 10 to be mounted is small, cartridge trays smaller than the cartridge trays 20 used under normal operating conditions may be prepared. Due to such a configuration, reduction in weight can be achieved and the processability can be increased. In such cases, undesired empty space takes place in the drawer 80. In order to deal with such a situation, as in the eighth embodiment of the present disclosure, undesired gap or space with the cartridge tray 20 can be filled using an attachment.

Ninth Embodiment

A cartridge-attached cartridge tray 160 according to the ninth embodiment of the present disclosure in which the multiple cartridges 10 and the multiple cartridge trays 20 are integrally formed is described below with reference to FIG. 27, FIG. 28, and FIG. 29.

Figure 27:
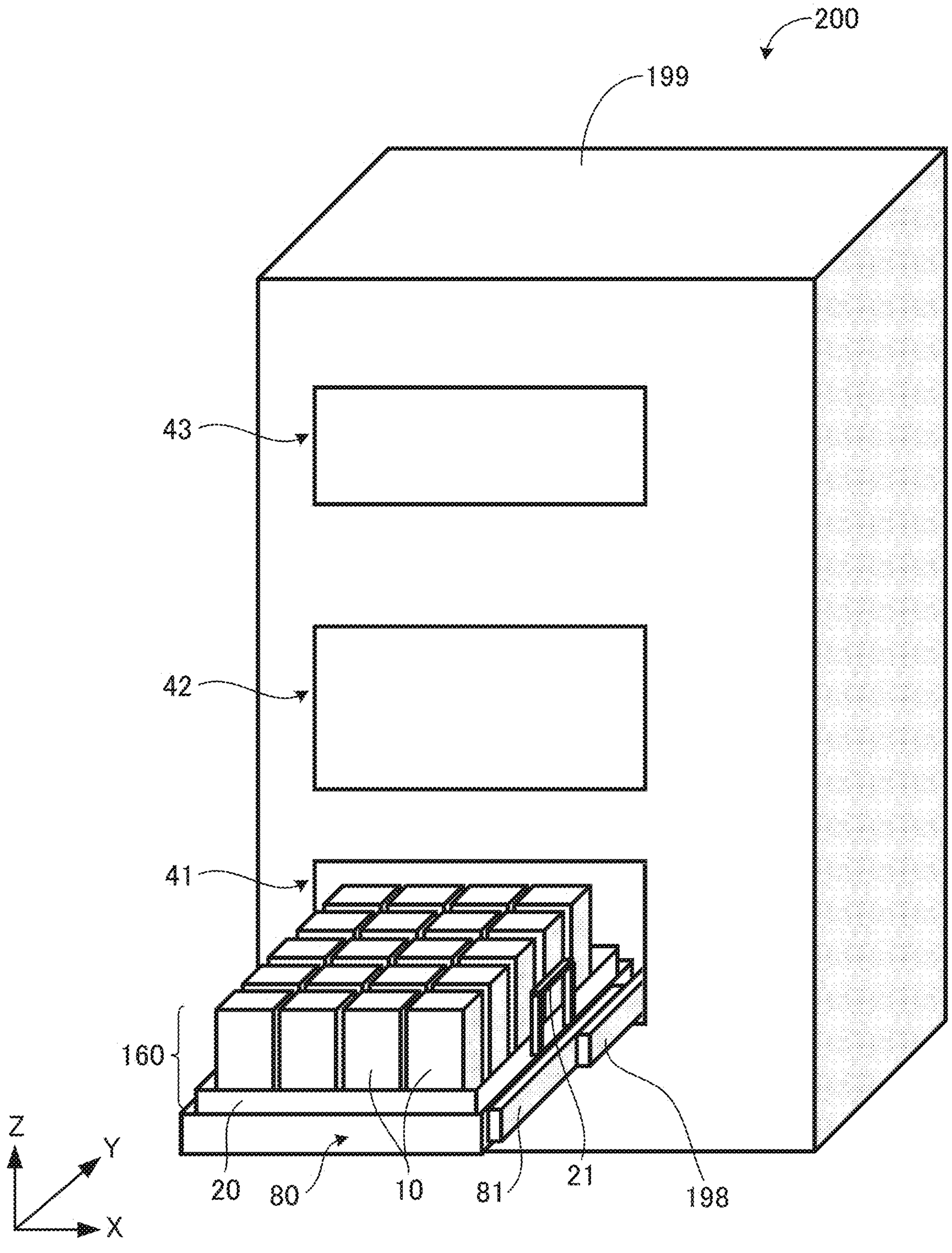
FIG. 27 is a perspective view of a medication support device provided with a plurality of cartridge-attached cartridge trays, according to a ninth embodiment of the present disclosure.

FIG. 27 is a perspective view of the medication support device 200 according to the ninth embodiment of the present disclosure in which the drawer 80 provided with the cartridge-attached cartridge tray 160 is pulled out from the housing 199 of the medication support device 200.

Figure 28:
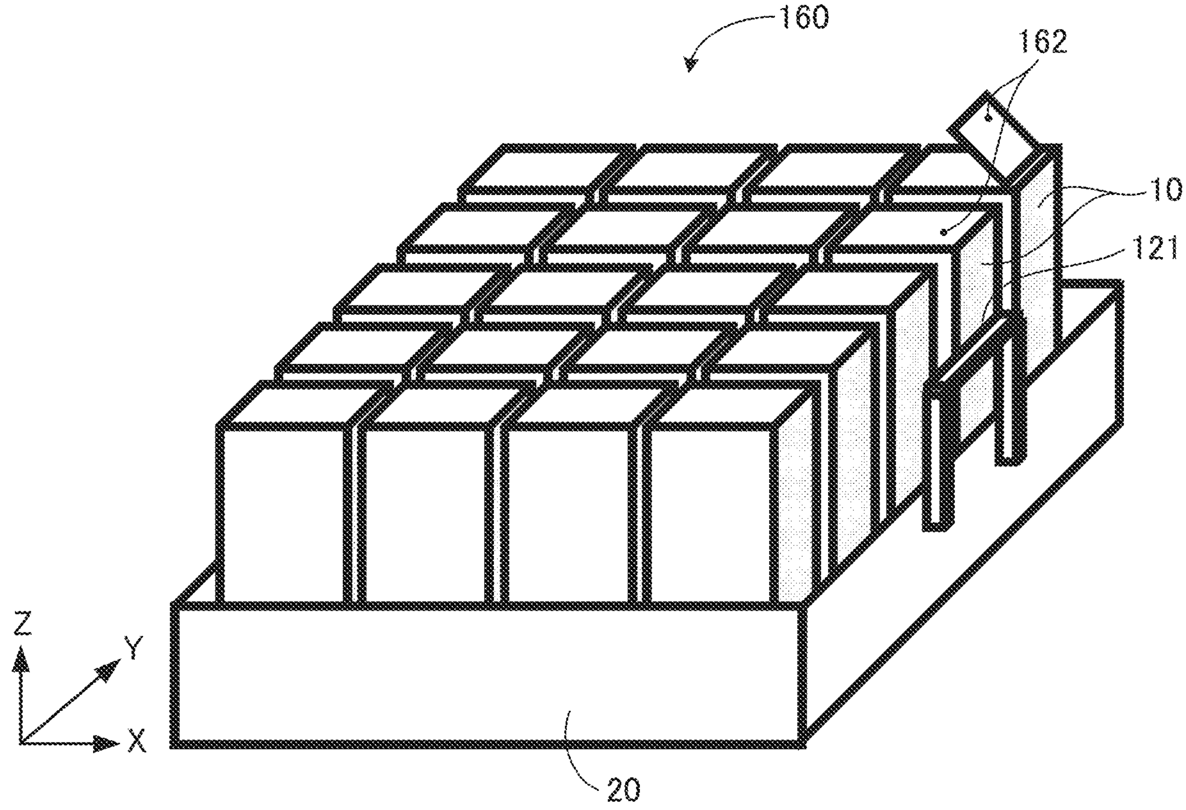
FIG. 28 is a perspective view of a plurality of open and close portions of the multiple cartridges of FIG. 27, according to the ninth embodiment of the present disclosure.

FIG. 28 is a perspective view of the cartridge-attached cartridge tray 160 and illustrates a plurality of open and close portions 162 each of which is provided for each one of the multiple cartridges 10, according to the ninth embodiment of the present disclosure.

Figure 29:
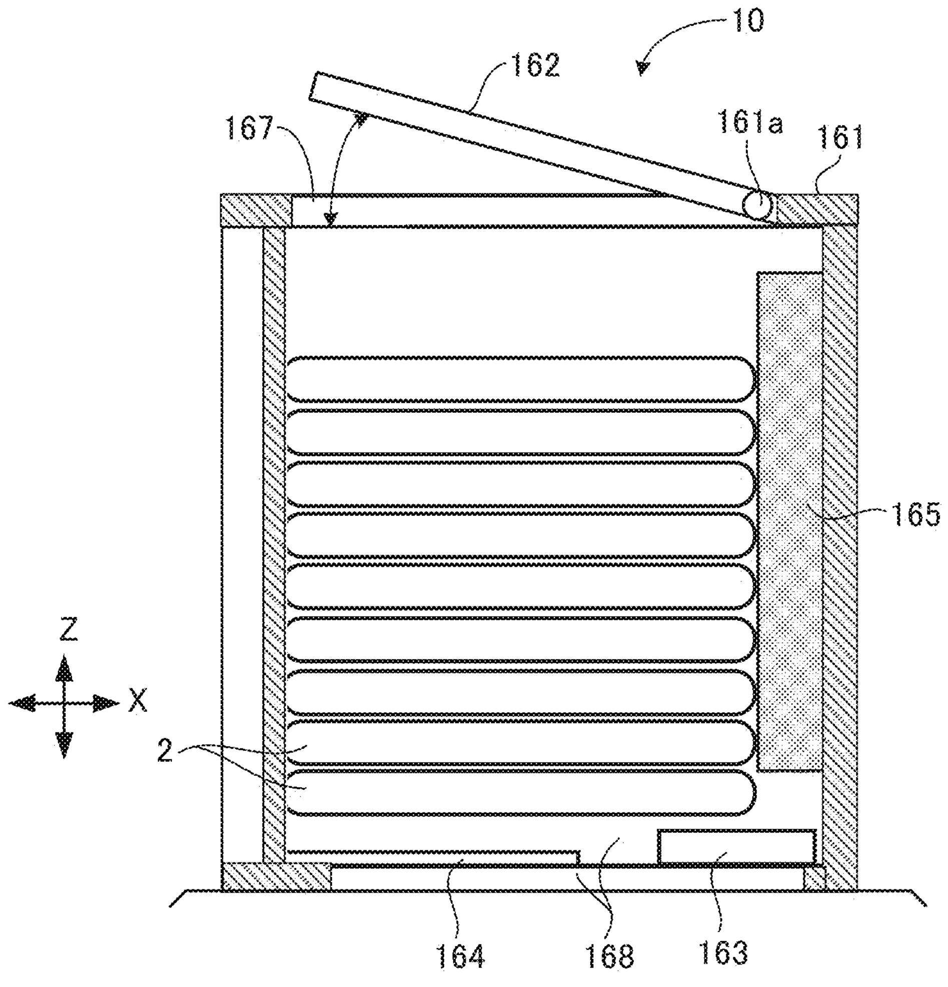
FIG. 29 is a sectional view of basic elements of one of the multiple cartridges of FIG. 28 including the open and close portion, according to the ninth embodiment of the present disclosure.

FIG. 29 is a sectional view of one of the multiple cartridges 10 arranged on the cartridge-attached cartridge tray 160, which includes the open and close portion 162, according to the ninth embodiment of the present disclosure.

As illustrated in FIG. 27 and FIG. 28, the cartridge-attached cartridge tray 160 according to the present embodiment is formed by an injection molding machine using a desired type of resin such as polypropylene (PP) resin. As a result, the multiple cartridges 10 and the cartridge tray 20 are substantially integrally formed. In other words, the multiple cartridges 10 and the cartridge tray 20 that are separately formed as illustrated in, for example, FIG. 5 are integrated into the cartridge-attached cartridge tray 160.

Each one of the multiple cartridges 10 includes, for example, a casing 161, an open and close portion 162, a right support portion 163, a left support portion 164, a pack posture keeper 165, a pack insertion slot 167, and a pack pickup slot 168. As illustrated in FIG. 29, the open and close portion 162 is integrally formed at an upper portion of the casing 161 of each one of the multiple cartridges 10, and is pivotably arranged within a range of a predetermined angle in an openable and closable manner in relation to the pack insertion slot 167. At a right end of the open and close portion 162, a polypropylene (PP) hinge 161*a* that is formed integrally with a portion of the casing 161 is formed. In FIG. 29, the PP hinge 161*a* is schematically illustrated as an axis for the open and close mechanism. Around the PP hinge 161*a*, the open and close portion 162 is pivotably arranged within a range of a predetermined angle in an openable and closable manner in relation to the pack insertion slot 167. The PP hinge 161*a* serves as an axis for the open and close mechanism for the open and close portion 162.

The right support portion 163 that is integrally formed with one of the multiple cartridges 10 corresponds to the right support portion 12 of the cartridge 10 as illustrated in FIG. 5, and the left support portion 164 that is integrally formed with one of the multiple cartridges 10 corresponds to the left support portion 13 of the cartridge as illustrated in FIG. 5.

With the medication support device according to the ninth embodiment of the present disclosure, the multiple cartridges 10 and the cartridge tray 20 are integrated into the cartridge-attached cartridge tray 160. Due to such a configuration, the pack that is filled with the medicines 3 can be replenished without taking out the cartridge tray 20. Accordingly, the length of time for the operation such as the replenishment of the medicines 3 can be reduced. When the medicines 3 are to be replenished, a desired one of the open and close portions 162, which is arranged at an upper portion of each one of the multiple cartridges 10 in an openable and closable manner, is opened and released to replenish the packs.

In other words, with the medication support device according to the ninth embodiment of the present disclosure, a not complicated and relatively simple structure or configuration of the multiple cartridges 10 and the cartridge tray 20 can be achieved.

Tenth Embodiment

Figure 30:
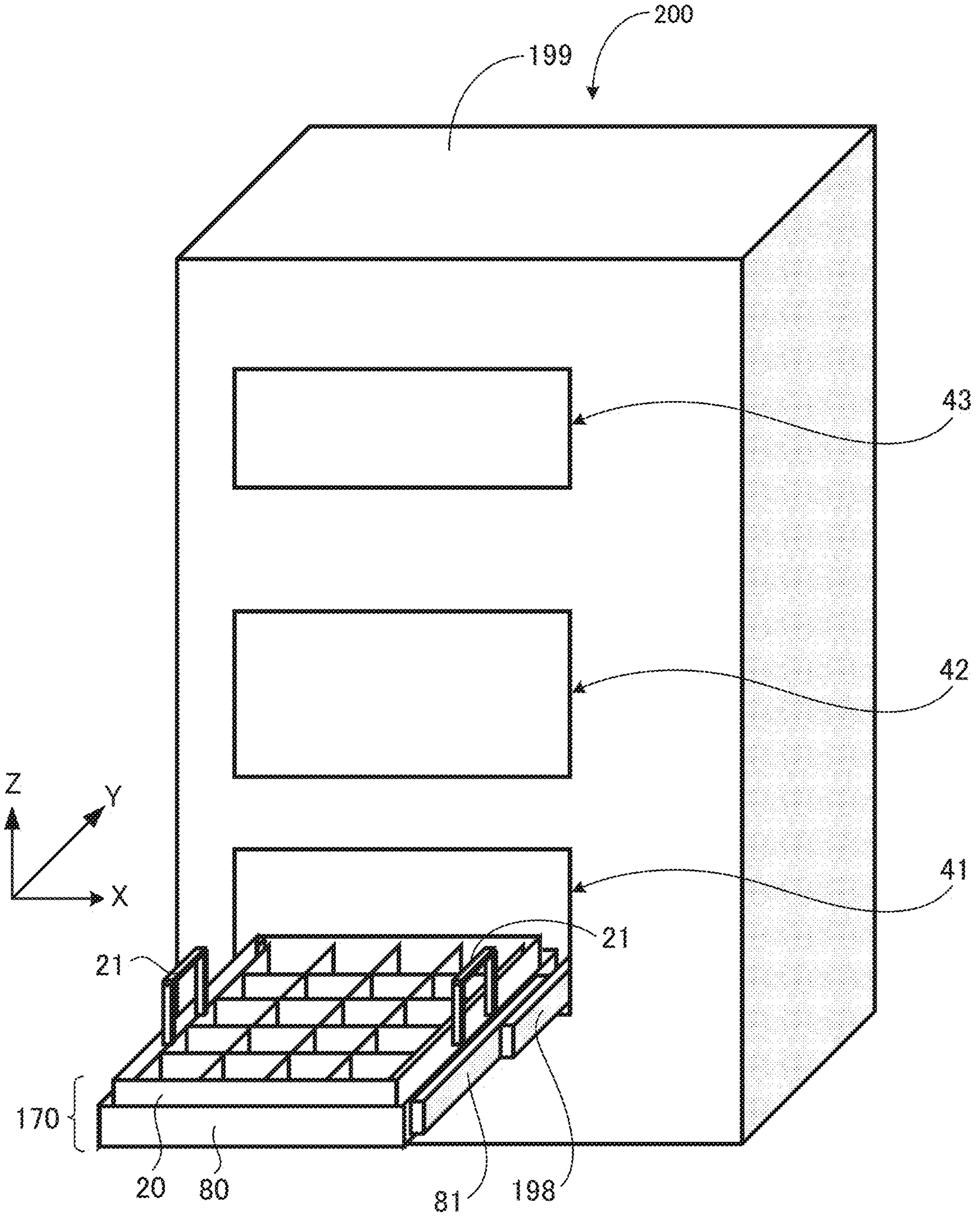
FIG. 30 is a perspective view of a medication support device that has a drawer provided with a cartridge tray, according to a tenth embodiment of the present disclosure.

A cartridge-tray-attached drawer 170 according to the tenth embodiment of the present disclosure in which the cartridge tray 20 and the drawer 80 are integrally formed is described below with reference to FIG. 30. FIG. 30 is a perspective view of the cartridge-tray-attached drawer 170 and illustrates how the drawer is pulled out from the housing 199, according to the tenth embodiment of the present disclosure.

In the cartridge-tray-attached drawer 170 as illustrated in FIG. 30, the cartridge tray 20 of FIG. 15 and the drawer 80 of, for example, FIG. 1 are integrally formed. In other words, the cartridge-tray-attached drawer 170 with the cartridge tray is formed by an injection molding machine using an appropriate resin such that the cartridge tray 20 and the drawer 80 are substantially integrally formed.

In FIG. 30, the cartridge tray 20 has a configuration or structure equivalent to that of the cartridge tray 20 illustrated in FIG. 15, and the drawer 80 is integrally formed with the cartridge tray 20. The multiple cartridges 10 are directly attached to or detached from the cartridge-tray-attached drawer 170 upon pulling out the cartridge-tray-attached drawer 170 from the housing 199 of the medication support device 200.

With the medication support device according to the tenth embodiment of the present disclosure, as the cartridge tray 20 and the drawer 80 are integrally formed, a not complicated and relatively simple structure or configuration can be achieved.

The mechanism for moving the cartridge tray according to an alternative embodiment of the present disclosure is described below with reference to FIG. 31 and FIG. 32.

Figure 31:
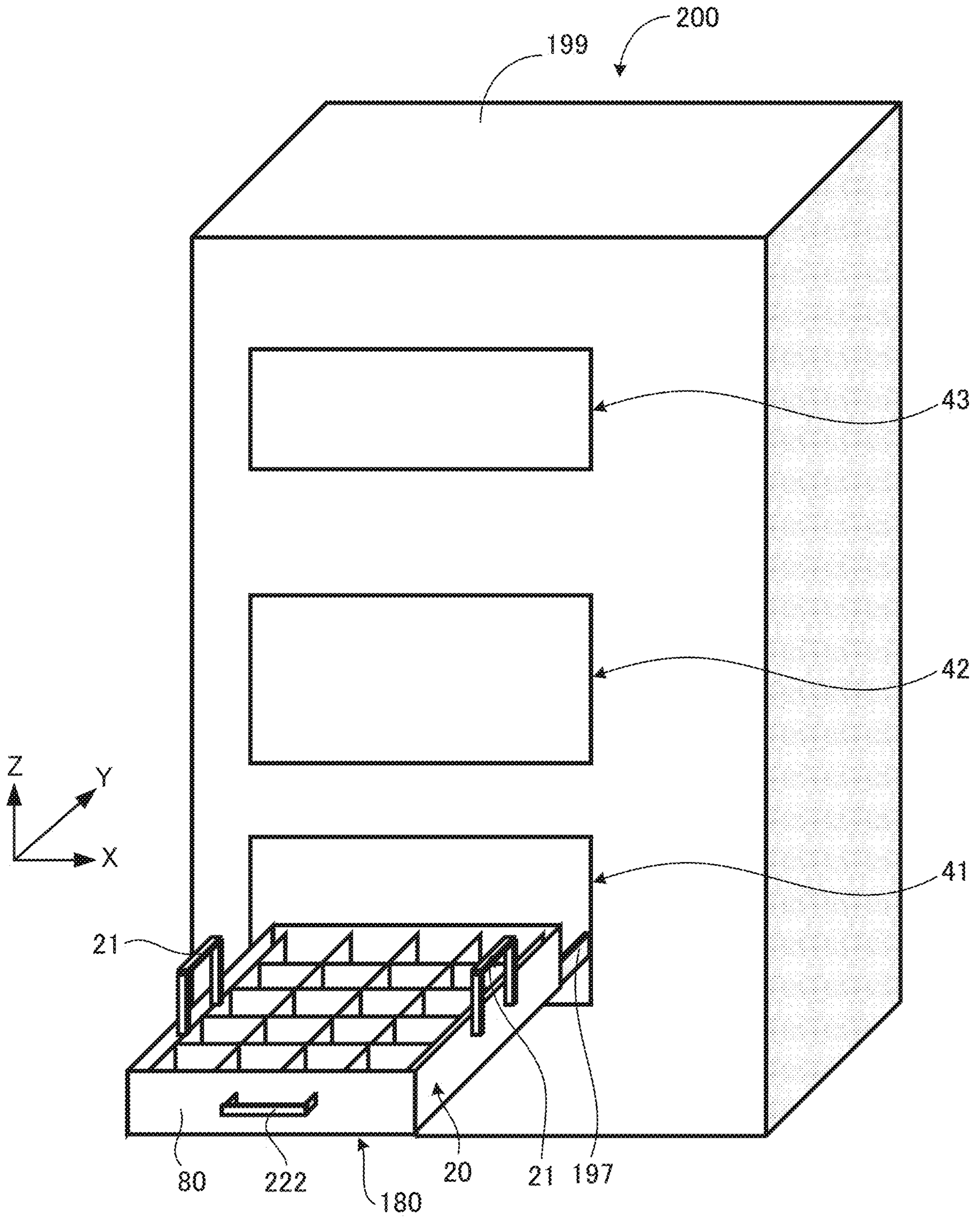
FIG. 31 is a perspective view of a cartridge tray pulled out of a housing of a medication support device, according to an alternative embodiment of the present disclosure.

FIG. 31 is a perspective view of the medication support device 200 and illustrates how the cartridge tray 20 is pulled out to the outside of the housing 199 of the medication support device 200 through the manipulation of the movement mechanism, according to an alternative embodiment of the present disclosure.

Figure 32:
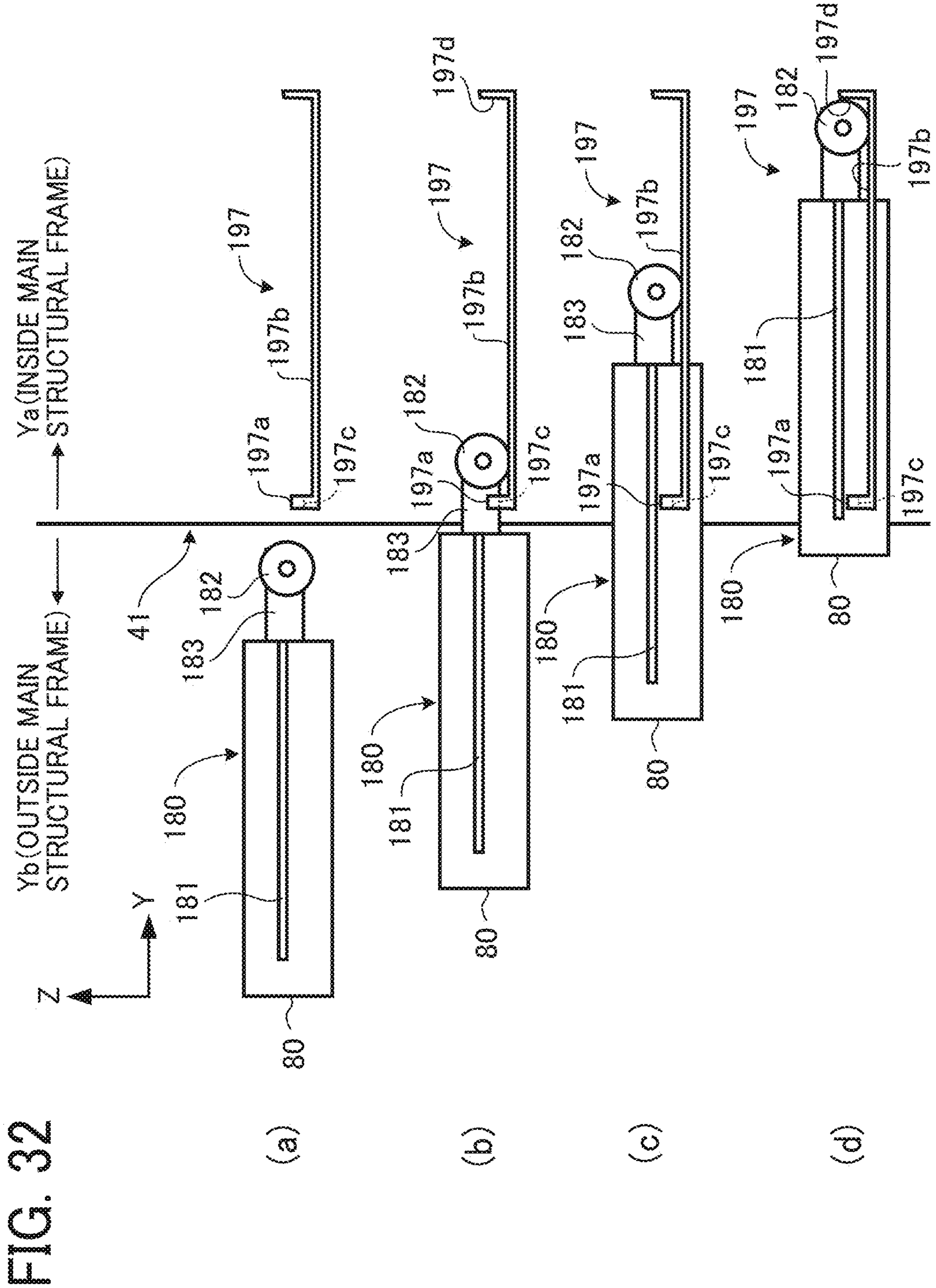
FIG. 32 includes sub-diagrams (a), (b), (c), and (d), and illustrates how the cartridge tray of FIG. 31 moves, according to an embodiment of the present disclosure.

FIG. 32 includes sub-diagrams (a), (b), (c), and (d), and illustrates how the cartridge tray 20 of FIG. 31 moves, according to the present embodiment.

In the cartridge tray 180 according to the present embodiment as illustrated in FIG. 31 and FIG. 32, the movement mechanism inside and outside of the medication support device 200 is arranged in the cartridge tray 180 without the slide rail 81 as illustrated in, for example, FIG. 1A, FIG. 1B, FIG. 2A, FIG. 2B, FIG. 2C, FIG. 3, FIG. 4A, FIG. 4B, FIG. 5, FIG. 6A, FIG. 6B, FIG. 7A, FIG. 7B, FIG. 8A, FIG. 8B, FIG. 8C, FIG. 8D, FIG. 8E, FIG. 8F, FIG. 9A, FIG. 9B, FIG. 10A, FIG. 10B, FIG. 11, FIG. 12A-1, FIG. 12A-2, FIG. 12A-3, FIG. 12A-4, FIG. 12A-5, FIG. 12A-6, FIG. 12B, FIG. 12C, FIG. 13, FIG. 14, FIG. 15, FIG. 16, FIG. 17, FIG. 18, FIG. 19, FIG. 20A, FIG. 20B, FIG. 20C, FIG. 21A, FIG. 21B, FIG. 22A, FIG. 22B, FIG. 23A, FIG. 23B, FIG. 24A, FIG. 24B, FIG. 25A, FIG. 25B, FIG. 25C, FIG. 26A, FIG. 26B, FIG. 27, FIG. 28, FIG. 29, and FIG. 30 where appropriate. The structure or configuration of the cartridge tray 180 is substantially equivalent to, for example, the cartridge-tray-attached drawer 170 of FIG. 30 from which the slide rail 81 is removed. In the cartridge tray 180 according to the present alternative embodiment, a handle 222 that is used to pull out the cartridge tray 180 outside the medication support device 200 or insert the cartridge tray 180 inside the medication support device 200 is newly built to the drawer 80.

The cartridge tray 180 according to the present alternative embodiment is provided with a bearing portion 181 that extends in the Y-axis direction parallel to the moving direction of the cartridge tray 180, a roller 182 that can roll to move and guide the cartridge tray 180 in its moving direction, and a roller-attached rail 183 fixed to the rear end of the cartridge tray 180. The roller 182 is attached to the roller-attached rail 183 in a rollable manner. The bearing portion 181 according to the present embodiment is formed toward both ends of the cartridge tray 180 and protrude in the horizontal direction in FIG. 32. In other words, the bearing portion 181 according to the present embodiment is formed toward the front and rear of the sheet and protrude in the horizontal direction in FIG. 32.

In the housing 199 of the medication support device 200, a bearer 197 is arranged that supports and guides the cartridge tray 180 in a rollable manner through the roller 182. On the bearer 197 of the medication support device 200, a guide and support portion 197*a* that engages with the bearing portion 181 of the cartridge tray 180 and supports and guides the cartridge tray 180 in the Ya-direction, a slot 197*c* formed on a portion of the guide and support portion 197*a*, a movement support portion 197*b* that supports the roller 182 of the cartridge tray 180 in a rollable manner, and a stopper 197*d* that stops the rolling movement of the roller 182 by contacting the roller 182 of the cartridge tray 180 are formed.

FIG. 32 is a set of diagrams illustrating the progression of the operation of inserting the cartridge tray 180 into the housing 199 of the medication support device 200 and the progression of the operation of pulling out the cartridge tray 180 from the housing 199 of the medication support device 200, according to an alternative embodiment of the present disclosure.

As illustrated in (a) of FIG. 32, when the cartridge tray 180 is inserted into the housing 199 of the medication support device 200, the roller 182 provided for the cartridge tray 180 is inserted into the guide and support portion 197*a* of the bearer 197. As illustrated in (b) of FIG. 32, once the cartridge tray 180 is pushed into the housing 199 of the medication support device 200, the roller 182 of the cartridge tray 180 passes through the slot 197*c* formed in the guide and support portion 197*a*, and then the roller-attached rail 183 of the cartridge tray 180 passes through the slot 197*c*.

Subsequently, as illustrated in (b) of FIG. 32, once the cartridge tray 180 is further pushed into the housing 199, the cartridge tray 180 moves toward the back of the housing 199 while the roller 182 contacts and rolls on the movement support portion 197*b* of the bearer 197 of the medication support device 200. While the cartridge tray 180 is moving as illustrated in (b) and (c) of FIG. 32, the bearing portion 181 of the cartridge tray 180 contacts the guide and support portion 197*a* of the bearer 197 of the medication support device 200.

Subsequently, as illustrated in (d) of FIG. 32, once the cartridge tray 180 is further pushed toward the back of the housing 199, the roller 182 contacts the stopper 197*d* formed at the rear end of the bearer 197 of the medication support device 200, and the positioning of the cartridge tray 180 on the bearer 197 is completed as illustrated in (d) of FIG. 32. After the positioning of the cartridge tray 180 on the bearer 197 of the medication support device 200 is completed as described above, desired one of the multiple medicine packages 2 is taken out from one of the multiple cartridges 10 as described above with reference to, for example, FIG. 8A, FIG. 8B, FIG. 8C, FIG. 8D, FIG. 8E, and FIG. 8F.

The above embodiments and the first to tenth embodiments of the present disclosure described above substantially include, for example, the following modifications.

A medication support device according to the first mode of the present disclosure such as the medication support device 200 according to the above embodiments of the present disclosure includes a plurality of first containers such as the cartridge 10 that stores a plurality of medicine packages such as the multiple medicine packages 2 in which medicines such as the medicines 3 are packed, a pickup device such as the pickup unit 50 that picks up a specific one of the multiple medicine packages from one of the multiple containers, a conveyor such as the conveyance unit 90 that conveys the specific one of the plurality of medicine packs picked up by the pickup device, and a medicine dispenser such as the medicine dispensing tray in which the specific one of the plurality of medicine packages conveyed by the conveyor are arranged. The medication support device according to the first mode of the present disclosure further includes a second container such as the cartridge tray 20 in which the multiple first containers are aligned and stored, and a holder such as the drawer 80 in which the second container is aligned and stored. In the medication support device according to the first mode of the present disclosure, at least one of the multiple first containers or the second container is attachable to and detachable from the housing such as the housing 199 of the medication support device.

With the medication support device according to the first mode of the present disclosure, a medication support device with which the time or labor of medication for medication assistants and patients who take medicines can be reduced can be provided with a relatively simple configuration.

In other words, the multiple first containers can be correctly set at predetermined positions in the housing of the medication support device, and the length of time required to take out the multiple first containers from the housing of the medication support device can be shortened.

According to the second mode of the present disclosure, the medication support device according to the first mode of the present disclosure further includes a plurality of second containers including the second container, and the multiple second containers are aligned and held by the holder.

With the medication support device according to the second mode of the present disclosure, the increased weight of the second container can be divided or dispersed to increase the degree of operability when there are an excessive number of first containers.

According to the third mode of the present disclosure, in the medication support device according to the first or second mode of the present disclosure, the second container includes a plurality of partitions such as the multiple partition walls 22.

With the medication support device according to the third mode of the present disclosure, the multiple first containers can be aligned as desired.

According to the fourth mode of the present disclosure, in the medication support device according to any one of the first mode to the third mode of the present disclosure, the second container is divided by the multiple partitions into three areas in a line, and those three areas of the second container are aligned in plurality of columns.

With the medication support device according to the fourth mode of the present disclosure, the medicines to be taken regularly and frequently such as the medicines to be taken in the morning, at lunchtime, and in the evening can be aligned in a row, and it is not necessary to arrange the packs of medicines of each person away from each other. As a result, the degree of visibility can be increased when the positions of the multiple first containers in the medication support device 200 are visually checked.

According to the fifth mode of the present disclosure, in the medication support device according to any one of the first mode to the third mode of the present disclosure, the second container is divided by the multiple partitions into four areas in a line, and those four areas of the second container are aligned in plurality of columns.

With the medication support device according to the fifth mode of the present disclosure, in addition to the medicines to be taken regularly and frequently such as the medicines to be taken in the morning, at lunchtime, and in the evening, the medicines to be taken not frequently such as the medicines to be taken before going to the bed can be aligned together in a row.

According to the sixth mode of the present disclosure, in the medication support device according to any one of the first mode to the fifth mode of the present disclosure, the second container has a handle such as the handle 21.

With the medication support device according to the sixth mode of the present disclosure, the degree of operability when the second container is taken out from the housing of the medication support device can be increased.

According to the seventh mode of the present disclosure, in the medication support device according to the sixth mode of the present disclosure, the handle is arranged at a position away from the center of the second container.

With the medication support device according to the seventh mode of the present disclosure, the positions of a pair of handles are shifted and made different from each other when a plurality of the second containers are placed on the holder. Accordingly, saving in space can be achieved.

According to the eighth mode of the present disclosure, in the medication support device according to the sixth or seventh mode of the present disclosure, the pair of handles are disposed at a pair of areas that face each other across a center of gravity of the second container.

With the medication support device according to the eighth mode of the present disclosure, the loss of balance can be prevented when the second container is taken out from the housing of the medication support device.

According to the ninth mode of the present disclosure, the medication support device according to any one of the first mode to the eighth mode of the present disclosure further includes a plurality of second containers including the second container, and the multiple second containers are stacked on top of each other in layers.

With the medication support device according to the ninth mode of the present disclosure, the free space on, for example, a work desk can be left as the space for stacking the multiple second containers on top of each other in layers. As a result, the workability or processability can be increased.

According to the tenth mode of the present disclosure, in the medication support device according to any one of the first mode to the ninth mode of the present disclosure, the holder includes a spacer.

With the medication support device according to the tenth mode of the present disclosure, the second container of a size smaller than a container used under normal operating conditions is prepared when there are a relatively small number of first containers. Due to such a configuration, for example, reduction in weight can be achieved and the processability can be increased. However, in such cases, undesired empty space takes place in the holder. In order to deal with such a situation, undesired gap or space with the second container can be filled using an attachment.

According to the eleventh mode of the present disclosure, in the medication support device according to any one of the third mode to the fifth mode of the present disclosure, the partition wall is an upright wall.

With the medication support device according to the tenth mode of the present disclosure, the attitude or the direction of the multiple first containers can be restricted.

According to the twelfth mode of the present disclosure, in the medication support device according to the eleventh mode of the present disclosure, the multiple partitions are attachable to and detachable from the second container.

With the medication support device according to the twelfth embodiment of the present disclosure, the multiple partitions can be removed from the second container. Accordingly, the second container can be cleaned easily.

With the medication support device according to the thirteenth embodiment of the present disclosure, in the medication support device according to any one of the first mode to the twelfth mode of the present disclosure, the multiple first containers and the second container are integrally formed.

With the medication support device according to the thirteenth embodiment of the present disclosure, a not complicated and relatively simple structure or configuration of the multiple first containers and the second container can be achieved.

With the medication support device according to the fourteenth embodiment of the present disclosure, in the medication support device according to any one of the first mode to the twelfth mode of the present disclosure, the second container and the holder are integrally formed.

With the medication support device according to the fourteenth embodiment of the present disclosure, a not complicated and relatively simple structure or configuration of the second container and the holder can be achieved.

With the medication support device according to the fifteenth embodiment of the present disclosure, in the medication support device according to any one of the first mode to the fourteenth mode of the present disclosure, the holder can be pulled out from the housing of the medication support device.

With the medication support device according to the fifteenth mode of the present disclosure, the accessibility to the first container increases.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, the technical ideas or matters described in the above-described embodiments, examples, or modifications may be appropriately combined.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A medication support device comprising:

a plurality of first containers configured to store a plurality of medicine packages in which a plurality of medicines are packed;

a pickup device configured to pick up a specific one of the plurality of medicine packages from one of the plurality of first containers;

a conveyor configured to convey the specific one of the plurality of medicine packages picked up by the pickup device;

a medicine dispenser configured to arrange the specific one of the plurality of medicine packages conveyed by the conveyor;

a plurality of second containers each configured to align and store the plurality of first containers, the plurality of second containers configured to be directly stacked on top of each other in layers;

a holder configured to align and store the plurality of second containers; and a housing configured to store the plurality of first containers, the pickup device, the conveyor, the medicine dispenser, the plurality of second containers, and the holder, wherein at least one of the plurality of second containers or the plurality of first containers is configured to be attachable to and detachable from the housing, each second container of the plurality of second containers includes at least one handle, and each second container of the plurality of second containers includes at least one base attached to the at least one handle, the at least one base causing the at least one handle to not be in contact with a side surface of a respective second container.

2. The medication support device according to claim 1, wherein the plurality of second containers are configured to be directly stacked on top of each other such that a top surface of the at least one handle of a lower second container of the plurality of second containers contacts a bottom surface of the at least one handle of a higher second container of the plurality of second containers.

3. The medication support device according to claim 1, wherein the holder is configured to be pulled out from the housing.

4. The medication support device according to claim 1, wherein each second container of the plurality of second containers and the holder are integrally formed.

5. The medication support device according to claim 1, wherein the plurality of first containers and each second container of the plurality of second containers are integrally formed.

6. The medication support device according to claim 1, wherein the holder includes a spacer.

7. The medication support device according to claim 1, further comprising:

a pair of handles including the at least one handle, wherein the pair of handles are at a pair of areas that face each other across a center of gravity of the respective second container of the plurality of second containers.

8. The medication support device according to claim 1, wherein the at least one handle is at a position away from a center of the respective second container of the plurality of second containers.

9. The medication support device according to claim 1, wherein the plurality of second containers are configured to be aligned and held by the holder.

10. The medication support device according to claim 1, wherein each second container of the plurality of second containers includes a plurality of partitions.

11. The medication support device according to claim 10, wherein each second container of the plurality of second containers is divided by the plurality of partitions into three areas in a line; and the three areas are aligned in a plurality of columns.

12. The medication support device according to claim 10, wherein each second container of the plurality of second containers is divided by the plurality of partitions into four areas in a line; and the four areas are aligned in a plurality of columns.

13. The medication support device according to claim 10, wherein each partition of the plurality of partitions is an upright wall.

14. The medication support device according to claim 13, wherein each partition of the plurality of partitions is configured to be attachable to and detachable from the respective second container of the plurality of second containers.

15. The medication support device according to claim 1, wherein each second container of the plurality of second containers includes a plurality of columns at a plurality of corners of the respective second container.

16. The medication support device according to claim 15, wherein the plurality of second containers are configured to be directly stacked on top of each other on the plurality of columns.

* * * * *